United States Patent
Hyde et al.

(10) Patent No.: US 8,857,191 B2
(45) Date of Patent: Oct. 14, 2014

(54) HYBRID PROPULSIVE ENGINE INCLUDING AT LEAST ONE INDEPENDENTLY ROTATABLE PROPELLER/FAN

(75) Inventors: Roderick A. Hyde, Redmond, WA (US); Muriel Y. Ishikawa, Livermore, CA (US); Edward K. Y. Jung, Bellevue, WA (US); Jordin T. Kare, Seattle, WA (US); Nathan P. Myhrvold, Bellevue, WA (US); Clarence T. Tegreene, Bellevue, WA (US); Thomas Allan Weaver, San Mateo, CA (US); Lowell L. Wood, Jr., Bellevue, WA (US); Victoria Y. H. Wood, Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1286 days.

(21) Appl. No.: 12/590,043

(22) Filed: Oct. 30, 2009

(65) Prior Publication Data

US 2011/0100014 A1    May 5, 2011

Related U.S. Application Data

(63) Continuation-in-part of application No. 12/287,501, filed on Oct. 8, 2008, now Pat. No. 8,291,716, and a continuation-in-part of application No. 12/287,498, filed on Oct. 8, 2008, now abandoned, and a continuation-in-part of application No. 12/287,500, filed on Oct. 8, 2008, now Pat. No. 8,109,073, and a continuation-in-part of application No. 12/287,499, filed on Oct. 8, 2008, now Pat. No. 8,099,944, and a continuation-in-part of application No. 12/590,044, filed on Oct. 30, 2009, now Pat. No. 8,549,833, and a continuation-in-part of application No. 12/590,045, filed on Oct. 30, 2009, and a continuation-in-part of application No. 12/590,046, filed on Oct. 30, 2009, now Pat. No. 8,596,036, and a continuation-in-part of application No. 12/590,047, filed on Oct. 30, 2009.

(51) Int. Cl.
F02C 7/275  (2006.01)

(52) U.S. Cl.
USPC ............................... 60/788; 60/802

(58) Field of Classification Search
USPC ............. 60/226.1, 786–788, 802, 805, 39.23; 244/53 A, 53 R, 60; 415/149.1, 149.2, 415/159, 199.4; 290/52
See application file for complete search history.

(56) References Cited

U.S. PATENT DOCUMENTS 3,524,318 A   8/1970 Bauger et al.
3,678,306 A   7/1972 Garnier et al.
(Continued)

FOREIGN PATENT DOCUMENTS

CN   101137819 A   3/2008
JP   2008520900    6/2008

OTHER PUBLICATIONS

PCT International Search Report; International App. No. PCT/US2010/002861; bearing a date of Dec. 30, 2010; pp. 1-2.

(Continued)

Primary Examiner — Phutthiwat Wongwian
(74) Attorney, Agent, or Firm — Foley & Lardner LLP

(57) ABSTRACT

A hybrid propulsive technique includes providing at least some first thrust associated with a flow of a working fluid through at least a portion of an at least one axial flow jet engine. The hybrid propulsive technique includes extracting energy from the working fluid that is at least partially converted into electrical power, and converting at least a portion of the electrical power to torque. The hybrid propulsive technique further includes rotating an at least one independently rotatable propeller/fan of at least one rotatable propeller/fan assembly at least partially responsive to the converting the at least a portion of the electrical power to torque, wherein the rotating of the at least one independently rotatable propeller/fan of the at least one rotatable propeller/fan assembly is arranged to produce at least some second thrust.

41 Claims, 32 Drawing Sheets

(56) References Cited

U.S. PATENT DOCUMENTS

| | | | |
|---|---|---|---|
| 3,705,775 A | 12/1972 | Rioux | |
| 3,937,424 A | 2/1976 | Meier et al. | |
| 3,955,780 A | 5/1976 | Postelson | |
| 4,159,624 A | 7/1979 | Gruner | |
| 4,232,515 A | 11/1980 | Brown | |
| 4,455,121 A | 6/1984 | Jen | |
| 4,605,185 A | 8/1986 | Reyes | |
| 5,082,421 A | 1/1992 | Acton et al. | |
| 5,086,234 A | 2/1992 | Shiota et al. | |
| 5,376,827 A * | 12/1994 | Hines | 290/52 |
| 5,453,943 A | 9/1995 | Magliozzi | |
| 5,823,468 A | 10/1998 | Bothe | |
| 5,845,236 A | 12/1998 | Jolly et al. | |
| 5,932,940 A | 8/1999 | Epstein et al. | |
| 6,269,645 B1 | 8/2001 | Yamaguchi | |
| 6,568,633 B2 | 5/2003 | Dunn | |
| 6,966,174 B2 | 11/2005 | Paul | |
| 7,055,327 B1 | 6/2006 | Pekrul et al. | |
| 7,140,832 B2 | 11/2006 | Jacks | |
| 7,514,810 B2 * | 4/2009 | Kern et al. | 290/52 |
| 7,603,864 B2 * | 10/2009 | Gemin et al. | 60/802 |
| 7,661,271 B1 * | 2/2010 | Millsaps, Jr. | 60/786 |
| 7,685,828 B2 | 3/2010 | Foucault et al. | |
| 7,802,757 B2 | 9/2010 | Dooley et al. | |
| 7,854,582 B2 | 12/2010 | Ullyott | |
| 7,857,254 B2 | 12/2010 | Parks | |
| 7,966,826 B2 | 6/2011 | Alkislar et al. | |
| 2002/0163200 A1 | 11/2002 | Oglesby et al. | |
| 2004/0123603 A1 | 7/2004 | Care et al. | |
| 2005/0060982 A1 | 3/2005 | Mani et al. | |
| 2006/0176009 A1 | 8/2006 | Okai et al. | |
| 2006/0220388 A1 | 10/2006 | Teets et al. | |
| 2006/0254255 A1 | 11/2006 | Okai et al. | |
| 2006/0260323 A1 | 11/2006 | Moulebhar | |
| 2007/0051091 A1 | 3/2007 | Rolt | |
| 2007/0101721 A1 * | 5/2007 | Dooley et al. | 60/721 |
| 2007/0126292 A1 | 6/2007 | Lugg | |
| 2007/0204623 A1 | 9/2007 | Rollins, III | |
| 2007/0214795 A1 | 9/2007 | Cooker et al. | |
| 2008/0276620 A1 | 11/2008 | Ullyott et al. | |
| 2009/0126369 A1 | 5/2009 | Walitzki et al. | |
| 2010/0327109 A1 | 12/2010 | Dooley et al. | |

OTHER PUBLICATIONS

PCT International Search Report; International App. No. PCT/US 09/05558; Dec. 8, 2009; pp. 1-2.

PCT International Search Report; International App. No. PCT/US 09/05554; Dec. 8, 2009; pp. 1-2.

Chinese State Intellectual Property Office; Chinese Office Action; Application No. 200980148887.6; dated Mar. 28, 2013; pp. 1-8; (no translation provided).

Das, S.; Arnold, D.P.; Zana, I.; Park, J.W.; Lang, J.H.; Allen, M.G.; Multi-Watt Electric Power From a Microfabricated Permanent-Magnet Generator; MEMS; 1 page.

Noland, David; "Who Says a Jet can't be Cheap?"; Air & Space Magazine; bearing a date Mar. 1, 2008; pp. 1-4 plus cover sheet; Smithsonian Institution; printed on Aug. 7, 2008.

Rankine Cycle; Wikipedia; pp. 1-6; located at: http://en.wikipedia.org/wiki/Rankine_cycle; printed on Sep. 11, 2008.

European Patent Office, Extended European Search Report; App. No. EP 09819581; Dec. 18, 2013 (received by our Agent Jan. 10, 2014); pp. 1-3.

European Patent Office, Extended European Search Report; App. No. EP 09819578; Dec. 16, 2013 (received by our Agent Jan. 10, 2014); pp. 1-3.

* cited by examiner

| | Speed (recommended Knot range) | Jet Engine Power Load (RPM recommended) | Electric Motor Power Load (RPM recommended) |
|---|---|---|---|
| starting | | | |
| slow taxi | | | |
| fast taxi | | | |
| normal takeoff | | | |
| emergency takeoff | | | |
| en-route takeoff | | | |
| high speed cruise | | | |
| low-noise take-off | | | |
| normal cruise | | | |
| economy cruise | | | |
| emergency cruise | | | |
| high speed descent | | | |
| normal descent | | | |
| emergency descent | | | |
| rough-weather descent | | | |
| maximum distance glide (2 engines) | | | |
| approach /10 degree flap | | | |
| approach /20 degree flap | | | |
| approach /30 degree flap | | | |
| touch-down | | | |
| braking reverse thrust | | | |

FIG. 42

| | Speed (recommended Knot range) | Jet Engine Power Load (RPM recommended) | Electric Motor Power Load (RPM recommended) |
|---|---|---|---|
| starting | | | |
| slow taxi | | | |
| fast taxi | | | |
| normal takeoff | 150 (140 to 170) | 2300 (2250-2350) | 2275 (2250-2350) |
| emergency takeoff | | | |
| en-route takeoff | | | |
| high speed cruise | | | |
| low-noise take-off | | | |
| normal cruise | | | |
| economy cruise | | | |
| emergency cruise | | | |
| high speed descent | | | |
| normal descent | | | |
| emergency descent | | | |
| rough-weather descent | | | |
| maximum distance glide (2 engines) | | | |
| approach /10 degree flap | | | |
| approach /20 degree flap | | | |
| approach /30 degree flap | | | |
| touch-down | | | |
| braking reverse thrust | | | |

FIG. 43

| | Speed (recommended Knot range) | Jet Engine Power Load (RPM recommended) | Electric Motor Power Load (RPM recommended) |
|---|---|---|---|
| starting | | | |
| slow taxi | | | |
| fast taxi | | | |
| normal takeoff | 130 (140 to 170) | 2300 (2250-2350) | 2075 (2250-2350) |
| emergency takeoff | | | |
| en-route takeoff | | | |
| high speed cruise | | | |
| low-noise take-off | | | |
| normal cruise | | | |
| economy cruise | | | |
| emergency cruise | | | |
| high speed descent | | | |
| normal descent | | | |
| emergency descent | | | |
| rough-weather descent | | | |
| maximum distance glide (2 engines) | | | |
| approach /10 degree flap | | | |
| approach /20 degree flap | | | |
| approach /30 degree flap | | | |
| touch-down | | | |
| braking reverse thrust | | | |

TOO SLOW - SET PROPELLER THROTTLE RPM HIGHER!!!!

FIG. 44

4600 providing at least some first thrust associated with a flow of a working fluid through at least a portion of an at least one axial flow jet engine 4602 extracting energy from the working fluid that is at least partially converted into electrical power 4604 converting at least a portion of the electrical power to torque 4606 rotating an at least one independently rotatable propeller/fan of at least one rotatable propeller/fan assembly at least partially responsive to the converting the at least a portion of the electrical power to torque, wherein the rotating of the at least one independently rotatable propeller/fan of the at least one rotatable propeller/fan assembly is arranged to produce at least some second thrust 4608

FIG. 51

HYBRID PROPULSIVE ENGINE INCLUDING AT LEAST ONE INDEPENDENTLY ROTATABLE PROPELLER/FAN

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

1. For purposes of the USPTO extra-statutory requirements, the present application constitutes a continuation-in-part of U.S. patent application Ser. No. 12/287,499, entitled HYBRID PROPULSIVE ENGINE INCLUDING AT LEAST ONE INDEPENDENTLY ROTATABLE PROPELLER/FAN, naming Glenn B. Foster, Roderick A. Hyde, Muriel Y. Ishikawa, Edward K. Y. Jung, Jordin T. Kare, Nathan P. Myhrvold, Clarence T. Tegreene, Thomas Allan Weaver, Lowell L. Wood, Jr., Victoria Y. H. Wood as inventors, filed Oct. 8, 2008.
2. For purposes of the USPTO extra-statutory requirements, the present application constitutes a continuation-in-part of U.S. patent application Ser. No. 12/287,498, entitled HYBRID PROPULSIVE ENGINE INCLUDING AT LEAST ONE INDEPENDENTLY ROTATABLE COMPRESSOR ROTOR, naming Glenn B. Foster, Roderick A. Hyde, Muriel Y. Ishikawa, Edward K. Y. Jung, Jordin T. Kare, Nathan P. Myhrvold, Clarence T. Tegreene, Thomas Allan Weaver, Lowell L. Wood, Jr., Victoria Y. H. Wood as inventors, filed Oct. 8, 2008.
3. For purposes of the USPTO extra-statutory requirements, the present application constitutes a continuation-in-part of U.S. patent application Ser. No. 12/287,500, entitled HYBRID PROPULSIVE ENGINE INCLUDING AT LEAST ONE INDEPENDENTLY ROTATABLE COMPRESSOR STATOR, naming Glenn B. Foster, Roderick A. Hyde, Muriel Y. Ishikawa, Edward K. Y. Jung, Jordin T. Kare, Nathan P. Myhrvold, Clarence T. Tegreene, Thomas Allan Weaver, Lowell L. Wood, Jr., Victoria Y. H. Wood as inventors, filed Oct. 8, 2008.
4. For purposes of the USPTO extra-statutory requirements, the present application constitutes a continuation-in-part of U.S. patent application Ser. No. 12/287,501, entitled HYBRID PROPULSIVE ENGINE INCLUDING AT LEAST ONE INDEPENDENTLY ROTATABLE TURBINE STATOR, naming Glenn B. Foster, Roderick A. Hyde, Muriel Y. Ishikawa, Edward K. Y. Jung, Jordin T. Kare, Nathan P. Myhrvold, Clarence T. Tegreene, Thomas Allan Weaver, Lowell L. Wood, Jr., Victoria Y. H. Wood as inventors, filed Oct. 8, 2008.
5. For purposes of the USPTO extra-statutory requirements, the present application constitutes a continuation-in-part of U.S. patent application Ser. No. 12/590,045, entitled HYBRID PROPULSIVE ENGINE INCLUDING AT LEAST ONE INDEPENDENTLY ROTATABLE PROPELLER/FAN, naming Alistair K. Chan, Roderick A. Hyde, Muriel Y. Ishikawa, Edward K. Y. Jung, Jordin T. Kare, Nathan P. Myhrvold, Clarence T. Tegreene, Thomas Allan Weaver, Lowell L. Wood, Jr., Victoria Y. H. Wood as inventors, filed Oct. 30, 2009.
6. For purposes of the USPTO extra-statutory requirements, the present application constitutes a continuation-in-part of U.S. patent application Ser. No. 12/590,046, entitled HYBRID PROPULSIVE ENGINE INCLUDING AT LEAST ONE INDEPENDENTLY ROTATABLE COMPRESSOR ROTOR, naming Roderick A. Hyde, Muriel Y. Ishikawa, Edward K. Y. Jung, Jordin T. Kare, Nathan P. Myhrvold, Clarence T. Tegreene, Thomas Allan Weaver, Lowell L. Wood, Jr., Victoria Y. H. Wood as inventors, filed Oct. 30, 2009.
7. For purposes of the USPTO extra-statutory requirements, the present application constitutes a continuation-in-part of U.S. patent application Ser. No. 12/590,044, entitled HYBRID PROPULSIVE ENGINE INCLUDING AT LEAST ONE INDEPENDENTLY ROTATABLE COMPRESSOR STATOR, naming Roderick A. Hyde, Muriel Y. Ishikawa, Edward K. Y. Jung, Jordin T. Kare, Nathan P. Myhrvold, Clarence T. Tegreene, Thomas Allan Weaver, Lowell L. Wood, Jr., Victoria Y. H. Wood as inventors, filed Oct. 30, 2009.
8. For purposes of the USPTO extra-statutory requirements, the present application constitutes a continuation-in-part of U.S. patent application Ser. No. 12/590,047, entitled HYBRID PROPULSIVE ENGINE INCLUDING AT LEAST ONE INDEPENDENTLY ROTATABLE TURBINE STATOR, naming Roderick A. Hyde, Muriel Y. Ishikawa, Edward K. Y. Jung, Jordin T. Kare, Nathan P. Myhrvold, Clarence T. Tegreene, Thomas Allan Weaver, Lowell L. Wood, Jr., Victoria Y. H. Wood as inventors, filed Oct. 30, 2009.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

Certain aspects of this disclosure can relate to, but are not limited to, a variety of hybrid propulsive engines, as well as associated devices, uses, and/or techniques.

BRIEF DESCRIPTION OF THE FIGURES

FIG. 42 is a diagram of an embodiment of a display that may be applied to a variety of embodiments of the hybrid propulsive engine;

FIG. 43 is a diagram of another embodiment of the display of FIG. 42 that illustrates actual and allowable parameters for one condition (e.g., normal takeoff) that may be applied to a variety of embodiments of the hybrid propulsive engine;

FIG. 44 is a diagram of another embodiment of the display of FIG. 42 that illustrates actual and allowable parameters for one condition (e.g., warning or emergency) that may be applied to a variety of embodiments of the hybrid propulsive engine;

FIG. 51 is a diagram of a flow chart of an embodiment of a hybrid propulsion engine technique.

DETAILED DESCRIPTION

Figure 1:
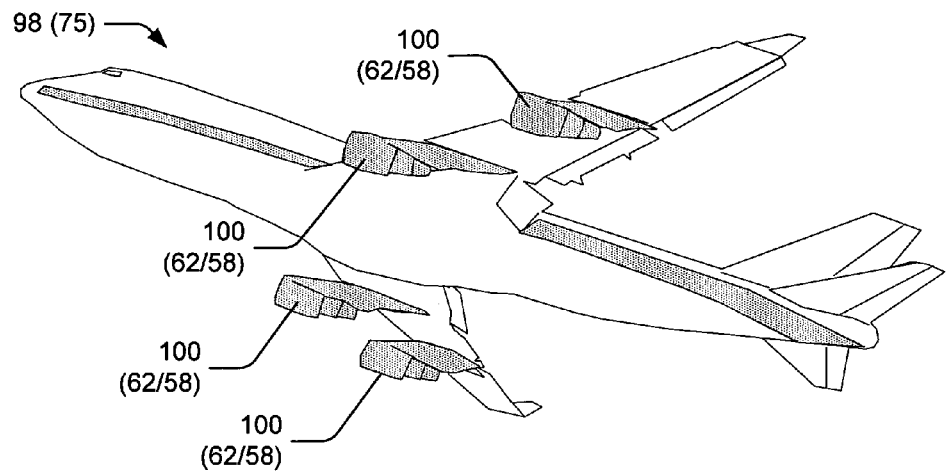
FIG. 1 is a diagram of one embodiment of a vehicle (particularly an aircraft) including an at least one hybrid propulsive engine.

At least certain portions of the text of this disclosure (including claims, detailed description, and/or drawings as set forth herein) can support various different claim groupings and/or various different applications. Although, for sake of convenience and understanding, the detailed description can include section headings that generally track various different concepts associated with claims or general concepts contained therein. The detailed description is not intended to limit the scope of the invention as set forth by each particular claim. It is to be understood that support for the various applications or portions thereof thereby can appear throughout the text, the claims, and/or drawings at one or more locations, regardless of the section headings.

1. Hybrid Propulsive Engine

Jet engines represent a subset of gas turbine engines, are typically applied to vehicles. Jet engines, in general, have undergone considerable improvements and variations in design and materials over the years. Certain embodiments of jet engines (gas turbines) generally operate based on the Brayton cycle, and are often referred to as "Brayton engines". Certain embodiments of aircraft 75 (or other vehicles 98), as described with respect to FIG. 1, may be used for a variety of civilian, military, commercial, and other applications, and can be propelled using at least one jet engine 58. Certain embodiments of an at least one hybrid propulsive engines 100 may be used to power such vehicles 98 as, but are not limited to, aircraft 75; but also may be applied to such vehicles as boats, hovercraft, ships, land vehicles, cars, trucks, and/or trains, etc.

Certain embodiments of the at least one hybrid propulsive engines 100 are configured to be powered by at least two engines, an at least one jet engine 58, and at least one torque conversion mechanism 107. Certain embodiments of the at least one torque conversion mechanism 107 can be configured, such as an electric motor, to convert at least a portion of the electrical power to torque. The torque provided by certain embodiments of the torque conversion mechanism can be used to drive a variety of rotatable elements such as, but not limited to, at least one propeller (such as for a turboprop), at least one fan (such as for a turbofan), at least one independently rotatable compressor rotor, at least one independently rotatable compressor stator 493 as described herein, and at least one independently rotatable turbine stator 477 as described herein.

Figure 3:
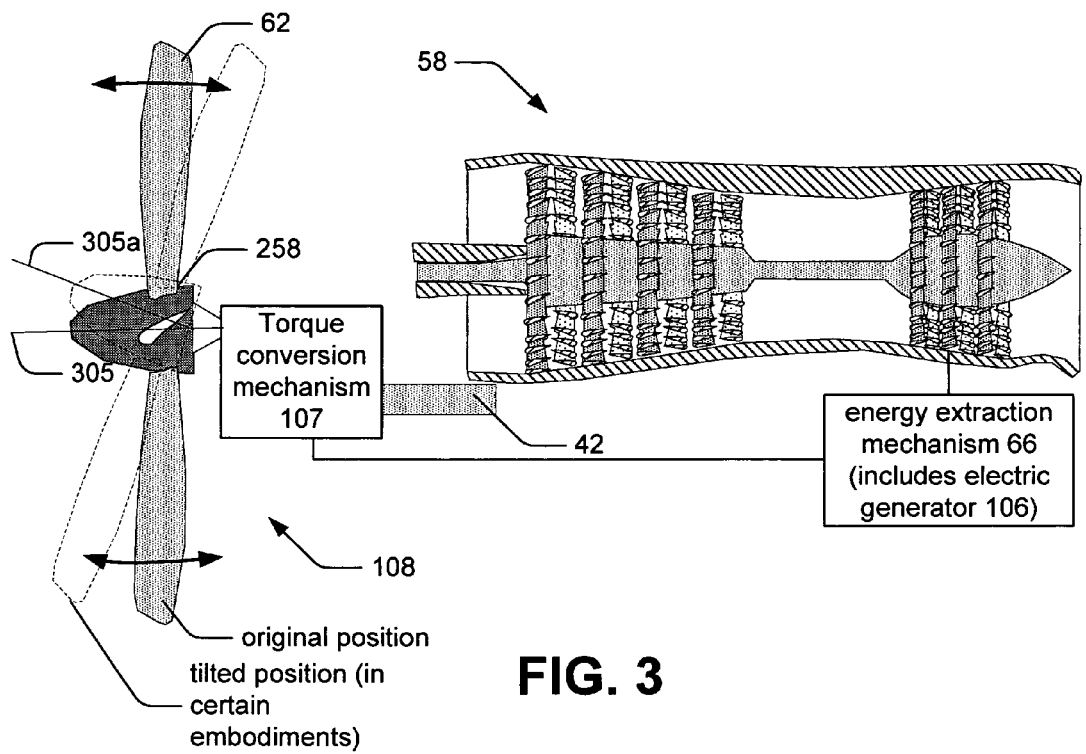
FIG. 3 is a diagram of one embodiment of the at least one hybrid propulsive engine including an independently rotatable propeller/fan assembly being powered by at least one torque conversion mechanism.

Certain embodiments of the hybrid propulsive engine 100, as described with respect to FIG. 3, can include but are not limited to the at least one jet engine 58, an at least one energy extraction mechanism 66, an at least one (optional) energy storage device 66, an at least one torque conversion mechanism 107, and an at least one rotatable working fluid displacement engine 74.

One typical component of the hybrid propulsive engine 100 is the at least one jet engine 58. Certain embodiments of the jet engine can include, but are not limited to, turbojet engines, axial flow jet engines, radial flow jet engines, rocket engines, ramjet jet engines, externally heated (e.g., nuclear, laser, microwave) or combustion driven jet engines. Certain embodiments of the at least one jet engine 58 can obtain power at least partially from working fluid in the combustion chamber being forced through a turbine section, whereby a variety of turbine rotors as well as the affixed turbine blades will be caused to rotate. The rotation of the turbine rotors will be transferred via a shaft to drive at least portions of the compressor.

Certain embodiments of the at least one energy extraction mechanism 66 can include, for example, an at least one electric generator that can extract energy from a variety of locations that apply generated electrical power to the at least one torque conversion mechanism 107. As such, certain embodiments of the at least one energy extraction mechanism 66 can be configured to extract energy either directly or indirectly from working fluid passing through the jet engine. Certain embodiments of the at least one jet engine 58 can be configured to be externally heated (e.g., nuclear jet engine, laser jet engine, microwave jet engine, etc.). Certain embodiments of the energy extraction mechanism 66 can be configured to extract energy from the working fluid, and at least partially convert that energy to electrical power. There can be a variety of embodiments of the at least one energy extraction mechanism 66, certain of which can include, but is not limited to, at least one turbine rotational element that can convert kinetic (e.g., rotational) energy associated with movement of the turbine, turbine rotor, shaft, turbine blades, etc., into generated electricity. Another embodiment of the at least one energy extraction mechanism can include, but is not limited to, at least one heat engine such as a Rankine engine or other device, that can convert heat energy such as produced by the combustion chamber of the jet engine, into generated electricity. Still other embodiments of the at least one energy extraction mechanism can include, but is not limited to, at least one magnetohydrodynamic device, as described in this disclosure, that can convert kinetic (e.g., translational) energy associated with movement of the working fluid passing through at least a portion of the jet engine into generated electricity.

Certain embodiments of the at least one energy extraction mechanism 66 can optionally include, for example, an energy storage device 264. Certain embodiments of the energy storage device 264 to act to store generated electricity that exceeds the demand for that electricity. Such techniques to use certain embodiments of energy storage devices to provide power to run the at least one torque conversion mechanism 107 can in certain occurrences allow operation of the at least one independently rotatable propeller/fan engine 62 during the time of demand of the independently rotatable propeller/fan engine without putting an immediate electric drain on the at least one energy extraction mechanism 66.

Within this disclosure, certain embodiments of the at least one independently rotatable propeller/fan engine 62 can be configured with one or more (typically a plurality of) fan or propeller blades. Certain embodiments of the fan or propeller blades can be angled to rotate about the blade axis either on the ground or during flight, and such blades are generally referred to as "constant speed propellers". Other embodiments of the fan or propeller blades fixed such as to limit any rotation about the blade axis, and such substantially fixed blades are generally referred to as "fixed propellers".

Certain embodiments of the hybrid propulsive engine 100 can be configured to provide sufficient power (e.g., electrical) to drive (e.g., using the torque conversion mechanism such as an electrical motor) a variety of embodiments of the at least one rotatable working fluid displacement engines 74. Certain embodiments of the at least one rotatable working fluid displacement engine 74 can include an at least one independently rotatable propeller/fan engine 62 that further comprises an at least one independently rotatable propeller/fan 258 such as a propeller or fan. Certain embodiments of the at least one rotatable working fluid displacement engine 74 can include an at least one independently rotatable compressor rotor that can, upon rotation, compress working fluid passing therethrough. Certain embodiments of the at least one rotatable working fluid displacement engine 74 can include an at least one independently rotatable compressor stator 493 that can be drivingly rotated relative to the at least one compressor rotor or the at least one rotatable compressor rotor. Still other embodiments of the at least one rotatable working fluid displacement engine 74 can include an at least one independently rotatable turbine stator 477 that can be drivingly rotated relative to one or more turbine rotors.

Certain embodiments of the at least one hybrid propulsive engine 100 can be configured to provide two sources of power that may be used to provide thrust or propulsion. Certain embodiments of the jet engine 58 can provide a first thrust as driven from the turbine section in a similar manner as conventional jet engines (a.k.a. Brayton engines), and may in many ways be configured similar to conventional jet engines. Certain embodiments of an at least one torque conversion mechanism 107 can be configured to drive a variety of rotational elements such as may include, but are not limited to, propellers, fans, portions of compressors. etc., as described in this disclosure. Certain embodiments of the energy extraction mechanism can be viewed as independently operable and independently controllable from the at least one jet engine 58 (as described herein). Thereby, the at least one hybrid propulsive engine 100 may each be viewed as a hybrid engine system since it relies on two independently controllable engines (the at least one jet engine 58 and the at least one torque conversion mechanism 107, which may include an electric motor).

The operation of a turbine that powers the jet engine 58 may be independent of mechanical connection (in that there may be no direct shaft and/or gear-box connection, or other mechanical connection there between) between the torque conversion mechanism 107 and the at least one turbine rotors of the jet engine. Certain embodiments of the torque conversion mechanism can power such illustrative, but not limiting, rotatable devices as the at least one independently rotatable propeller/fan engine 62 and/or at least one compressor rotatable element of the jet engines 58. This disclosure therefore provides a variety of embodiments of the at least one hybrid propulsive engine 100 that can include an at least one jet engine 58, as well as another rotatable device being powered at least partially by certain embodiments of the torque conversion mechanism 107.

Figure 2:
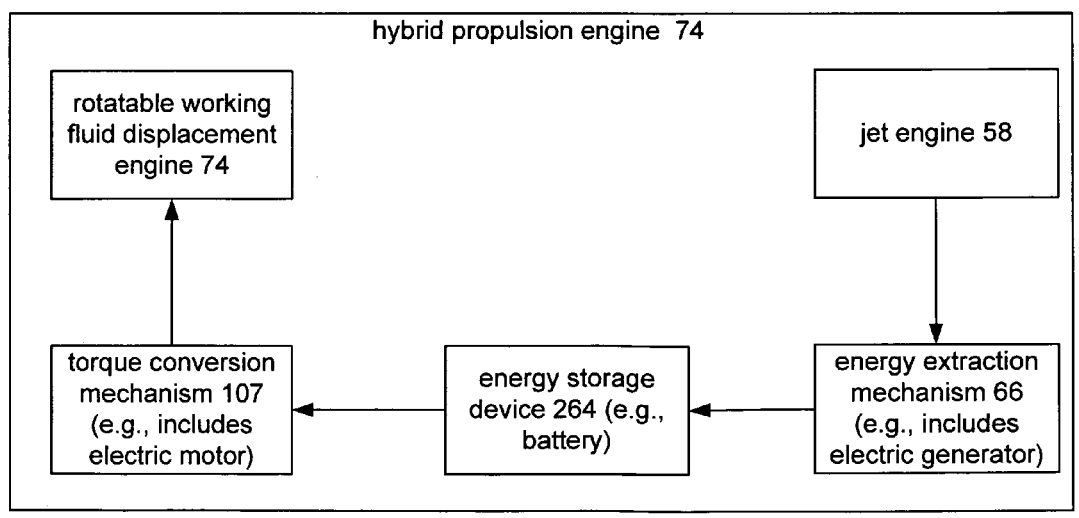
FIG. 2 is a block diagram of one embodiment of the at least one hybrid propulsive engine.

Certain embodiments of the hybrid propulsive engine 100, as described with respect to FIG. 2, and other locations in this disclosure, can be configured with multiple jet engines 58 that each can be associated with an at least one energy extraction mechanism 66 that can generate power in the form of electricity. During operation, particularly at periods of low demand such as during taxi, cruise, or descent of the aircraft, certain of the at least one jet engine 58 can be shut down. Since this disclosure describes a variety of embodiments of the at least one rotatable working fluid displacement engine 74 that can be each rotated by at least one torque conversion mechanisms 107 (and such rotation may not be provided directly from rotation of the jet engine via a shaft, gear arrangement, etc.), certain embodiments of the hybrid propulsive engine can require less torque to start as compared with many corresponding conventional jet engines. It is envisioned that certain embodiments of the torque conversion mechanism 107 acting to rotate certain of the rotatable working fluid displacement engines 74 can be configured to assist in starting the at least one jet engine 58 of the hybrid propulsive engine in flight, or on the ground, as described in this disclosure.

It is envisioned that within certain embodiments of the hybrid propulsive engines 100, as described with respect to FIG. 2, and other locations in this disclosure, the electricity provided generated from the energy extraction mechanism 66 for a particular jet engine 58 may be used to supply electricity to at least one torque conversion mechanisms 107 and/or one or more energy storage devices 264 that may, or may not be, operationally associated with that jet engine. Alternately, certain embodiments of the at least one energy extraction mechanism 66 and/or the at least one energy storage device 264 may or may not provide electricity to an operationally associated or not operationally associated torque conversion mechanism 107, which in turn may provide rotation of a variety of the at least one rotatable working fluid displacement engines 74 as described in this disclosure. Such concepts of generating electricity or providing electricity to associated or non associated components are referred to in this disclosure, in general, as "power sharing".

Being able to start the at least one jet engine 58 in flight reliably (as well as on the ground), as described with respect to FIG. 2, and other locations in this disclosure, allows at least some of the at least one jet engine 58 to be shut down, and those jet engines that continue operation can be power shared to multiple ones of the at least one energy storage device 264, the at least one torque conversion mechanism, and/or the at least one rotatable working fluid displacement engine 74 appropriately. Such shutting down of at least one jet engine during low demand periods (and allowing continued operation of other continued operating jet engines) can be performed in a manner that can allow power sharing to rotate the at least one rotatable working fluid displacement engine 74 as described in this disclosure, can save considerable energy such as to provide increased fuel economy and range. Allowing for continued operation of certain ones of the rotatable working fluid displacement engines 74 even when the associated jet engine 58 is shut down, damaged, or inoperative, as described with respect to FIG. 2, and other locations in this disclosure, can provide for an increased measure of flight safety.

In some cases, reducing the weight of the hybrid propulsive engine 100 as compared to conventional aircraft engines involve maintaining at least as much power per weight production of the at least one rotatable working fluid displacement engine 74 as combined with the at least one jet engine 58. Certain embodiments of the at least one rotatable working fluid displacement engine 74, that are typically powered by electric motors, can be made quite light since electric motors can be quite light. Certain embodiments of the at least one rotatable working fluid displacement engine 74 include energy storage devices (such as batteries which may be configured with lithium ion or other high power density and long lasting materials and designs) that can utilize regenerative or ground-based configurations. Such energy storage devices may also be configured to be light in weight. Various embodiments of the torque conversion mechanism 107 can obtain its electricity from a variety of the at least one energy extraction mechanism 68, that can include a variety of electric generative sources or electric regenerative sources.

Certain embodiments of the hybrid propulsive engines can provide for independent operation between various components, such that the relative rotational velocities, ratio of rotational velocities, direction of rotation, etc. can be adjusted. With certain embodiments of the hybrid propulsive engine 100, various portions of the compressor (e.g., independently rotatable compressor rotors, independently rotatable turbine stators, and/or independently rotatable compressor stators, etc.) can be independently powered using the at least one torque conversion mechanism, while other portions of the compressor can be driven by various components of the jet engine such as within the turbine section. With certain embodiments of the hybrid propulsive engine 100, various portions of the turbine can be independently powered using the at least one torque conversion mechanism 107, while other portions of the turbine can be driven by the jet engine.

Certain embodiments of the hybrid propulsive engine 100 can be configured in a variety of configurations as well as complexities. For instance, certain embodiments of the energy extraction mechanism 66 can be configured to include turbines in the jet engine (e.g. Brayton cycle), such as can be configured to include a variety of number of stages, dimensions of blades, rotors, stators, etc. Similarly, certain embodiments of the jet engines can include a variety of compressors that can be configured with a variety of numbers of stages, dimensions of blades, rotors, stators, etc.

Certain embodiments of the at least one hybrid propulsive engine 100 can be configured to allow independent operation and control of at least one independently rotatable propeller/fan assembly 108 that can be configured as a propeller or a fan. The at least one rotatable working fluid displacement engine 74 of the at least one hybrid propulsive engine 100 can be configured to include a variety of embodiments of an at least one independently rotatable propeller/fan assembly 108. Certain embodiments of the independently rotatable propeller/fan assembly 108 can be configured to include a propeller (e.g., including a number of propeller blades as to form a turboprop engine) being powered by at least one torque conversion mechanism as described with respect to FIG. 3. Certain embodiments of the independently rotatable propeller/fan assembly 108 can be configured to include a fan (e.g., including a number of fan blades as to form a turbofan engine) being powered by at least one torque conversion mechanism as described with respect to FIG. 4. Certain embodiments of the propeller blade of FIG. 3 or the fan blade of FIG. 4 can thereby be driven at least partially by such torque conversion mechanisms 107 as an electric motor, as described in this disclosure.

Figure 4:
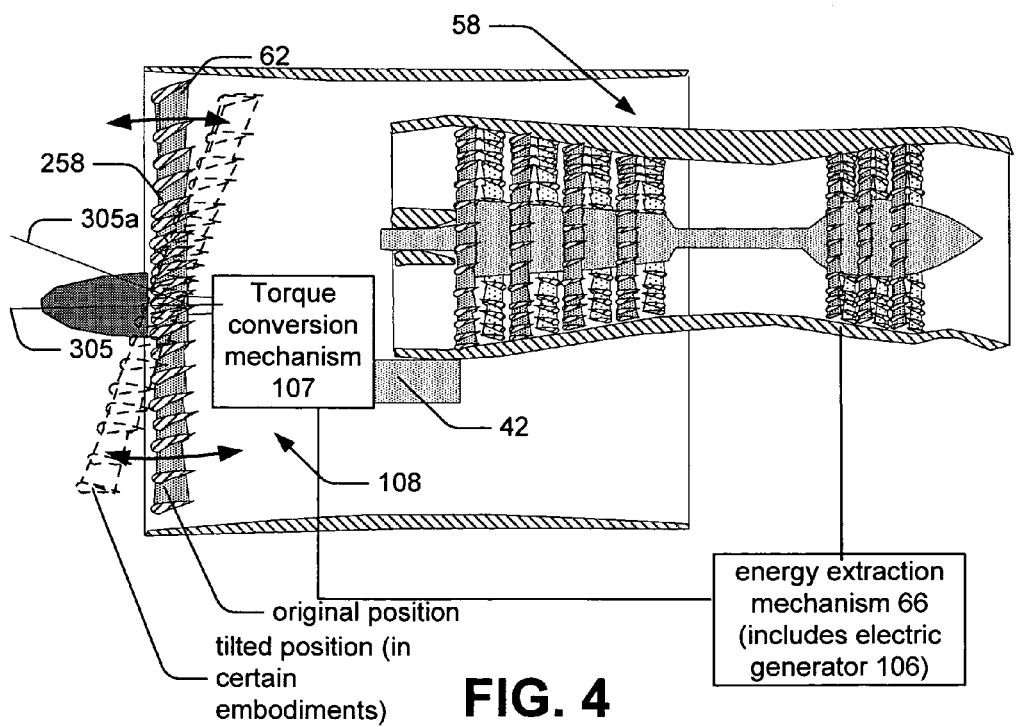
FIG. 4 is a diagram of one embodiment of the at least one hybrid propulsive engine including an embodiment of the independently rotatable propeller/fan assembly being powered by at least one torque conversion mechanism.

Certain embodiments of the at least one hybrid propulsive engine 100 can be configured to provided for independent operation and control (e.g., controlling the rotational velocity, among other parameters) of the at least one independently rotatable propeller/fan assembly 108 that is configured as a propeller or a fan. In FIGS. 3 and 4, the at least one independently rotatable propeller/fan assembly 108 can include respectively at least one propeller and at least one fan can be driven by the torque conversion mechanism. Each fan blade can have the general configuration and fluid displacement characteristics similar to that of a propeller blade, but often are arranged and secured in a ducted configuration and as such form the fan. Propellers are generally not arranged in ducted configurations, but instead are arranged in unducted configurations.

While FIGS. 3 and 4 illustrate two embodiments of the hybrid propulsive engine 100 in which the at least one rotatable working fluid displacement engine 74 is configured respectively as the unducted propeller to form a turboprop or the ducted fan to form a turbofan, there are other embodiments of the at least one rotatable working fluid displacement engine 74 that can be provided.

With certain embodiments of the hybrid propulsive engine 100, the power that can be provided by the at least one jet engine 58 can be reduced by the continual power that can be provided by the at least one independently rotatable propeller/fan assembly 108. For example, consider a particular aircraft that can operate with a conventional turboprop, turbofan, or jet engine having a thrust of R lbs. (R is some integer). Also consider the at least one independently rotatable propeller/fan assembly 108 to provide S lbs. of near continual thrust (S is some integer). Under these circumstances, certain embodiments of the hybrid propulsive engine 100 can be configured with a jet engine having a reduced thrust of down to R-S lbs. Such jet engines 58 that are configured to provide less thrust can often be constructed to be lighter. Hopefully, such difference in weight of jet engines used in hybrid propulsive engines 100 as compared to jet engines used to power similarly powered conventional turboprops and turbofans can exceed the weight of combination of the at least one energy extraction mechanism 66, the at least one (optional) energy storage device 66 (264), and/or the at least one torque conversion mechanism 107 used to provide power to the at least one independently rotatable propeller/fan assembly 108.

Figure 5:
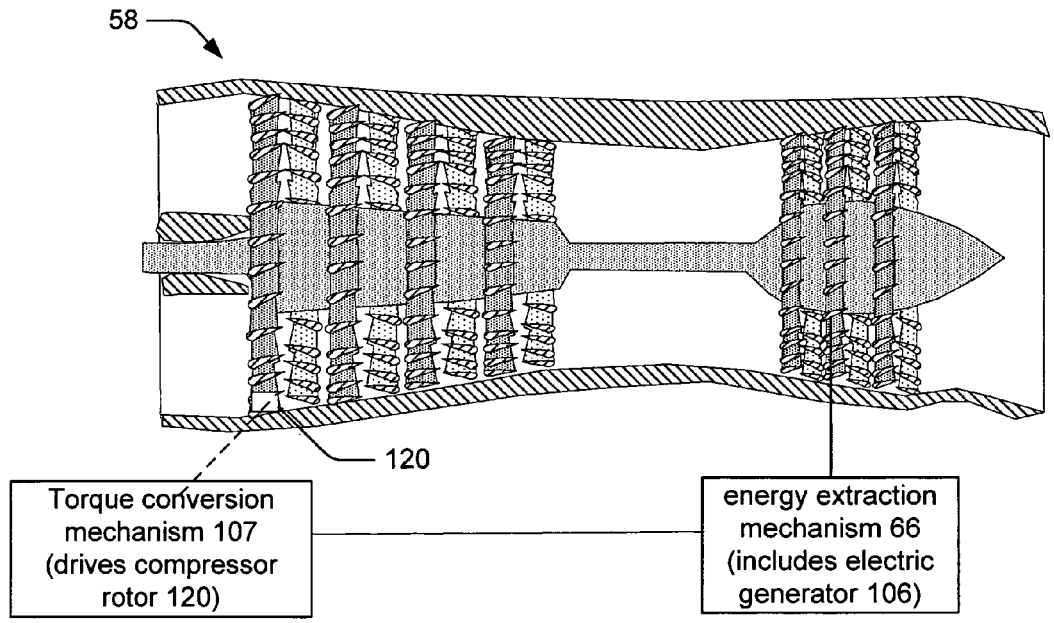
FIG. 5 is a diagram of one embodiment of the at least one hybrid propulsive engine including an embodiment of an at least one independently rotatable compressor rotor being powered by at least one torque conversion mechanism.
Figure 6:
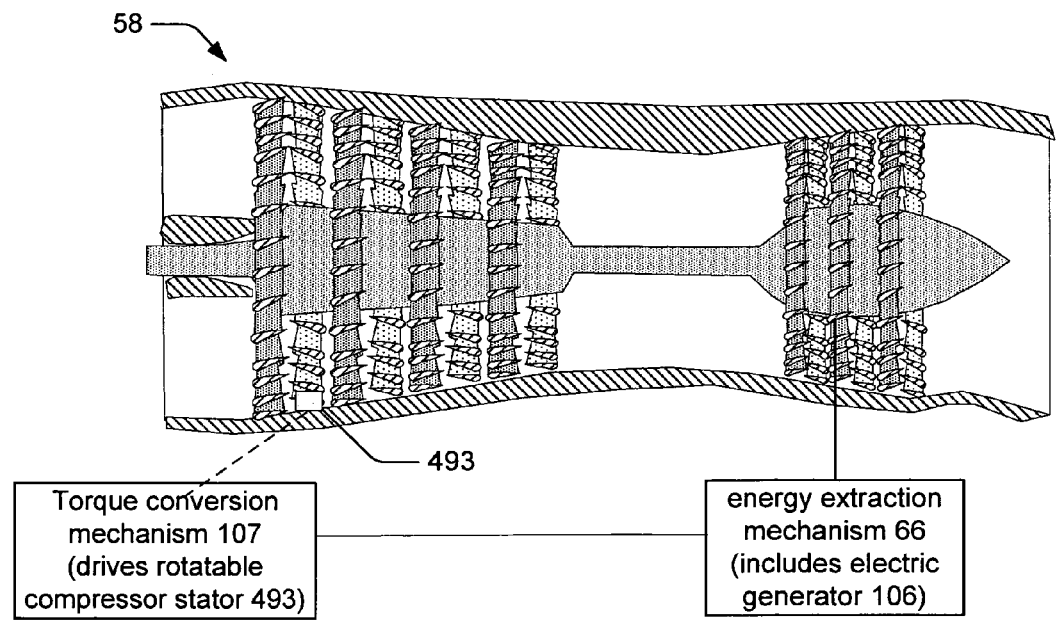
FIG. 6 is a diagram of one embodiment of the at least one hybrid propulsive engine including an embodiment of an at least one independently rotatable compressor stator being powered by at least one torque conversion mechanism.

For example, FIGS. 5 and 6 are diagrams of two embodiment of the at least one hybrid propulsive engine 100 including at least one rotatable working fluid displacement engine 74 including at least one rotatable compressor element. There are a variety of embodiments of the at least one rotatable working fluid displacement engine 74 that include a variety of at least one rotatable compressor elements that may be driven by the at least one torque conversion mechanism. Certain embodiments of such varied rotatable compressor elements may include, but are not limited to, at least one independently rotatable compressor rotor (or simply at least one compressor rotor). Other embodiments of the at least one rotatable compressor element that may be driven by the at least one torque conversion mechanism may include, but is not limited to, at least one independently rotatable compressor stator 493 that may be configured to be independently driven relative to an adjacent compressor rotor, as described in this disclosure. With the FIG. 5 embodiment of the hybrid propulsive engine 100, the at least one torque conversion mechanism 107 therefore drives the at least one rotatable working fluid displacement engine 74 including at least one independently rotatable compressor rotor. With the FIG. 6 embodiment of the hybrid propulsive engine 100, the at least one torque conversion mechanism 107 therefore drives the at least one rotatable working fluid displacement engine 74 including at least one independently rotatable compressor stator 493.

Figure 7:
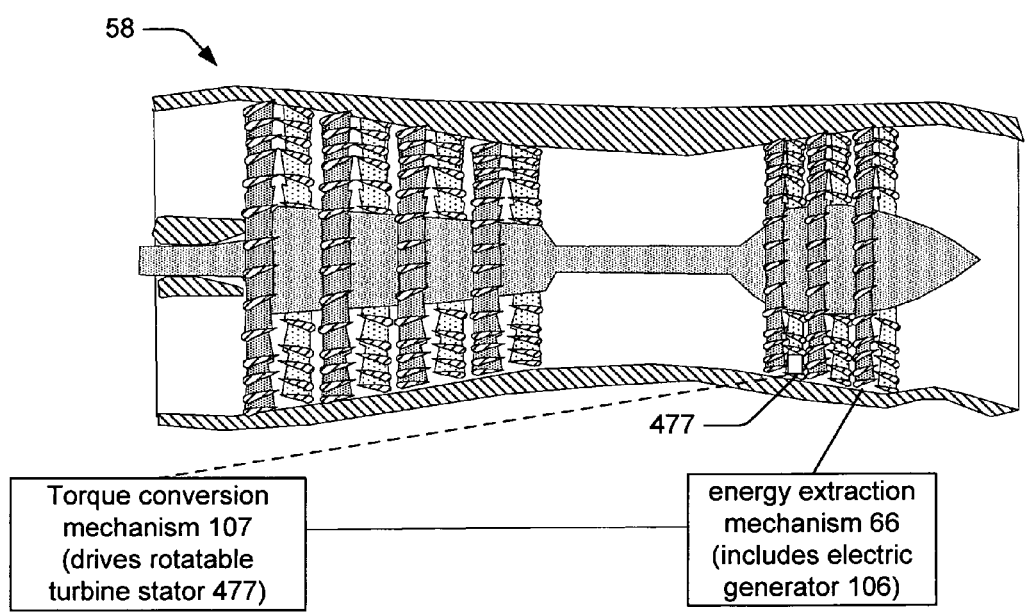
FIG. 7 is a diagram of one embodiment of the at least one hybrid propulsive engine including an embodiment of an at least one independently rotatable turbine stator being powered by at least one torque conversion mechanism.

For example, FIG. 7 is a diagrams of an embodiment of the at least one hybrid propulsive engine 100 including at least one rotatable working fluid displacement engine 74 including the at least one independently rotatable turbine stator 477. With certain embodiments of the at least one rotatable working fluid displacement engine 74, the rotational velocity of the at least one independently rotatable turbine stator 477 can be independently controlled relative to the rotational velocity of certain turbine rotors.

As such, certain embodiments of the at least one hybrid propulsive engine 100 can include as independently operable engines: a) the at least one jet engine 58, and b) the at least one rotatable working fluid displacement engine 74 such as may be powered at least partially by the at least one torque conversion mechanism 107 as at least one electric-powered engine (e.g., rotatable about an axis, centrifugal, or other). Various embodiments of the at least one rotatable working fluid displacement engine 74 can be powered at least partially by the at least one torque conversion mechanism 107 (such as an electric motor), and can thereby include, but is not limited to: the independently rotatable propeller/fan assembly 108 that can include the propeller and/or a fan, the independently rotatable compressor rotor, the independently rotatable compressor stator 493, the independently rotatable turbine stator 477, and/or a combination of these elements as described at many locations in this disclosure. Various other embodiments of the at least one rotatable working fluid displacement engine 74, that is powered at least partially by the at least one torque conversion mechanism 107, can drive a variety of the rotatable compressor elements of the at least one jet engine 58.

Figure 16:
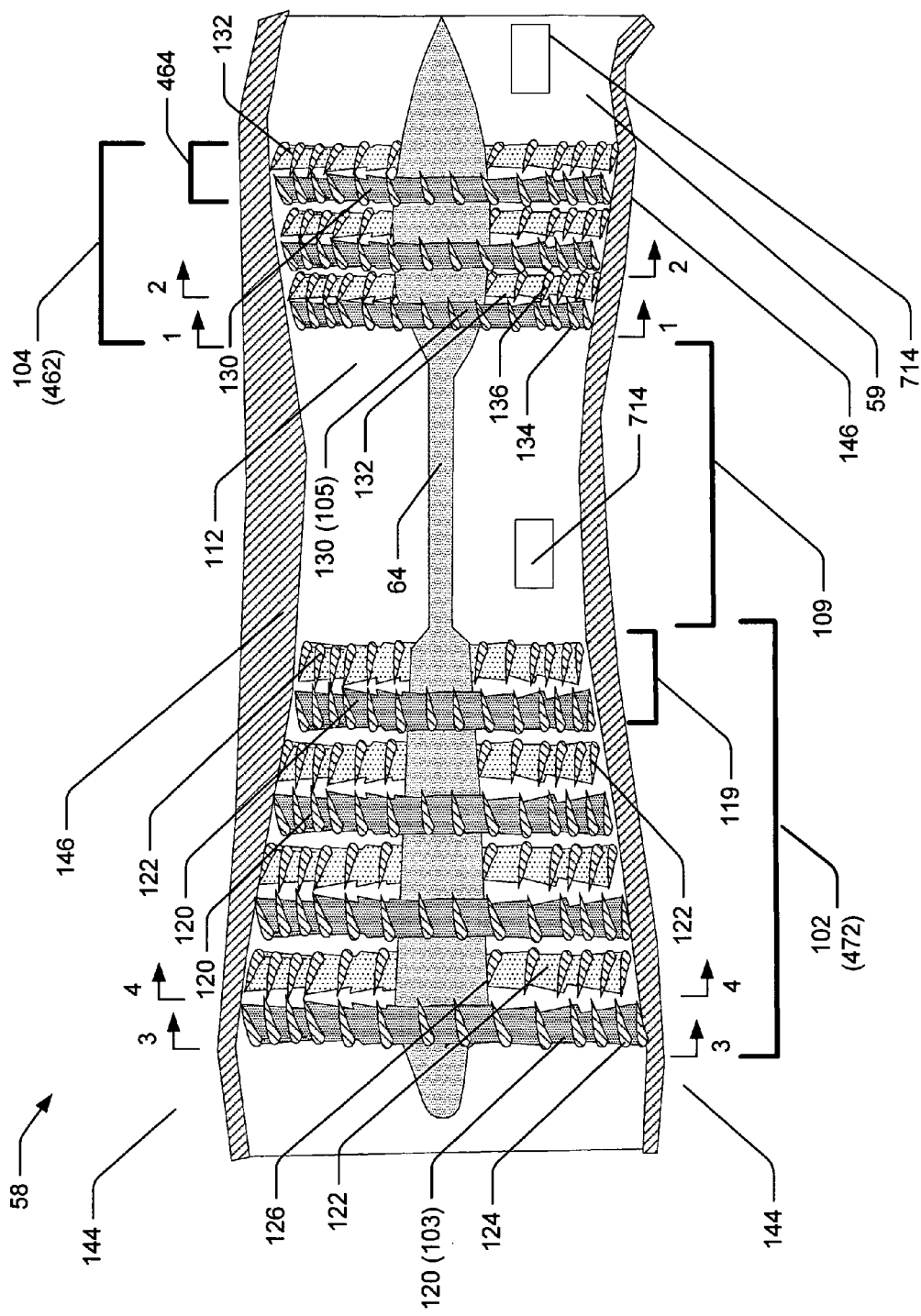
FIG. 16 is a diagram of one embodiment of a jet engine that may be included in the hybrid propulsive engine of FIGS. 1 to 15.

Within this disclosure, the "hybrid propulsive engine" 100 can thereby be powered utilizing the two independently controllable engines: the at least one jet engine 58 as described with respect to FIG. 16, and the at least one rotatable working fluid displacement engine 74 driven by the at least one torque conversion mechanism 107 as described with respect to FIGS. 3 to 6, and other locations in this disclosure.

Certain embodiments of the at least one hybrid propulsive engine 100 can therefore be configured such that the at least one jet engine may be configured to be relatively small and/or light since a considerable amount of additional power may be provided by the at least one rotatable working fluid displacement engine 74 as described as described with respect to FIGS. 3 to 6, as well as other locations in this disclosure. Certain embodiments of the at least one rotatable working fluid displacement engine 74 powered by the torque conversion mechanism 107 can be made adequately powerful to compensate for certain jet engine designs having limited power.

For aviation in general, it has historically been desirable to maximize the power of the engines such as jet engines, while limiting the weight thereof. The more powerful the engine (other aspects of the aircraft and airframe such as weight being similar), typically the faster the aircraft can travel, the shorter the length of the runway for take off and landing, and the greater load that can be carried by the aircraft. But too much weight such as may result from a heavy engine limits the ability of the aircraft to get off the ground and fly. Certain embodiment of the at least one hybrid propulsive engine 100 can be configured to be quite powerful based on the use of two engines: the at least one jet engine 58 and the at least one rotatable working fluid displacement engine 74 driven by the at least one torque conversion mechanism 107 (e.g., the at least one independently rotatable propeller/fan engine 62 or the compressor rotatable elements 103). In some cases, using the two engines in combination, at full power (or near-to full power), can provide for considerable or even increased thrust as compared with a single engine. Typically, however, such combined maximum thrust can be maintained for relatively brief durations since the torque conversion mechanism can often operate maximum output for only relatively brief durations. The percentage of flying time for aircraft that requires full power may be relatively brief for a number of flights. As such, when the relative and total powers of the jet engine 58 and the at least one independently rotatable propeller/fan engine 62 for a particular aircraft is being configured, it may be appropriate to consider the power the aircraft would require to perform a variety of flight operations.

The generalized block-diagram embodiment of the at least one hybrid propulsive engine 100 in which the torque conversion mechanism 107 (such as an electric motor) provides torque to power a variety of embodiments of the at least one rotatable working fluid displacement engine 74 as described with respect to FIG. 6, are now described in greater detail with respect to FIGS. 8, 9, 10, and 11. In the FIG. 8 embodiment of the hybrid propulsive engine 100, the at least one rotatable working fluid displacement engine 74 is configured to include the at least one independently rotatable propeller/fan engine 62. In the FIG. 9 embodiment of the hybrid propulsive engine 100, the at least one rotatable working fluid displacement engine 74 is configured to include the at least one independently rotatable compressor rotor 120. In the FIG. 10 embodiment of the hybrid propulsive engine 100, the at least one rotatable working fluid displacement engine 74 is configured to include the at least one independently rotatable compressor stator 493. In the FIG. 11 embodiment of the hybrid propulsive engine 100, the at least one rotatable working fluid displacement engine 74 is configured to include the at least one independently rotatable turbine stator 477.

As described relative to FIGS. 2, 3, 4, 5, and 8, as well as other locations in this disclosure, certain embodiments of the at least one rotatable working fluid displacement engine 74 configured as the at least one independently rotatable propeller/fan engine 62 can be powered at least partially using the torque conversion mechanism 107. A variety of embodiments of the torque conversion mechanism can be powered or charged responsive to electricity generated by the electric generator that is rotated with the turbine rotatable element. Certain embodiments of the independently rotatable propeller/fan engine 62 can therefore include the at least one independently rotatable propeller/fan assembly 108, an at least one energy extraction mechanism 66, an at least one torque conversion mechanism 107, as well as the at least one independently rotatable propeller/fan 258. Certain embodiments of the at least one independently rotatable propeller/fan 258 (configured respectively as a propeller or fan) can, at least partially, form a respective turboprop engine or a turbofan engine, as generally known in aircraft design and as described in this disclosure in greater detail herein.

Figure 9:
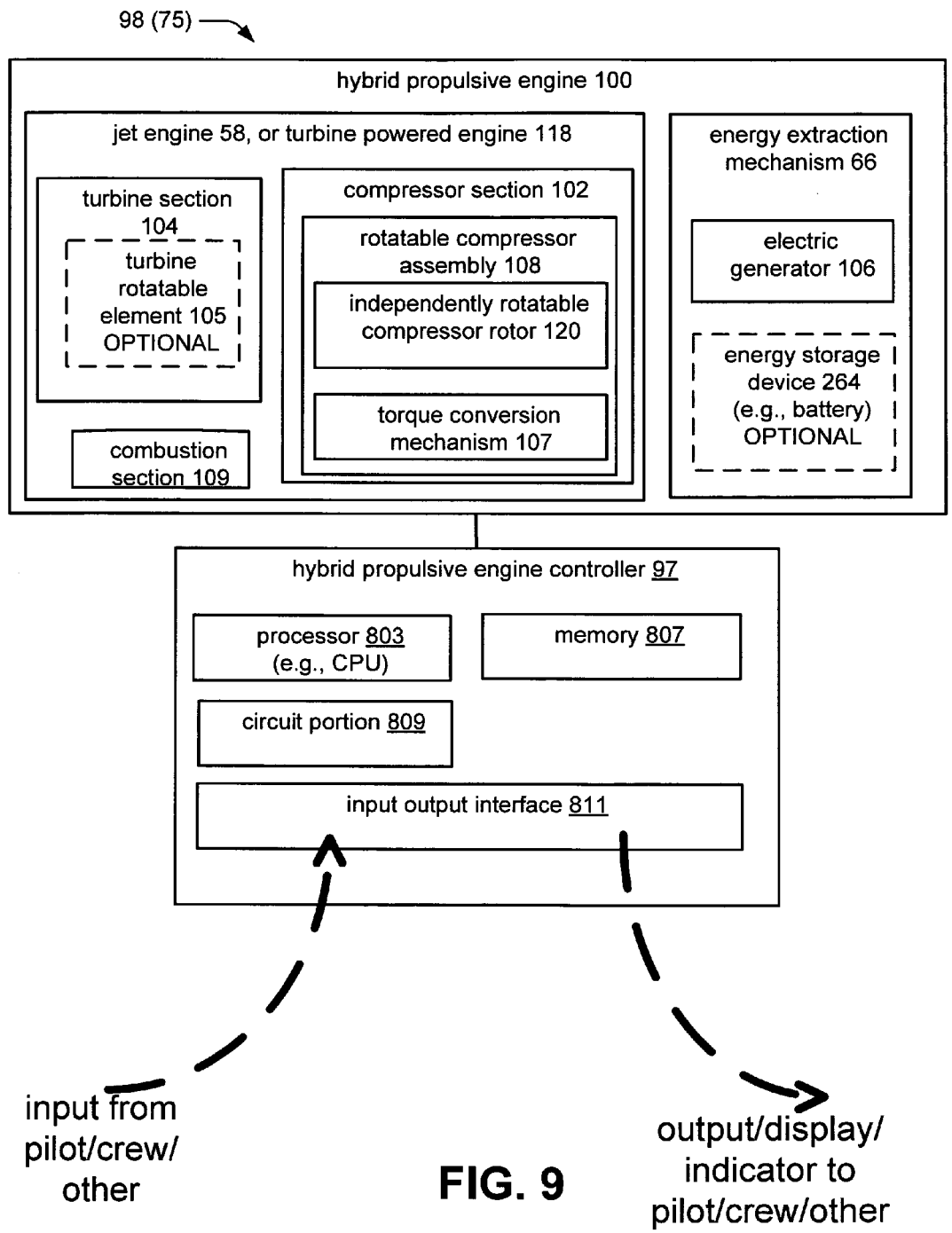
FIG. 9 is a block diagram of an embodiment of the hybrid propulsive engine including an embodiment of the at least one independently rotatable compressor rotor of FIG. 5.

By comparison, as described relative to FIGS. 5 and 9, as well as other locations in this disclosure, certain embodiments of the at least one torque conversion mechanism 107 can be used to drive at least one independently rotatable compressor rotor 120. Certain embodiments of the at least one independently rotatable compressor rotor 120 can thereby be powered at least partially using the torque conversion mechanism 107, as are described later in this disclosure.

Figure 13:
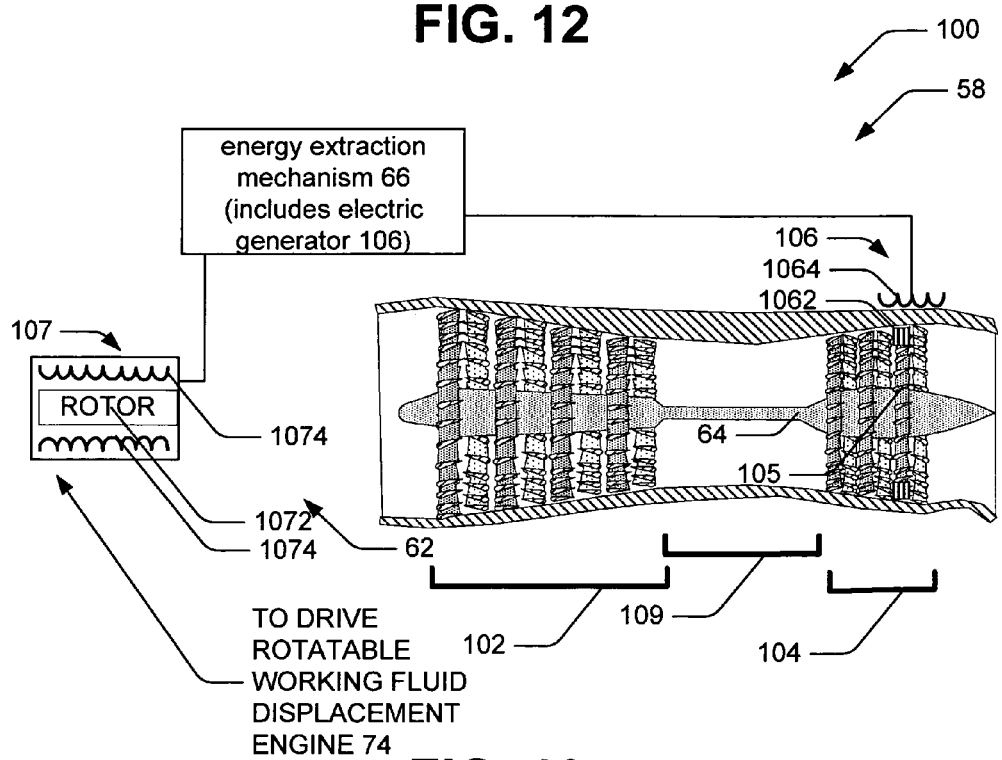
FIG. 13 is a diagram of another embodiment of the hybrid propulsive engine in which the electric generator is used to generate electricity, and the torque conversion mechanism is used to drive at least one of the rotatable working fluid displacement engine.

Additionally, as described relative to FIGS. 6 and 13, as well as other locations in this disclosure, certain embodiments of the at least one torque conversion mechanism 107 can be used to drive at least one independently rotatable compressor stator 493. Certain embodiments of the at least one independently rotatable compressor stator 493 can thereby be powered at least partially using the torque conversion mechanism 107, as are described later in this disclosure.

Figure 11:
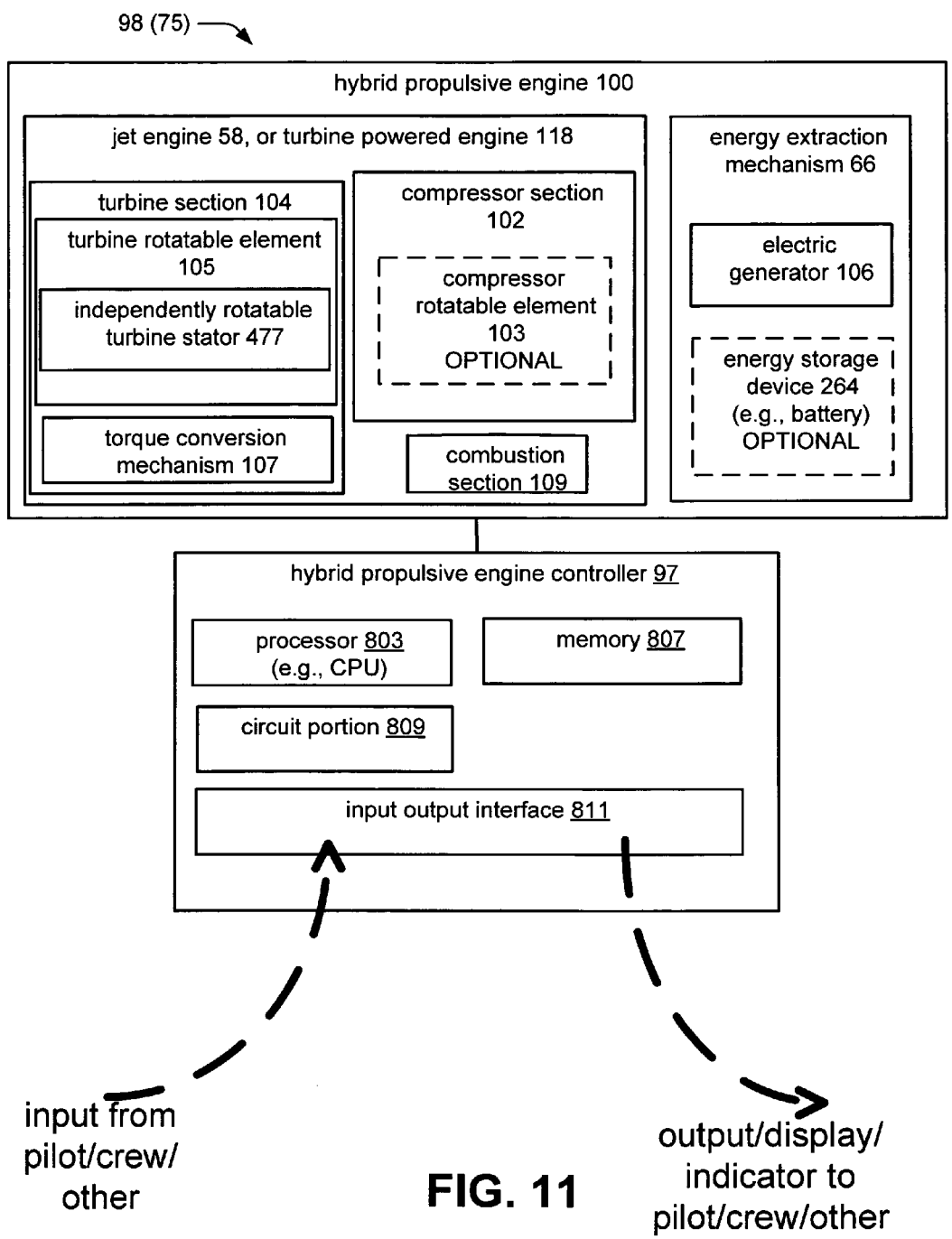
FIG. 11 is a block diagram of an embodiment of the hybrid propulsive engine including an embodiment of the at least one independently rotatable turbine stator of FIG. 7.

As described relative to FIGS. 7 and 11, as well as other locations in this disclosure, certain embodiments of the at least one torque conversion mechanism 107 can be used to drive at least one independently rotatable turbine stator 477. Certain embodiments of the at least one independently rotatable compressor stator 493 can thereby be powered at least partially using the torque conversion mechanism 107, as are described later in this disclosure.

Certain embodiments of the at least one hybrid propulsive engine 100 can thereby utilize the at least one torque conversion mechanism 107 whose electricity supplied thereto is generated at least partially from the energy extraction mechanism 66 that is typically configured as an electrical generator of a variety of configurations, as described with respect to FIG. 2, that extracts electricity in some manner from the at least one jet engine 58. Certain embodiments of the energy extraction mechanism 66 can be configured as described with respect to FIG. 3, 4, or 5 to extract electricity responsive to rotational motion of the turbine rotatable element (e.g., a turbine rotor, a turbine blade, a shaft driven by the turbine rotor, etc.) as described in this disclosure. Alternatively, another turbine that differs from the at least one turbine rotatable element (such as a power generation turbine that may be situated upstream of, downstream of, or fluidly proximate the turbine section) can generate electricity for the torque conversion mechanism 107. Certain embodiment of the torque conversion mechanism 107 can receive electricity generated by magnetohydrodynamics by which electric energy is generated from a flow of working fluid through the at least one jet engine, as described in this disclosure.

Figure 15:
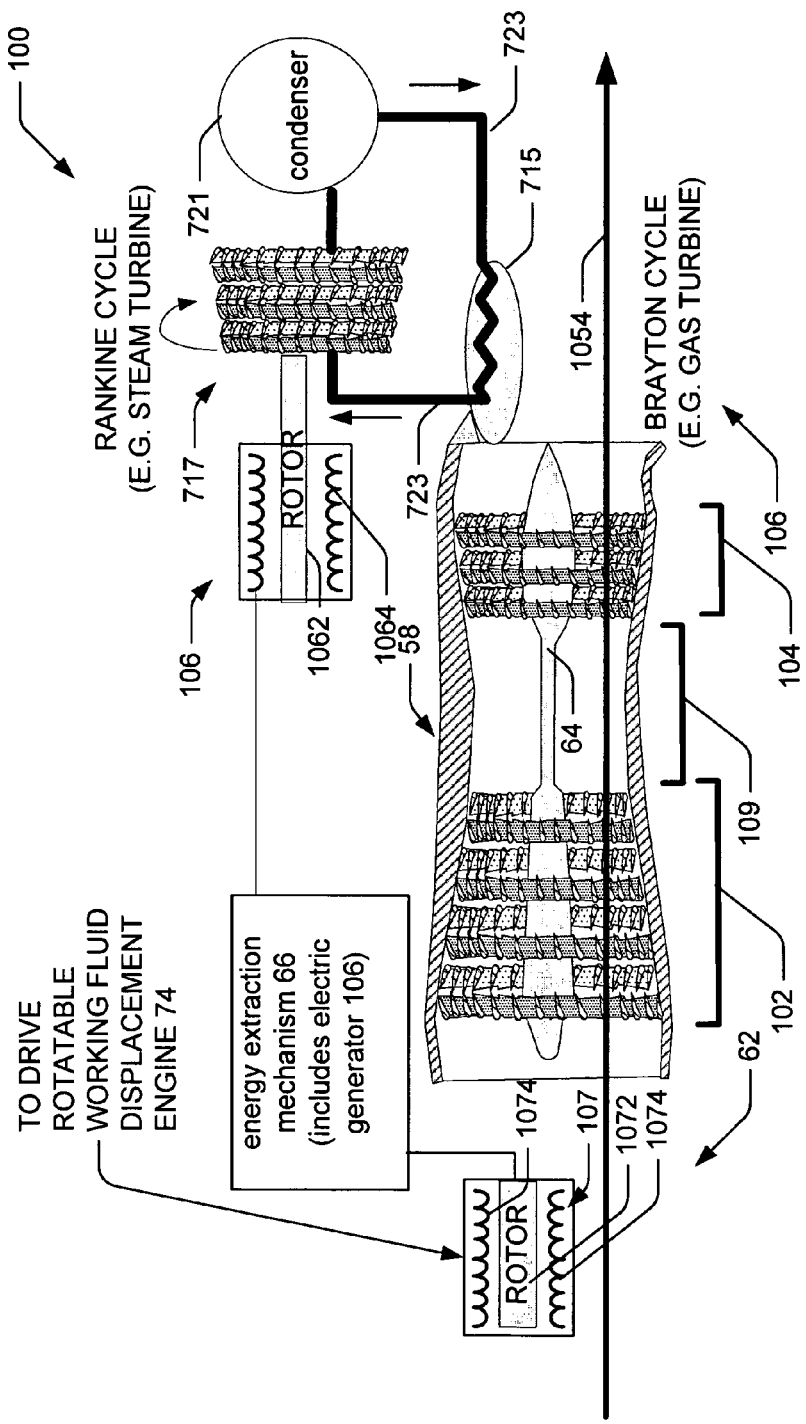
FIG. 15 is a diagram of another embodiment of the hybrid propulsive engine in which a heat engine is used to generate electricity, and the torque conversion mechanism is used to drive at least one of the rotatable working fluid displacement engine.

Yet other embodiments of the torque conversion mechanism 107 can receive electricity generated using a heat engine 717 such as a Rankine engine or steam turbine, as described with respect to FIG. 15. Certain embodiments of the heat engine can operate to generate electricity from heat such as contained in steam. In Rankine engines, as well as other heat engines, electric energy can be generated responsive to heat from a flow of working fluid through the at least one jet engine, as described in this disclosure.

Conventional jet engines have undergone considerable design, performance, and efficiency modification in an effort to improve their operational characteristics, as well as their fuel efficiency. The range as well as performance of many aircraft (or other vehicles) using the jet engines 58 may depend largely on the efficiencies of their jet engine. Increased fuel efficiencies of jet engine(s) 58 in aircraft 75 (or other vehicles 98) typically result in aircraft being able to fly further, faster, and/or less expensively (with less fuel burn), while limiting the amount of unburnt fuel as well as other such undesirable combustion by-product gasses as greenhouse gasses that may be produced by the jet engines that are emitted for the aircraft into the atmosphere. Certain jet engines 58 can consume an immense amount of fuel during their operation, such that fuel represents a considerable expense. In general, efficiency within jet engine design is a major consideration, since generally more efficient engines typically consume less fuel, and discharge fewer emissions and greenhouse gasses into the atmosphere.

Torque conversion mechanisms such as electric motors may have relatively predictable operations, even through a variety of altitudes (such as relatively consistent output rotatable velocities for given electric input) as compared with internal combustion engines. As such, a judicious selection between the at least one jet engines and the at least one torque conversion mechanism can provide for increased power (typically associated with increasing safety of the aircraft as well), as well as increasing efficiency utilizing a variety of hybrid techniques and technologies, as described in this disclosure. The increase in the price of gasoline and aviation fuel, along with the economics of aircraft or jet operation, provides a real threat to the health of the aviation and transportation industries. Certain of such design improvement in at least one jet engines 58 can provide for one or more of: increased speeds for aircraft 75, increased climb-rates for aircraft, improved comfort in aircraft, faster or quicker flights in aircraft, safer or more reliable air travel, air travel at higher altitudes in aircraft, increased fuel efficiencies of the aircraft, and allowing more passengers to travel in certain aircraft as compared with less efficient aircraft.

A variety of embodiments of jet engine designs have been provided for commercial jets, military jets, business jets, as well as general aviation jets, and the newer and existing designs generally are similar in many ways to that described with respect to FIG. 16. Relatively efficient jet engine designs had been recently developed, and are referred to generally as "small jet engines" or "small gas turbines", many of which could be integrated or utilized in certain embodiments of the hybrid propulsive engine 100. Such relatively small jet engines can be used to make a variety of aircraft more powerful, as well as more energy efficient. Due to their relatively small size and/or use of efficient materials, such small jet engines tend to provide for improved fuel efficiency. Certain embodiments of such small jet engines, as well as other sized jet engines, can be configured as hybrid propulsive engines 100 such as to provide increased efficiencies through the various sizes of jet aircraft, as well as applied to the various sizes of aircraft. A variety of certain embodiment of the aircraft 75 may be configured, for example, with one or more turboprop type of at least one jet engine 58 as described with respect to FIG. 3 as well as other locations in this disclosure, or one or more turbofan type of at least one jet engines 58 as described with respect to FIG. 4 as well as other locations in this disclosure. The selection between a turboprop configuration or turbofan configurations may be viewed as a design choice, depending on such factors as the size, weight, desired operating characteristics of the aircraft. The embodiments of the hybrid propulsive engine 100 that are configured as turboprop or turbofan engines may be relatively efficient (consume less fuel) as compared with comparable jet engines operating alone. A variety of conventional, relatively inefficient, jet engine, turboprop, and/or turbofan can have their efficiencies improved by retrofitting them in a manner consistent with the various aspects of the at least one hybrid propulsive engine 100, as described in this disclosure.

In general, turbofans have a ducted enclosure defined by a duct, and the duct can enclose at least part of the jet engine and the fan. Turbofans therefore can have a definable bypass ratio that considers working fluid passing through the fan divided by working fluid passing through the jet engine. In general, increasing the bypass ratio can act to considerably increase the fuel efficiencies of jet engines during such periods as take-off and climb. In certain instances, for example, it is envisioned that the bypass ratio may be greater than or equal to 10.

Comparing the efficiencies of propeller-driven aircraft as compared with jet aircraft (that include turboprop and turbofan that are respectively considered a type of jet aircraft with a respective propeller or fan added); propeller aircraft are typically more efficient at lower altitudes and when traveling a relatively short distances. Jet engines are typically more efficient when traveling at higher altitudes or are traveling relatively long distances such as during cruise. There are a variety of jet engines that have been designed which are configured to operate at lower altitudes more efficiently due to, among other considerations: bypass ratios (as described later in this disclosure). Generally, the bypass ratio defines the mass of working fluid passing through the independently rotatable propeller/fan assembly 258 divided by the mass of working fluid passing through the jet engine 58. As such, a turbofan with a bypass ratio of six, for example, will have six times the mass of air passing through the rotary propeller/fan 258 as the mass of air flowing through the jet engine 58. By comparison, turboprops do have more undeterminable bypass ratios, but the bypass ratio may be considered as the ratio of the mass of air passing through the propeller divided by the mass of air passing through the jet engine 258.

Some percentage of the working fluid being powered by the at least one independently rotatable propeller/fan assembly 108, as described with respect to FIGS. 3 and 4, can be configured to direct the working fluid such as to flow through the at least one jet engine 58. By comparison, some percentage of the working fluid flowing through the at least one independently rotatable propeller/fan assembly 108 can be configured to flow around the at least one jet engine 58, and thereby bypass the internal portion of the jet engine 58 including the at least one compressor section 102, the at least one combustion chamber 109, and the at least one turbine section 104.

There are a variety of conventional turbofans that are being provided with a variety of improved configurations and materials, such as by utilizing relatively large bypass ratios, as described in the article "*Who Says a Jet Can't Be Cheap*", David Noland, Air & Space Magazine, Mar. 1, 2008 (incorporated herein by reference in its entirety). Some of these efficient conventional engines have had difficulty becoming certified and/or being commercially competitive. Additionally, certain conventional jet engines can utilize a variety of materials, ceramics, alloys, etc. to provide relatively efficient operation such as by operating at high temperatures or operating with suitable tolerances as to provide desired pressure differentials. Certain embodiments of propeller driven aircraft may be considered as relatively controllable or responsive (e.g., do not require considerable time for the engine to accelerate) as compared with certain jet engines that require considerable time to spool up, due to the relative weight, and inertia, of the rotatable elements.

Figure 8:
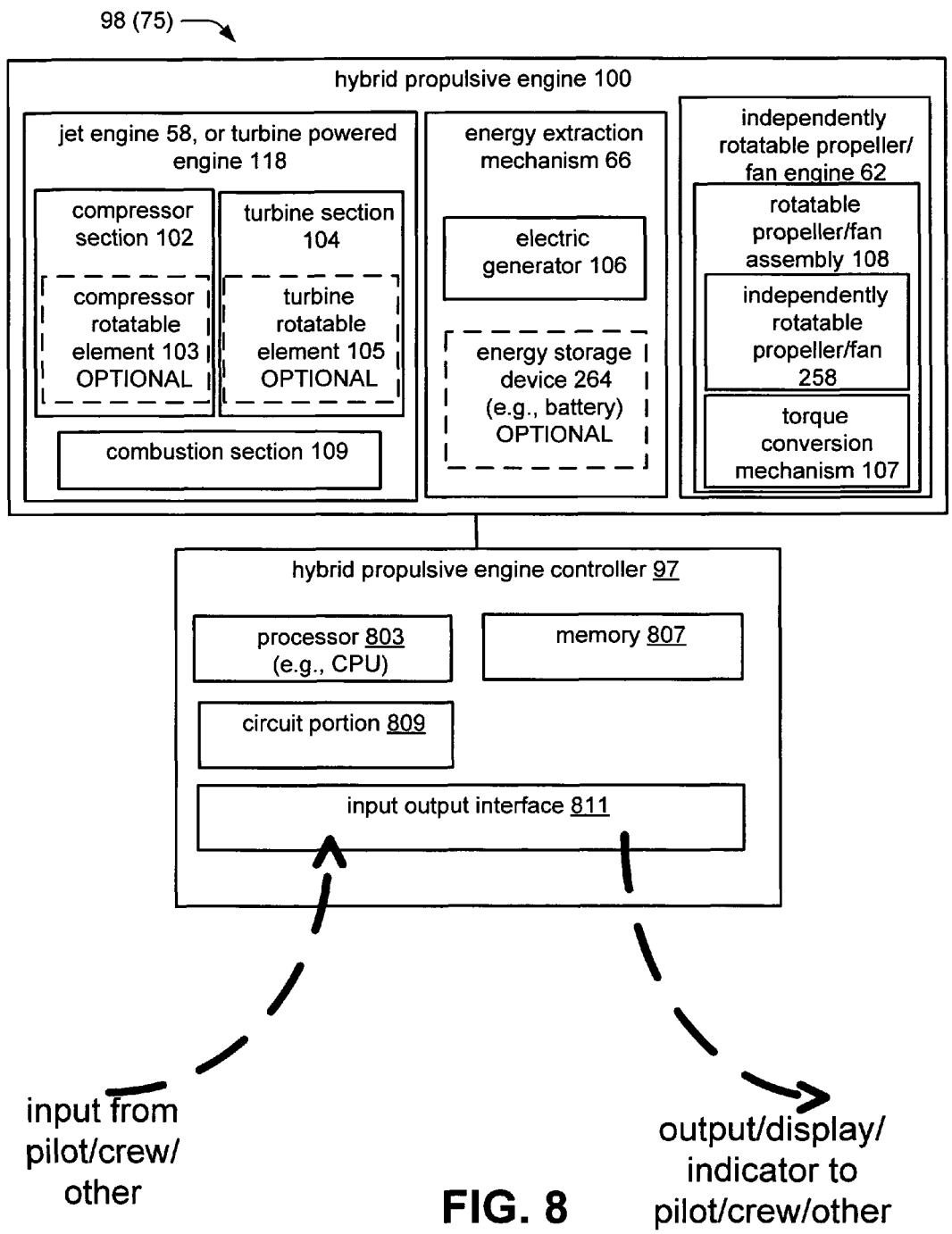
FIG. 8 is a block diagram of an embodiment of the hybrid propulsive engine including an embodiment of the at least one independently rotatable propeller/fan engine of FIG. 4.

Certain embodiments of the at least one hybrid propulsive engine 100 can be configured in block diagram form as described with respect to FIG. 8 in those instances where the torque conversion mechanism 107 at least partially powers rotation of the independently rotatable propeller/fan engine 62 configured as a turboprop or turbofan. Certain embodiments of the at least one hybrid propulsive engine 100 can be configured in block diagram form as described with respect to FIG. 9 in those instances where the torque conversion mechanism 107 at least partially powers rotation of the at least one independently rotatable compressor rotor. Certain embodiments of the at least one hybrid propulsive engine 100 can be configured in block diagram form as described with respect to FIG. 10 in those instances where the torque conversion mechanism 107 at least partially powers rotation of the at least one rotational compressor stator. Certain embodiments of the at least one hybrid propulsive engine 100 can be configured in block diagram form as described with respect to FIG. 11 in those instances where the torque conversion mechanism 107 at least partially powers rotation of the at least one rotational turbine stator.

Certain embodiments of the hybrid propulsive engine 100 may be controlled at least partially using the hybrid propulsive engine controller 97 using a variety of mechanisms and techniques as described in this disclosure. Such controlling techniques by the hybrid propulsive engine controller 97 can depend on such factors as whether there is a pilot, operator, or passengers in the aircraft, the configuration of the aircraft, the preference of the pilot or operator, the sophistication or type of the controls, the level of automation involved in the operation of the at least one hybrid propulsive engine 100, and/or a variety of other design particulars.

FIGS. 17 to 22 show a number of embodiments of certain rotatable or static turbine element configurations of the at least one jet engine 58, as illustrated along sectional lines 1-1 or 2-2 of FIG. 16, as described in this disclosure. FIGS. 23 to 29 show a number of embodiments of certain rotatable or static compressor element configurations of the jet engine 58 as illustrated along sectional lines 3-3 or 4-4 of FIG. 16, as described in this disclosure. The variety of embodiments of the turbine section 104 of the jet engine 58 as described with respect to FIGS. 16 and 17 to 22 provides for receiving at least some of the thrust for the aircraft or other vehicle, such as may be converted into electricity.

In certain embodiments of the at least one jet engine 58, the turbine rotatable elements 105 can provide at least some of the power associated with the rotational motion thereof to generate electricity; such electricity can be used to run the torque conversion mechanism 107 as described with respect to FIGS. 2 to 11. Additionally a variety of additional power providing turbines 714 as described with respect to FIG. 16 can be situated upstream of, downstream of, or proximate to the turbine section 104 such as to generate power. Certain of such additional power providing turbines may not be configured to drive the compressor section 102, as is the case with those turbines included in the turbine section 104.

This disclosure provides a variety of embodiments of the hybrid propulsive engines 100 that can power a rotatable propeller/fan as described, in block form, with respect to FIG. 8. A variety of embodiments of the jet engine 58 can be individually controlled with respect to a variety of embodiments of the independently rotatable propeller/fan engine 62. With certain embodiments of the hybrid propulsion engine 100, the independently rotatable propeller/fan engine 62 can be powered at least partially using an at least one torque conversion mechanism 107.

Certain embodiments of the energy extraction mechanism 66, as described in block form with respect to FIGS. 8 to 11, as well as schematically with respect to FIGS. 2 to 5 as well as other locations in this disclosure, can generate electricity at least partially relying on motion of the at least one rotatable turbine element that moves relative to turbine section 104, motion of another turbine distinct from the turbine section, and/or motion or heat of the working fluid passing at least partially through the jet engine 58. Such embodiments of the at least one energy extraction mechanism 66 can be used to either directly or indirectly generate electricity.

Certain embodiments of the hybrid propulsive engine 100 may generate electric energy (e.g., using the electric generator configured as the energy extraction mechanism 66) of one independently rotatable propeller/fan assembly 108 which is situated to the one location and generate thrust with the jet engine 58 at another possibly separate, distinct location (e.g., the at least one turbine section 104). The thrust generated in the two distinct locations can be relatively controlled in certain embodiments of the hybrid propulsive engine 100. For example, in certain embodiments of the hybrid propulsive engine 100, electric power generation can be provided by a turbo-alternator and/or a thrust-generation at least partially within the at least one independently rotatable propeller/fan assembly 108. Certain embodiment of the energy extraction mechanism 66 can include a provision for including one or more energy storage devices such as batteries, etc., as well as a number of rotatable devices driven by the torque conversion mechanism at a variety of locations relative to the chest engine within the aircraft.

FIGS. 12, 13, 14, and 15 show a variety of embodiments of the energy extraction mechanism 66 (varieties of which may be viewed as electric generators) that can convert varied mechanical energy, kinetic energy, heat energy, etc. into electric energy. Certain embodiments of the energy extraction mechanism 66 (that may include the electric generator), as described with respect to FIGS. 12 and 13, can convert the rotational turbine mechanical energy of the electric generator rotor 1062 (that is rotatably coupled relative to the turbine rotatable elements 105) into electric energy following at least partially through the at least one electric generator winding 1064. With the FIG. 12 embodiment, the electric generator rotor can be rotatably coupled to the shaft 64. Certain embodiments of the energy extraction mechanism 66 that are configured to generate electricity based at least partially on the rotary motion of the turbine rotors 132 are described with respect to FIG. 12, in which the at least one energy extraction mechanism includes a distinct electric generator connected to the shaft, or some other rotatable member. Such energy extraction mechanisms 107 (such as the electric motor) may have to be configured to operate at least partially within the operating conditions of the jet engine, or proximate thereto.

By comparison, in FIG. 13, the electric generator rotor is attached to at least one of the turbine rotatable elements, with the at least one electric generator winding 1064 being positioned in close proximity thereto. Such movement of the magnet at least partially forming the electric generator rotor 1064 may result, for example, from rotation of the turbine rotatable component as described with respect to FIGS. 12 and 13; which can be configured to result in a steady flow of electrons in the electric generator winding 1064. Certain embodiments of the electric generator relies on electromagnetic induction between the at least one electric generator rotors and at least one electric generator winding. Within the electric generator rotor 1064, if the electric conductor of the electric generator winding can be moved relative to (e.g., through) a magnetic field, electric current will flow (be induced) in the conductor of the electric generator winding. As such, the mechanical energy of the moving conductor can be converted into the electric energy of the current that flows in the electric conductor of the electric generator winding.

In certain embodiments of the embodiment of the at least one energy extraction mechanism 66 that is configured to comprise the energy extraction mechanism 66 such as the electric generator 106, the mechanical energy is provided by the working fluid flowing through the jet engine, which in turn can act to turn the turbine, the shaft, as well as the compressor. Considering that Faraday's equations indicate that, moving the conductor through the magnetic field causes electric current to flow in the conductor, which results in electricity being produced. Certain embodiments of electric generators may be configured as a direct current (DC) electric generator that typically has a commutator; or an alternating current electric generator, which typically works without a commutator.

Figure 14:
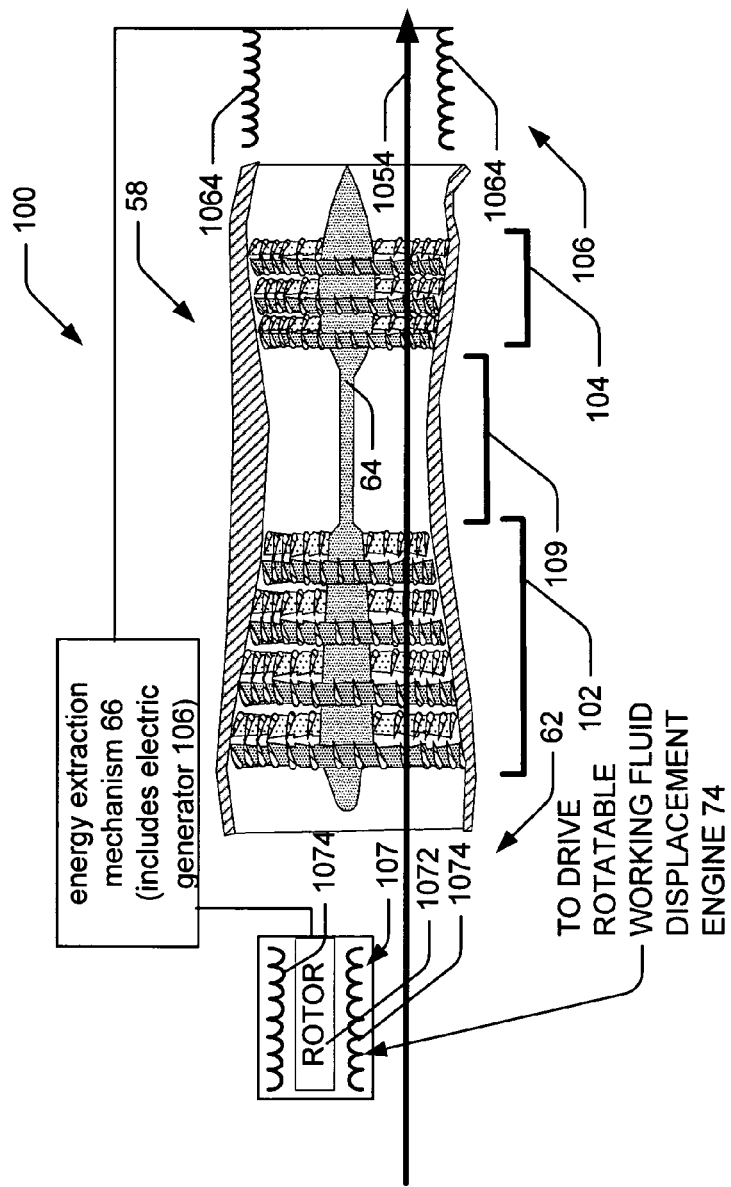
FIG. 14 is a diagram of another embodiment of the hybrid propulsive engine in which the electric generator is used to generate electricity, and the torque conversion mechanism is used to drive at least one of the rotatable working fluid displacement engine.

Certain embodiments of the energy extraction mechanism 66 that may include the electric generator 106 as described with respect to FIG. 14 can convert mechanical kinetic energy of the working fluid 1054 passing through the jet engine 58 into electric energy following at least partially through the at least one electric generator winding 1064. Such techniques of generation of electricity based on movement of a fluid such as air, with certain added ingredients, is referred to generally as magnetohydrodynamics. Certain materials or elements such as Cesium can be applied to the working fluid passing through at least a portion of the jet engine such as to improve the effectiveness of the magnetohydrodynamics.

Certain embodiments of the hybrid propulsive engine 100 can include a heat engine such as a Rankine engine 713, as described with respect to FIG. 15, that can generate energy from the heat of the working fluid exiting the jet engine 58. Such embodiments of the hybrid propulsive engine 100 may be configured as a combined cycle, including the jet engine 58 (a.k.a. Brayton cycle) whose output, heated, working fluid is applied to at least a portion of the Rankine engine 713. Combined cycle engines tend to be highly efficient, since much of the energy loss from the heat contained in the working fluid passing through the jet engine/gas turbine can be regenerated using the Rankine engine/steam turbine. Certain embodiments of the heat engine 713 (e.g., that may be configured as a Rankine engine such as a steam turbine engine) as described with respect to FIG. 15 can include, but are not limited to, a boiler 715, a steam turbine 717, a steam turbine electric motor 719, a condenser 721, and an energy-transfer fluid path 723. Certain embodiments of the boiler 715 transfer the exhaust heat from the jet engine 58 to the energy-transfer fluid circulating about the energy-transfer fluid path 723, thereby causing the heat energy-transfer fluid being applied to the steam turbine 717 to be in the form of steam. Certain embodiments of the boiler 715, the condenser 721, and/or the energy-transfer fluid path 723 can contain an at least one heat receptive fluid such as may be viewed as being contained within an at least one heat engine. Certain embodiments of the heat engine 713 can convert the energy of the steam-form of the energy-transfer fluid into rotational mechanical motion of the steam turbine 717 (e.g. rotors), which can thereby be transferred as rotation of the steam turbine generator rotor 717 (which is subsequently converted into electricity using electric generator techniques). Certain embodiments of the condenser 721 can convert the energy-transfer fluid exiting the steam turbine from its gas form into its liquid form. In certain embodiments of the hybrid propulsive engine 100 relying on the heat engine 713 such as the Rankine cycle, the steam turbine 717 may be relatively small and light, such as sized and configured to retrieve some percentage of the heat energy lost through the working fluid passing through the nozzle.

Figure 12:
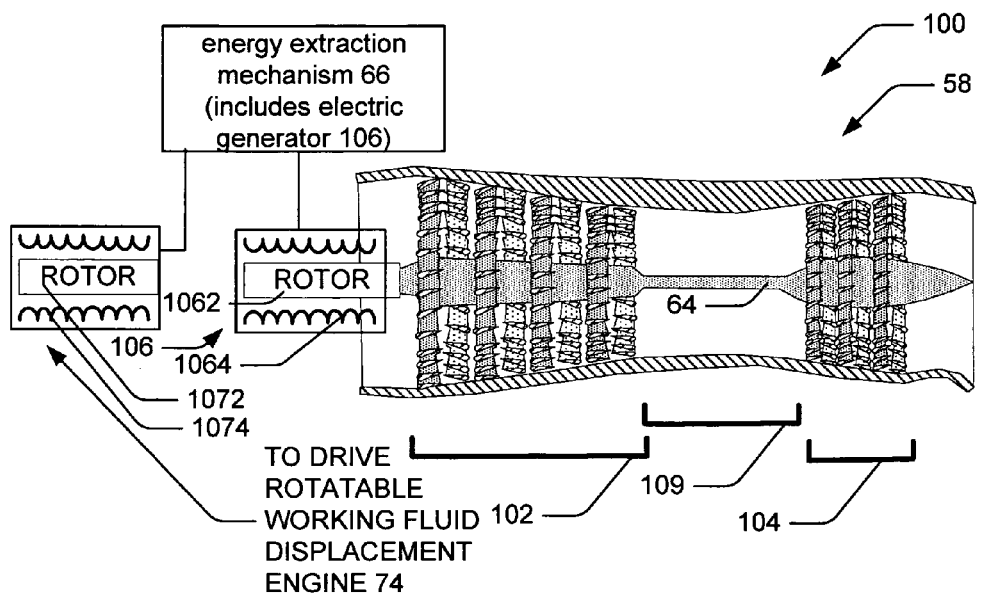
FIG. 12 is a diagram of another embodiment of the hybrid propulsive engine in which an electric generator is used to generate electricity, and the torque conversion mechanism is used to drive at least one of the rotatable working fluid displacement engine.

By moving the at least one magnet associated with the electric generator rotor 1064 and/or the working fluid 1054 of FIG. 12, 13, or 14 near a conductor of the at least one electric generator winding 1064, the magnetic field will cause an electric flow in the conductor as a result of a resultant force on the electrons in the conductor. Certain embodiments of the electric generator can be considered as a device that relies at least partially upon movement of a magnet associated with the electric generator rotor 1064 and/or the working fluid 1054 of FIG. 12, 13, or 14 near an electric conductor of the at least one electric generator winding 1064. Such electric conductor(s) may be integrated in the turbine rotatable element, or may be included in the material applied within the working fluid flowing through or exiting the jet engine 58.

FIG. 12, 13, 14, or 15 therefore illustrate the structure of a variety of illustrative embodiments of the torque conversion mechanism 107 that includes, but is not limited to, at least one motor rotor 1074 and at least one motor winding 1072. Electric current supplied at least partially from the electric generator 106 can be provided (typically via driving electronics 66 that can be used to control the application of the electricity) to rotate the at least one motor rotor 1074. When electric current passes through the at least one motor winding, rotation can thereby be imparted to the at least one motor rotor 1074 (and the connected rotatable structure) using recognized motor techniques.

Figure 10:
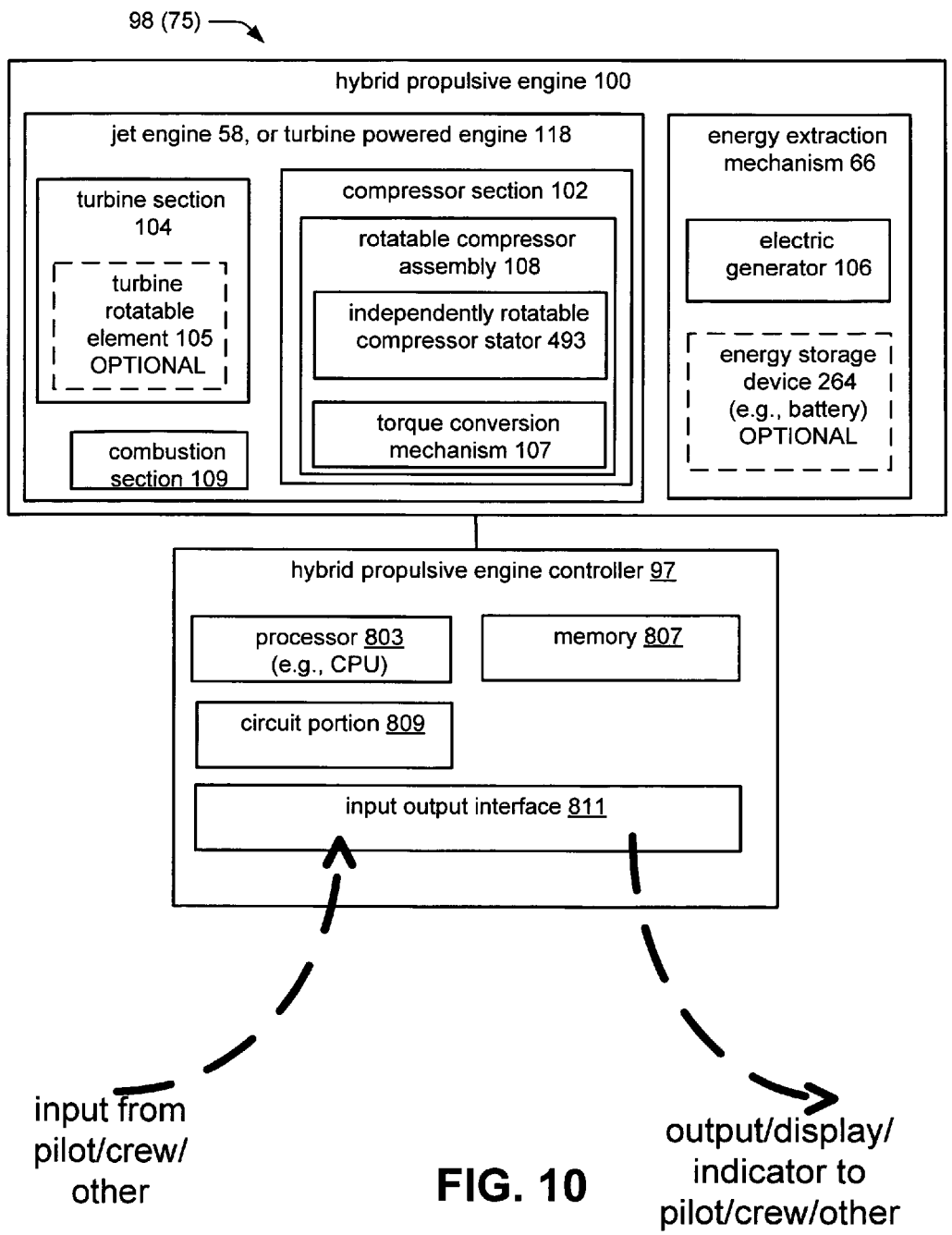
FIG. 10 is a block diagram of an embodiment of the hybrid propulsive engine including an embodiment of the at least one independently rotatable compressor stator of FIG. 6.

The rotation of the motor rotor 1074 of the torque conversion mechanism 107 of FIG. 12, 13, 14, or 15 can thereby be provided to rotate a variety of the at least one independently rotatable propeller/fan 258 as described with respect to FIGS. 3, 4, and 8 and other locations in this disclosure, a variety of the independently rotatable compressor rotors as described with respect to FIGS. 5 and 9 and other locations in this disclosure, a variety of the independently rotatable compressor stators as described with respect to FIGS. 6 and 10 and other locations in this disclosure, or a variety of independently rotatable turbine stators as described with respect to FIGS. 7 and 11 and other locations in this disclosure.

Certain embodiments of the hybrid propulsive engine 100, can therefore include but are not limited to the at least one jet engine 58 (which in certain instances may, or may not, include a turbine powered engine 118), the at least one independently rotatable propeller/fan engine 62, and at least one energy extraction mechanism 66. Certain embodiments of the at least one jet engine 58 as described with respect to FIGS. 3, 4, 9, and 10 and other locations in this disclosure, may be configured to provide a first controllable thrust, motive force, or power to propel the aircraft 75, or other vehicle 98 of FIG. 1 at least partially utilizing power generated by motion of the turbine section 104, by motion of another turbine distinct from the turbine section, and/or by motion of a working fluid passing at least partially through the jet engine 58. Certain embodiments of the at least one independently rotatable propeller/fan engines 62 may be configured to provide a second controllable thrust, motive force, or power to the aircraft 75, or other vehicle 98 at least partially utilized in power supplied from the torque conversion mechanism 107.

Certain embodiments of the jet engine 58, as described in detail with respect to FIG. 16 can include but is not limited to, at least one compressor section 102, at least one turbine section 104, and at least one combustion chamber 109. The working fluid that passes through, and is acted upon, by certain embodiments of the jet engine 58 (as well as certain embodiments of the hybrid propulsive engine 100), may be viewed as the fluid (typically primarily gas and/or liquid) passing through the at least one at least one jet engine 58 and/or the independently rotatable propeller/fan engine 62 that is used to drive the engines 58 and/or 62. Inlet vanes, inlet guides, or inlet blades (not shown) can be positioned upstream of the independently rotatable propeller/fan engine 62 within the jet engine(s) 58 (in turbofans or turboprops) to guide the flow of inlet working fluid to the jet engine such as to a compressor inlet of the compressor section 102. The working fluid may include, but is not limited to: air, which may or may not be mixed with fuel such as aviation fuel or other constituents. The working fluid is accelerated from the turbine to the nozzle. Such accelerating the working fluid from the nozzle chamber 59 tends to reduce the pressure of the working fluid at the nozzle chamber, and the exhaust downstream there from.

Typically, in conventional jet engines, the working fluid passes from the at least one compressor section 102 via the at least one combustion chamber 109, and is thereupon accelerated through the at least one turbine section 104 in which at least one turbine rotatable element is driven by the rushing working fluid. Certain embodiments of the jet engines 58, in general, can establish thrust by effectively applying heat to and/or expanding the working fluid, and thereby forcing or accelerating the working fluid out a nozzle chamber 59 (to the exhaust).

FIG. 16 shows one embodiment of the at least one at least one jet engine 58 that can be operatively controlled to provide a controllable thrust, and which includes, but is not limited to: the at least one compressor portion 102, the at least one combustion chamber 109, and/or an at least one turbine section 104. This progression through the at least one compressor portion 102, the at least one combustion chamber 109, to the at least one turbine section 104 represents the route that the working fluid generally flows through when flowing from the inlet to exhaust through the jet engine 58. During operation, certain embodiments of the at least one jet engines 58 can be configured to act to controllably provide thrust to the aircraft 75 of FIG. 16 utilizing the interaction between (from inlet to exhaust) the at least one compressor section 102, the at least one combustion chamber 109, and the at least one turbine section 104.

Certain embodiment of the at least one compressor section 102 can therefore be configured to compress the working fluid at the inlet within the at least one at least one jet engine 58 to a higher pressure at those regions downstream of the compressor section 102. Following the compression of the working fluid as provided by the compression section, the working fluid can be applied to an at least one combustion chamber 109 at within certain regions of the jet engine downstream of the compressor section 102 (which may, in turn, be in fluid communication with an at least one turbine inlet of the turbine section). Combustion within the at least one combustion chamber 109 typically can takes the form of a substantially continuous process. Working fluid including air and aviation fuel are mixed at a recognized proximate air-fuel ratio of 14:1 at which mixture the operative regions of the combustion chamber 109 can most effectively undergo combustion, but many practical turbine or combustor materials cannot withstand such intense heat on a continuous basis as produced by the approximate air-fuel ratio of 14:1. The air-fuel ratio of approximately 14:1 is also particularly suited to a variety of piston internal combustion engines, as well.

This potential damage resulting to the combustion chamber resulting from the entire combustion chamber undergoing combustion at the same time can be limited, in certain embodiments of design of the combustion chambers 109, by separating the working fluid flowing within the compressor into two or more streams, referred to in this disclosure for illustrative purposes as a primary stream and a second stream. The primary stream may be used to burn the fuel at approximately the most effective (e.g., stoichiometric) air-fuel ratio of approximately 14:1, and the secondary stream is then mixed with the high temperature combustion products from the primary stream to limit the continuous operating temperature within the combustion chamber 109 to below such a high level as to limit damage thereto. This process of mixing the multiple temperature components of the working fluid together can be referred to as "dilution", or alternately "temperature dilution", and is generally understood by those skilled in gas turbine design or jet engine design. Such designing of one or more flows of working fluid the combustion chamber 109 is therefore understood to those skilled in the combustion chamber technologies. This result in a more complete and efficient combustion of the fuel, and the entire mass of compressed air heated evenly to the design operating temperature of the turbine.

Within certain embodiments of the hybrid propulsive engine 100, a fuel such as gasoline, jet fuel, or aviation fuel vaporized within air can therefore be ignited and combusted within the at least one combustion chamber 109. The combustion of the fuel contained in the working fluid within the combustion chamber typically results in an increase in temperature of the working fluid, thereby causing the working fluid to expand and force itself, as expanded working fluid, through the at least one turbine section. As the working fluid expands as a result of the increased temperature, the expanded working fluid therefore is directed at the inlet portion 112 of the at least one turbine section 104 under considerable pressure and temperature. The working fluid, under considerable pressure as well as temperature through desired expansion, forces the working fluid through the blades of the turbine, effectively rotatably driving the at least one turbine rotatable element 105 of the at least one turbine section 104.

Within certain embodiments of the at least one jet engine 58, the at least one combustion chamber 109 is in fluid communication with an inlet portion 112 of the at least one turbine section 104. Certain embodiments of the at least one combustion chamber 109 can be configured to ignite fuel that is air to form the working fluid, to expand, heat, and provide sufficient energy to cause the working fluid to be forced through the turbine section with sufficient velocity to accelerate at least one turbine rotatable elements 105 (including turbine rotors, turbine rotor blades, etc.) that may be situated in or associated to the at least one turbine section 104. Certain embodiments of the combustion chamber may include an igniter or combustor (not shown in any great detail, but generally understood by those skilled in the associated technologies). The purpose of the combustion chamber 109 is therefore to apply fuel into the working fluid to the desired mixture and then ignite, combust, and maintain combustion involving the combustible components (e.g., jet fuel, aviation gas) of the working fluid to cause expansion of the working fluid as being applied to an at least one turbine rotatable element(s) 105.

Figure 17:
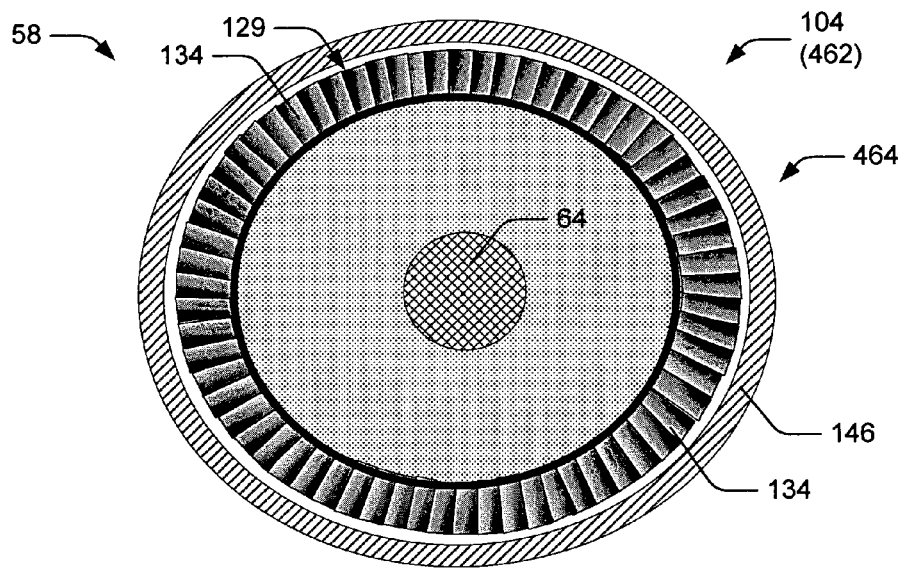
FIG. 17 is a cross-sectional view of one embodiment of a turbine rotor of the jet engine as taken along sectional lines 1-1 of FIG. 15.
Figure 18:
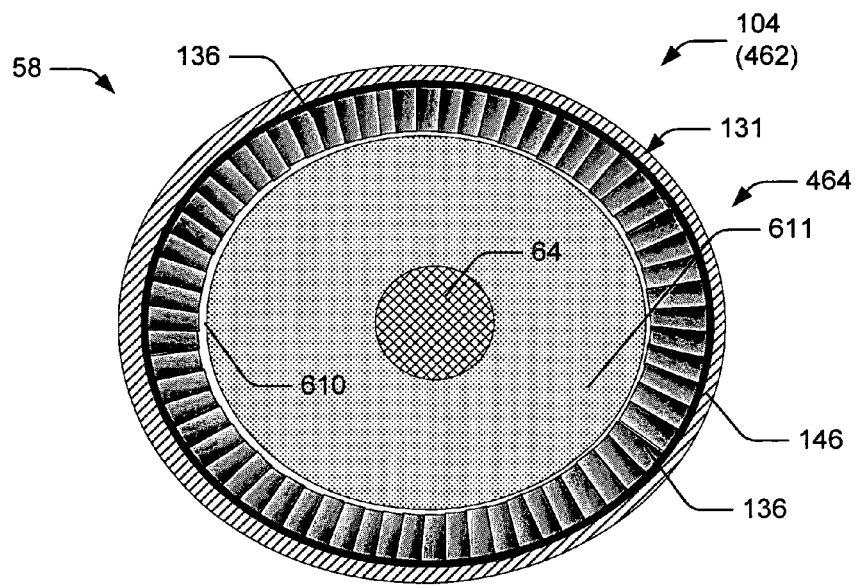
FIG. 18 is a cross-sectional view of one embodiment of the turbine stator of the jet engine as taken along sectional lines 2-2 of FIG. 15.

Certain embodiments of the at least one turbine rotatable elements 105 that can be configured to include the at least one turbine rotor assembly 129 of FIG. 17, that in turn can include the at least one turbine rotor 130 as well as the associated turbine rotor blades 134. Gas turbines in general, and jet engines 58 in particular, operate by rotation of the at least one turbine rotatable elements 105 that can be configured to include the at least one turbine rotor assembly 129 of FIG. 17 thereby also rotate with the shaft 64, and often the independently rotatable compressor rotor assembly 155 of FIG. 23.

As described in this disclosure, in certain embodiments of the at least one hybrid propulsive engine 100, rotation of the turbine rotatable element 105 and/or the shaft 65 utilizing the energy extraction mechanism 66 as described with respect to FIGS. 8-11, and 12-15 can be used to generate electricity utilizing generally understood electric generation techniques and mechanisms. In certain embodiments of the at least one hybrid propulsive engine 100, electricity can be generated based at least partially on utilizing energy contained fluid passing through the at least one jet engine 58. In certain embodiments of the at least one hybrid propulsive engine 100, electricity can be generated based at least partially on a combination of utilizing energy contained fluid passing through the at least one jet engine 58 and rotation of the turbine rotatable element 105, and/or the shaft 65, utilizing generally understood electric generation techniques and processes.

Certain nervous aircraft passengers may ask what happens to the aircraft if the engine stops running. While the probability of this happening is exceedingly small, it is highly desirable in aviation, as well as many vehicular systems, to provide back-up for critical systems (such as propulsion systems) where practical. In addition, redundant systems are viewed as enhancing reliably in certain aviation systems such as to ensure they operate well during normal operation. With certain embodiments of the hybrid propulsive engine 100, certain embodiments of the independently rotatable propeller/fan engine 62 can continue to operate even if an associated one or more of the jet engine 58 is inoperative, broken, or shut down (providing the remaining jet engines can support flight of the aircraft. Weight is also a factor in aviation, such that things which add too much weight to an aircraft (depending on the type of aircraft, capabilities of jet engines, etc.) can affect the flight characteristics, and even the ability for an aircraft to fly. Torque conversion mechanisms tend to be relatively light for a given power, and there is no need for heavy fuel, as well as weight heavy shafts, etc.

This disclosure describes certain embodiment of the at least one hybrid propulsive engine 100 that can be configured such that a portion (e.g., a independently rotatable propeller/fan engine 62) can continue to operate even if one or more jet engine fails, for a duration that may be relatively brief such as to allow for maneuvering, flight for particular distances, landing, approaches, climbing, etc. The more powerful and longer lasting which the combination of the energy storage device and the torque conversion mechanism are, the more could be expected to assist with the propulsion of the at least one hybrid propulsive engine 100, as described in this disclosure.

Additionally, certain embodiments of the torque conversion mechanism 107 can provide for a variety of desirable operations, such as they may operate relatively consistently through a variety of altitudes. Conventional piston engines, for example, loose a considerable amount of their power as the aircraft climbs to higher altitudes, such as 5,000 to 20,000 feet. Such reduction of performance of the piston engines may be considered a design limitation. Certain jet engines may be relatively inefficient during climb-out. By comparison, certain embodiment of torque conversion mechanisms, as described in this disclosure relating to certain embodiments of the hybrid propulsive engine 100, cannot lose their performance at such a rapid rate with a climb in altitude.

As described with respect to FIG. 16, and other locations in this disclosure, the at least one jet engine 58 can include at least one turbine section 104 which is rotatably driven by high temperature and pressure working fluid forcing its way from the combustion chamber 109, via the turbine section 462, to the nozzle 59. Each turbine section 104 includes at least one turbine 462, each of which is arranged with one or more turbine stages 464. During operation, the pressure of the working fluid situated adjacent to each turbine stage 464 diminishes from those turbine stages situated adjacent the turbine inlet 112 to those turbine stages situated adjacent the nozzle or exhaust portion 59.

The turbine includes a number of turbine stages 464 arranged in series. Each of the one or more turbine stages 464 can, depending on context, include a turbine rotor assembly 129 interspaced with a turbine stator assembly 131. Certain embodiments of the turbine rotor assembly 129 is typically substantially fixedly mounted to, and rotates as a unit with, at least a portion of the shaft 64 about which the at least one turbine 462 is operationally situated. Certain embodiments of the turbine rotor assembly 129 as described with respect to FIG. 16 can include, but is not limited to, a turbine rotor 130 and a number of turbine rotor blades 134. Certain embodiments of the at least one turbine rotor blades 134 are fixedly mounted about (and extend radially from) a peripheral surface of the turbine rotor 130, which in turn is fixedly mounted to the shaft 64. With certain embodiments of the jet engine 58, a space is provided between the jet engine casing 146 and an outer surface of the turbine rotor blades 134, as described with respect to FIGS. 16, 17, and 22.

Certain embodiment of the at least one turbine 462 are therefore typically formed with a series of turbine stages 464 including the turbine rotor assembly 129 as described above with respect to FIGS. 16, 17, and 22, and the turbine stator assembly 131 as described in this disclosure with respect to FIGS. 16 and 18 to 22. Each turbine rotor assembly 129 is typically respectively arranged as a turbine rotor 130 having a series of substantially radially extending turbine rotor blades 134 extending there from. Each turbine stator assembly 131 as described in this disclosure with respect to FIGS. 16 and 18 to 22 is typically respectively arranged as the turbine stator 132 with a series of substantially radially extending turbine stator blades 136 mounted to and extending radially relative to the jet engine casing 146 (or a mounting member secured thereto). In general, at least some turbine rotor assemblies 131 including the turbine rotors 130 (along with the associated turbine rotor blades 134) are fixedly attached, and can be configured to rotate with one or more shafts 64. As such, the turbine rotors can be substantially concentric and rotatable about an axis substantially aligned with one or more shafts 64. By comparison, the at least one turbine stator assembly 130 including the turbine stators 132 (along with the associated turbine stator blades 136) remain substantially fixed relative to the jet engine casing 146 of the at least one turbine 462 and can, but do not have to be, substantially concentric about the axis substantially aligned with the at least one shaft 64.

There are a variety of configurations of the turbine stator assembly 131, certain of which are described with respect to FIGS. 16 and 18 to 22. Considering the FIG. 18 embodiment of the turbine stator assembly 131, a circular space 610 may be situated between the at least one turbine stator blades 136 and a stator member 611. The stator member 611 in this embodiment typically rotates with the shaft 64, and certain embodiment may be attached to, or form a portion of, the turbine rotor 130. The circular space 610 in actuality is considerably smaller than shown in the figures, since it is desired to allow rotation between the adjacent members while limiting the amount of working fluid passing there through while providing relative rotation there between. The circular space 610 is thereby in certain instances configured to allow the stator member 611 to move relative to the at least one turbine stator blades 136. In certain instances, the stator member 611 as described with respect to FIG. 18 may be configured to axially space and support (the axis taken in a direction parallel to the shaft) adjacent turbine rotors 130, as described with respect to FIGS. 16 and 18. By positioning the at least one turbine stator blades 136 relative to the at least one relatively rotating turbine rotor blades 134, sufficient working fluid flowing through the turbine section 104 can provide for relative motion of the turbine rotor assembly 129 relative to the turbine stator assembly 131.

Figure 19:
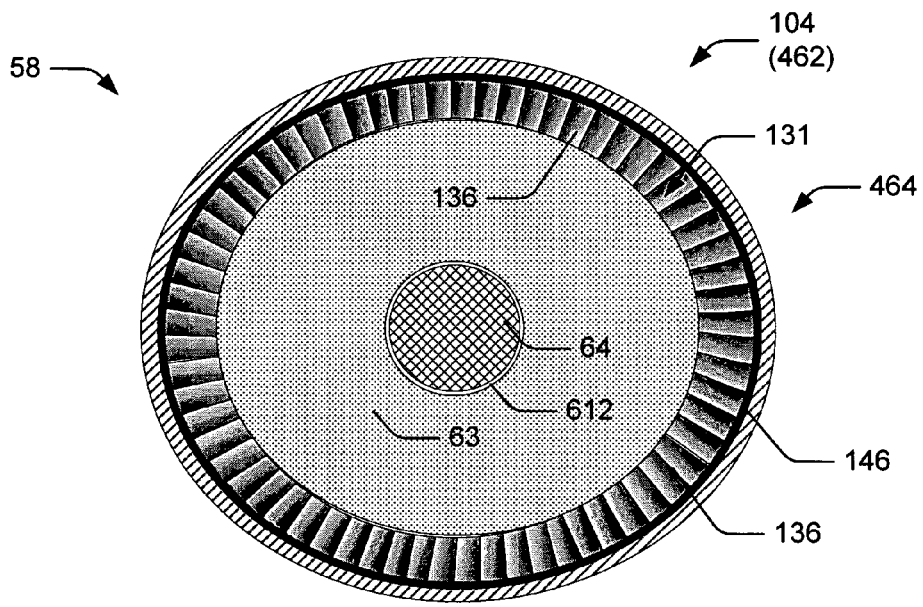
FIG. 19 is a cross-sectional view of another embodiment of the turbine stator of the jet engine as taken along sectional lines 2-2 of FIG. 15.

Considering the FIG. 19 embodiment of the turbine stator assembly 131, a space 612 can be situated between a stator member 613 mounted to the at least one turbine stator blades 136 and shaft 64. A seal, bearing, or other member may be integrated within the space 612. Certain embodiments of the stator member 613 can remain stationary with respect to, and one or more mounting members (not shown) may be used to mount the turbine stator blades 136 relative to the jet engine casing 146. Certain embodiments of the hybrid propulsive engine 100, the turbine stator blades 136 may be attached to, or form a portion of, the jet engine casing. The space 612 thereby allows the shaft to rotate within the stationary stator member 613, and does not allow too much working fluid to pass there through. In certain instances, the stator member 613 as described with respect to FIG. 19 may axially spaced from adjacent turbine rotors 130, as described with respect to FIGS. 16 and 17. By positioning the at least one turbine stator blades 136 relative to the at least one relatively rotating turbine rotor blades 134, sufficient working fluid flowing through the turbine section 104 can provide for relative motion of the turbine rotor blades 134 of FIG. 17 relative to the turbine stator blades 136 of the turbine stator assembly 131.

Within this disclosure, certain turbine stators are actually configured to rotate with respect to both turbine rotors, and the hybrid propulsive system 100 itself. Certain embodiments of the turbine stators that are configured to rotate are arranged as an at least one independently rotatable turbine stator 477 that can be configured to rotate working with respect to the jet engine casing 146 are described with respect to FIGS. 20 and 21. Such rotation of the at least one independently rotatable turbine stator 477 with respect to both proximate turbine rotors, and the hybrid propulsive system 100 itself, may lead to increased efficiency since rotation of certain independently rotatable turbine stators, at certain (e.g., desirably controllable) rotational velocities, relative to certain turbine rotors might result in less turbulence of the working fluid flow passing through the turbine section of the jet engine 48. Certain embodiments of the at least for the at least one independently rotatable turbine stator 477 can be mounted to rotate on one or more bearings 479 (e.g., typically a number of bearings). Within this disclosure, the term "independently rotatable turbine stator" indicates a member of the can rotate and/or be driven, and is positioned adjacent to turbine rotors and is configured to fluidly interact such as to redirect the working fluid such as to act as a stator. Certain embodiment of the at least one independently rotatable turbine stator 477 can be configured to rotate about one or more bearings 479 situated about an outer periphery of the independently rotatable turbine stator 477 as described with respect to FIG. 20. By comparison, certain embodiment of the independently rotatable turbine stator 477 configured to rotate about one or more bearings 479 situated about an inner periphery of the independently rotatable turbine stator as described with respect to FIG. 21.

Figure 20:
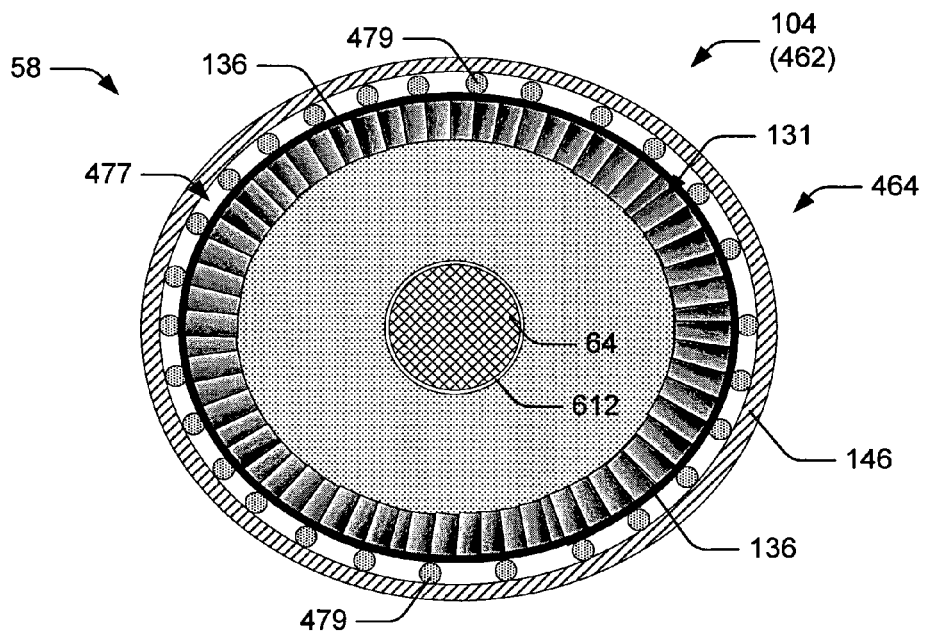
FIG. 20 is a cross-sectional view of an embodiment of a independently rotatable turbine stator of the jet engine as taken along sectional lines 2-2 of FIG. 15.
Figure 21:
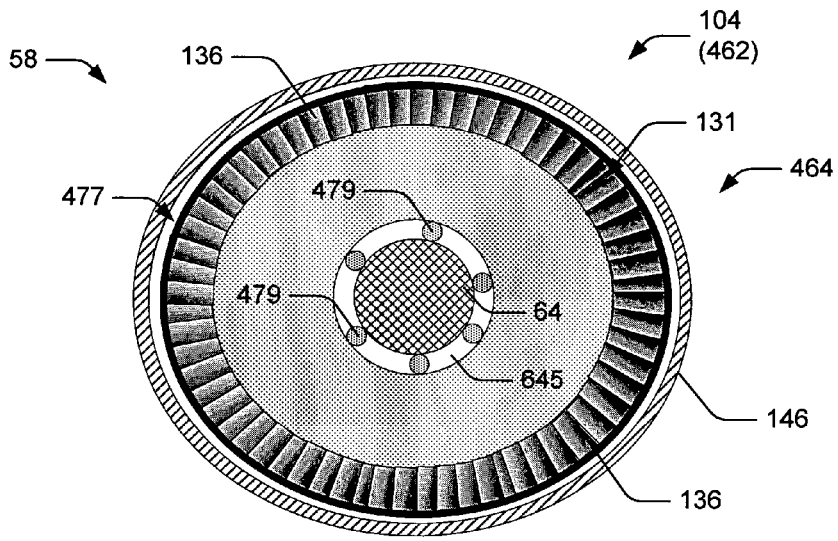
FIG. 21 is a cross-sectional view of another embodiment of the independently rotatable turbine stator of the jet engine as taken along sectional lines 2-2 of FIG. 15.

Certain embodiments of the at least one independently rotatable turbine stator 477, as described with respect to FIGS. 20 and 21, may be configured to operate as a rotatable turbine element, such as may be driven by the torque conversion mechanism. As such, the at least one independently rotatable turbine stator 477 may be precisely driven at a precise rotational velocity (e.g., number of RPMs), such as may be appropriate to control driven shaft or turbine rotational velocity. Certain embodiments of the independently rotatable turbine stator 477 can also be configured to brake or position the turbine rotatable element such as by selectively controlling electric polarities as applied to the at least one independently rotatable turbine stator 477.

While certain embodiments of the at least one at least one jet engine 58 as described with respect to FIG. 16 can include one shaft 64 that rigidly affixes the independently rotatable compressor rotors 120 (including the respectively affixed compressor rotor blades 124) and the turbine rotors 130 (including the respectively affixed turbine rotor blades 134), in a manner to facilitate rotation of these members about the shaft 64 along with the rotating shaft, as the shaft rotates. Certain embodiments of the compressor stators 122 can be attached to a spacing member, and the compressor stators can be arranged with a number of compressor stator blades 126. Certain embodiments of the turbine stators 132 can be arranged with the turbine stator blades 136. Certain embodiments of the at least one jet engine 58, as described with respect to FIG. 16, can be used to drive a propeller for a turboprop, or a fan for a turbofan, using a shaft 64 that may, depending on context, be subdivided into one or multiple shafts. Each one of the multiple shafts may be configured to drive one or more portions of the hybrid propulsive engine 100 including at least a portion of the turbine rotatable element 105 of the turbine section 104, as described with respect to FIGS. 8, 9, and 16.

Certain embodiments of at least some of the turbine rotors, turbine stators, and rotational turbine stators as well as compressor rotors, compressor stators, and rotational compressor stators may be arranged to rotate about the shaft 64, or certain portions of the shaft, in a variety of configurations. Certain embodiments of the shaft 64 may be subdivided, for example, into multiple shafts or sections that can be concentrically mounted relative to each other such as to provide for relative rotation between the different shaft portions, as well as the members rigidly affixed to each of the different shaft portions. The relative rotation can also be provided between multiple shaft sections relative to the vehicle 98 such as the aircraft 75. For instance, one shaft section may mechanically connect a high pressure turbine section (e.g., turbine rotors that are proximate the combustion chamber, and therefore to the left of the at least one turbine section 104 as shown in FIG. 16) with one or more of the compressor sections 102. Such multiple shaft sections can therefore allow for "dual spooling" and/or "multiple spooling", wherein different portions of the hybrid propulsive engine 100 can start up individually at varied rotatable velocities and at least some portions of the rotary propeller fan 258 as with FIGS. 3 to 5, the rotatable compressor element 103, or even other rotatable members can be driven at different rotatable velocities and/or directions from different rotatable turbine elements 105, (or other rotatable members such as are driven). For example, the compressor rotatable element 103 can rotatably rotate independently from, and at varied rotational velocity ratios relative to, the rotary propeller/fan 258.

For a shaft having a given power being applied thereto, as the weight and/or moment of inertia of the rotary members attached to shaft decreases, the spooling time for that shaft will increase, and vice versa. Spooling only a few of at least some of the compressor rotatable elements 103 (with lesser total moment of inertia) via the shaft from the turbine rotatable elements 105 (and not the rotary propeller fan 258) may be desired since this may provide for quicker acceleration during start-up and acceleration of the jet engine. Additionally, it may require less energy to continue rotating fewer portions of the compressor rotatable element 103, such as may have less total moment of inertia.

Certain embodiments of the hybrid propulsive engine 100 can act to accelerate the rotary propeller fan 258 of the at least one independently rotatable propeller/fan assembly 108 associated with the turbojet or turboprop assembly at least partially using the torque conversion mechanism 107. Therefore, since less mechanized structure associated with the at least one jet engine that is connected to the shaft (and is not derived by the torque conversion mechanism) can be rotatably accelerated during startup and spooling. The initial rotatable members that are initially driven during start-up typically include compressor rotatable members, such as allow the working fluid pressure to build up within the jet engine. The starting and accelerating of the initial portion of the jet engines 58 can typically be done quicker and with less energy than to start and accelerate all the rotatable elements as with many conventional turbojet or turboprop assemblies (even if certain of such rotatable members are driven via a gear ratio such as can provide for relative rotation there between at a fixed ratio of rotatable velocities).

Within turboprop or turbofan engines, not all the working fluid that passes through the at least one independently rotatable propeller/fan 258 also passes through the jet engine associated with (e.g., collinear with) the at least one independently rotatable propeller/fan. Those working fluids that pass through the at least one independently rotatable propeller/fan 258 that do not pass through the jet engine 58 may be equated a passing through the bypass portion 144 associated with that jet engine. This disclosure describes a variety of embodiments of bypass portion(s) 144, associated with the at least one jet engines 58, which may be, depending on context and configuration, be formed at least partially outside of a jet engine casing 146 of the at least one jet engine 58 as described with respect to FIGS. 16 to 29. The bypass portion may be particularly utilized in those embodiments of the hybrid propulsive engine 100 including the jet engine 58 and the independently rotatable propeller/fan engine 62, such as with turboprops or turbofans, or alternately certain embodiments of the hybrid propulsive engine 100, as described in this disclosure.

The bypass portion 144 may be configured such that only some percentage of the air and/or working fluid that flows through the at least one independently rotatable propeller/fan 258 of the independently rotatable propeller/fan engine 62 continues through the at least one jet engine 58 (indicated by arrows 54), while some percentage of the air and/or working fluid that flows through the at least one independently rotatable propeller/fan 258 of the independently rotatable propeller/fan engine 62 continues through the bypass portion 144 (indicated by arrows 56), and is not worked on by the at least one compressor section 102, the combustion portion 109, and/or the at least one turbine section 104 of the at least one jet engine 58. In turbofan embodiments of the at least one hybrid propulsive engine 100 including the at least one jet engine 58 and the independently rotatable propeller/fan engine 62, the bypass portion 144 may, depending on context, be formed between the jet engine casing 146 as described with respect to FIG. 16 and a turbofan casing 148 as described with respect to FIGS. 33 to 36, and other locations in this disclosure. In turboprop embodiments of the at least one hybrid propulsive engine 100 including the jet engine 58 and the independently rotatable propeller/fan engine 62, the bypass portion 144 may, depending on context, be formed outside of the jet engine casing 146.

The at least one jet engine 58 is thereupon operated, during spooling and during continued operation, such that the working fluid is being accelerated out of the nozzle 59, at a continually increasing velocity as indicated by the jet engine working fluid flow 54, results in the pressure at the nozzle 59, and adjacent thereto which forms at least part of the exhaust of the at least one jet engine 58, being reduced considerably (according to Bernoulli's equation where pressure of a working fluid is reduced based on an increased working fluid travel).

To accelerate at least one of the jet engines 58 more quickly during spooling, etc., in any desire to limit the inertia and/or mass being accelerated. Consider, for example, only the compressor are only a portion of the compressor might be accelerated during spooling (and not the propeller or fan). Certain embodiments of the hybrid propulsive engine 100 as described with respect to FIGS. 1 and 2 can include either the prime shaft 64 being configured as described with respect to FIG. 16, and other locations in this disclosure, to provide single-spooling operation; or alternately can include multiple shafts which can provide for dual spooling. In certain embodiment of the hybrid propulsive engine 100, the turbines rotatable element 105 can accelerate one or more compressor rotatable elements 103 during the first spooling. The first spooling in the hybrid propulsive engine 100 (during multiple spooling) can, depending on context, result in rotatable acceleration of the at least one compressor section 102, which is generally understood to be performed during the initial start-up phase of the at least one jet engine 58. Such first spooling can thereby reduce the pressure to the jet engine working fluid flow 54 at the nozzle 59 and exhaust regions he used at least partially to provide the first spooling (due to combustion and compression of the working fluid).

As the at least one jet engine 58 continues to rotatably accelerate during the initial or first spooling, the working fluid is being accelerated as indicated along the working fluid lines 54 at increasingly greater velocities, thereupon a secondary spooling begins by which certain of the torque conversion mechanism and/or certain of the at least one turbine section 104 (e.g., lower pressure rotor(s)) start to accelerate such as by charging the energy storage device 264 receiving electricity from the energy extraction mechanism 66 as described with respect to FIGS. 8 to 11, and upon the charging of the energy storage device 264 receiving electricity from the energy extraction mechanism 66, the torque conversion mechanism 107 can accelerate the at least some rotatable compressor portions as described with respect to FIGS. 9 and 10, the at least one independently rotatable propeller/fan 258 as described with respect to FIG. 8, and/or the at least one independently rotatable turbine stator 477 as described with respect to FIG. 11.

By charging the energy storage devices 264 in this manner, the rotational velocity of the at least some rotatable compressor portions as described with respect to FIGS. 9 and 10, the at least one independently rotatable propeller/fan 258 as described with respect to FIG. 8, and/or the at least one independently rotatable turbine stator 477 as described with respect to FIG. 11 can thereby be increased as a result of power provided by the at least one torque conversion mechanism. This second spooling by accelerating certain embodiments of the compressor rotatable element and/or certain of the at least one independently rotatable propeller/fan 258 may be enhanced by the turboprop/turbofan working fluid flow 56 being accelerated to fill the low pressure region of the nozzle 59, as well as the exhaust downstream thereof.

As a result thereof, the acceleration of the compressor rotating elements 103 as well as the turbine rotating elements 105 of the jet engine 58 of the hybrid propulsive engine 100 can thereby increases the flow-rate of the working fluid (and thereby increases the velocity of the working fluid) through the nozzle and exhaust areas of the jet engines. Since the increase in velocity of the working fluid through the nozzle and exhaust areas of the jet engines acts to reduce the pressure of the working fluid at the nozzle and exhaust areas of the jet engines, such reduction of pressure at the nozzle and exhaust areas of the jet engines can additionally accelerate the working fluid through the at least one independently rotatable propeller/fan 258 towards the nozzle and exhaust areas of the jet engines, thereby additionally partially accelerating the flow of working fluid through the at least one independently rotatable propeller/fan 258 through the at least one bypass portion 144.

Certain embodiments of the hybrid propulsive engine 100 can be quite efficient since the rotatable components associated with the first spooling may require less inertia during starting and/or spooling than the conventional turboprop or turbofan engines; and the first spooling that is powered at least partially by working fluid passing through the turbine rotatable element 105 therefore involves less inertia, and such first spooling may therefore be performed more quickly in many cases. In certain instances, the second spooling can be powered by some combination of working fluid flowing through the turbine (particularly the turbine section), and/or the torque conversion mechanism powering certain embodiments of the at least one independently rotatable propeller/fan 258 and/or certain embodiments of the at least certain compressor rotatable elements 103. Such dual-spool techniques can generally allow for quicker acceleration of at least some of the jet engines 58 and/or the at least one independently rotatable propeller/fan 258 during the first spooling since fewer members (and presumably less inertia associated with all the members) have to be accelerated as a result of during the acceleration of the turbine, while some of the members that are not spooled in the first spooling may be accelerated by the torque conversion mechanism 107 (which should ease start-up of the jet engines, turbofans, or turboprops).

For example, during start-up, combustion in the at least one combustion chamber 109 can initially rotatably accelerate responsive to fluid pressure being applied through the high-pressure turbine section (including those turbine rotor assemblies 129) such as by the working fluid forcing its way through the spaces between turbine rotor blades 134 and turbine stator blades 136 (thereby providing rotary motion to the turbine rotatable member 105). This acceleration of at least some of the at least one turbine rotatable element 105 (initially those within the higher-pressure turbine section) can result in rotation of at least a portion of the at least one independently rotatable compressor rotor 120 of the at least one compressor section 102, which is affixed to the shaft rotated by the at least some turbine rotatable elements 105. The acceleration of the compressor rotatable elements thereby cause compression, thereby causing an increase in the compression in the at least one at least one jet engine 58 resulting in the working fluid (e.g., which initially may include, but is not limited to, air and/or fuel) forcing its way through the turbine 462 exiting out through the nozzle chamber 59. As a result of the pressure gradient across the nozzle chamber 59 or exhaust, more working fluid is accelerated through the at least one at least one jet engine 58, as well as the bypass region 144 towards the low pressure region in the nozzle 59 and downstream thereof.

There are a variety of configurations of the at least one compressor section 102, that includes at least one compressor 472, as described with respect to FIGS. 16 and 23-28. Certain embodiment of the at least one compressor 472 can be formed with one or more compressor stages 119 (compressors can include from one to ten, or even more, compressor stages). Each compressor stage 119 can include a series of alternating instances of one compressor rotor assembly 155 (as described with respect to FIGS. 16 and 23) and one compressor stator assembly 157 (as described with respect to FIGS. 16 and 24-28). For each compressor stage 119, the compressor rotor assembly 155 is arranged alternately along an axial direction with and at least one compressor stator assembly 157. Each compressor rotor assembly 155 as described with respect to FIGS. 16 and 23 generally includes at least one independently rotatable compressor rotor 120 typically respectively arranged with and attached to a series of substantially radially extending compressor rotor blades 124.

Each compressor stator assembly 157 as described with respect to FIGS. 16 and 24-28 typically includes a compressor stator 122 (which may be stationary relative to and even include the jet engine casing 146), which may be configured as a series of substantially radially extending compressor stator blades 126 extending radially inward from, and often mounted to, the jet engine casing 146. Each successive compressor stage 119 is typically configured to handle a higher pressure working fluid from the compressor inlet to the compressor outlet (which fluidly corresponds to the combustion chamber 112). In general, independently rotatable compressor rotors 120 (along with the associated radially extending compressor rotor blades 124) rotate with one or more shafts, and can be substantially concentric about an axis substantially aligned with one or more shafts 64. By comparison, compressor stators 122 (associated with the radially extending compressor stator blades 126) are arranged to remain substantially fixed relative to the jet engine casing 146 of the compressor 472 and can, but do not have to be, arranged substantially concentrically about the axis substantially aligned with the one or more shaft 64.

Certain embodiment of the at least one compressor section 102 are typically formed with one or more of a series of alternating independently rotatable compressor rotors 120 and compressor stators 122. In general, compressor rotor blades 124 typically extend in a somewhat curved manner substantially radially outward from, and are affixed to, the independently rotatable compressor rotors 120. Certain embodiments of the independently rotatable compressor rotors 120 rotate about and can be substantially concentric about an axis substantially aligned with the one or more shafts 64. By comparison, certain embodiments of the compressor stators 122 of FIGS. 16 and 24-28 (along with the compressor stator blades 126 which typically extend substantially radially inwardly from the jet engine casing 146 in a manner to form the compressor stator 122) remain substantially non-rotatably fixed relative to and can be substantially concentric about to an axis substantially aligned with the one or more shaft 64.

Each independently rotatable compressor rotor 120 and each compressor stator 122 is typically respectively arranged to include a series of substantially radially extending compressor rotor blades 124 and substantially radially extending compressor stator blades 126. Certain embodiments of and at least one compressor rotatable element 103, as described with respect to FIGS. 9 and 10, can include at least rotatable portions of the independently rotatable compressor rotors 120 and the associated compressor rotor blades 124 as described with respect to FIGS. 16 and 23.

There may be a variety of configurations of the compressor stator assembly 131, certain of which are described with respect to FIGS. 24-28. Considering the FIG. 24 embodiment of the compressor stator assembly 157, a circular space 614 may be situated between the at least one compressor stator blades 126 and a rotating stator member 661. The rotating stator member 661 of FIG. 24 typically rotates with the shaft 64, and certain embodiment may be attached to, integrate with, or form a portion of, the independently rotatable compressor rotor 120 as described with respect to FIG. 23 such as to rotate substantially uniformly therewith. The circular space 614 of FIG. 24 thereby allows the rotating stator member 661 to move relative to the at least one compressor stator blades 126. A seal (not shown) may be integrated within the rotating stator member. The illustrated dimension of the circular space 614 may be larger than in the actual jet engine, but should be sized (or a seal should be provided) as to limit the passed of the working fluid through the space. In certain instances, the rotating stator member 661 as described with respect to FIG. 24 may be configured to axially space adjacent independently rotatable compressor rotors 120 of FIG. 23, as described with respect to FIG. 23. By positioning the at least one compressor stator blades 126 relative to the at least one relatively independently rotatable compressor rotor blades 124 of FIG. 23, sufficient working fluid flowing through the compressor section 102 can compress the working fluid passing through the jet engine provide for relative motion of the compressor rotor assembly 155 of FIGS. 16 and 23 relative to the compressor stator assembly 157 of FIGS. 16 and 24-28.

Figure 25:
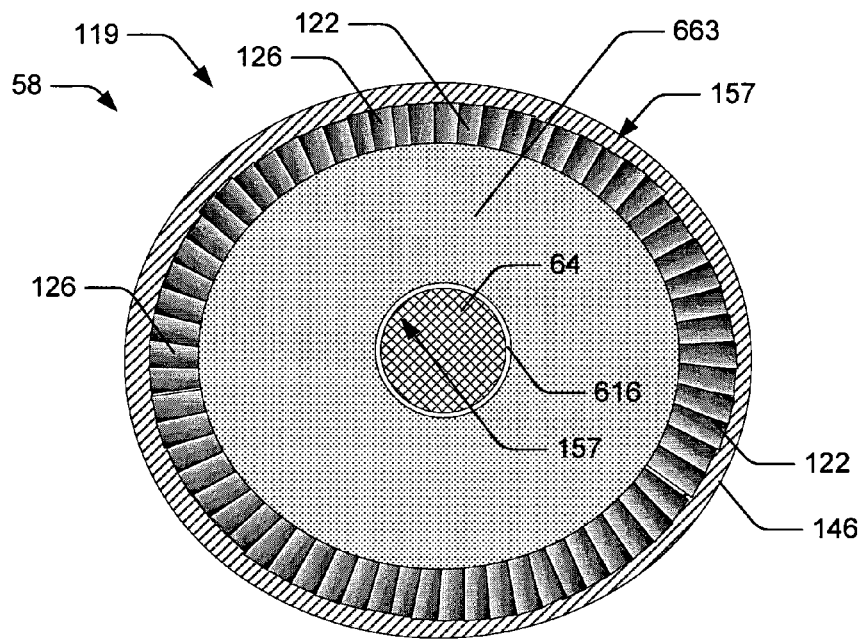
FIG. 25 is a cross-sectional view of another embodiment of the compressor stator of the jet engine as taken along sectional lines 4-4 of FIG. 15.

Considering the FIG. 25 embodiment of a stationary compressor stator assembly 157, a space 616 may be situated between a stationary stator member 661 and the shaft 64 (which may be configured, spaced, or sealed, as desired. Certain embodiments of the stator member 661 may be fixedly mounted to the at least one compressor stator blades 126. In these embodiments, the stator member 661 can typically remain stationary with the jet engine casing 146, and in certain embodiment the stationary compressor stator assembly 159 may be attached to, be integral with, or form a portion of, the jet engine casing. The space 616 thereby allows the shaft 64 to rotate within the stationary stator member 661. In certain instances, the stationary stator member 661, as described with respect to FIG. 25, may be axially spaced from adjacent independently rotatable compressor rotors 120 as described with respect to FIG. 23, to allow relative rotation there between. By positioning the at least one compressor stator blades 126 relative to the at least one relatively rotating compressor rotor blades 124, sufficient working fluid flowing through the compressor section 102 can provide for relative motion of the compressor rotor blades 124 of FIG. 23 relative to the compressor stator blades 126 of the compressor stator assembly 157 of FIG. 25.

Figure 23:
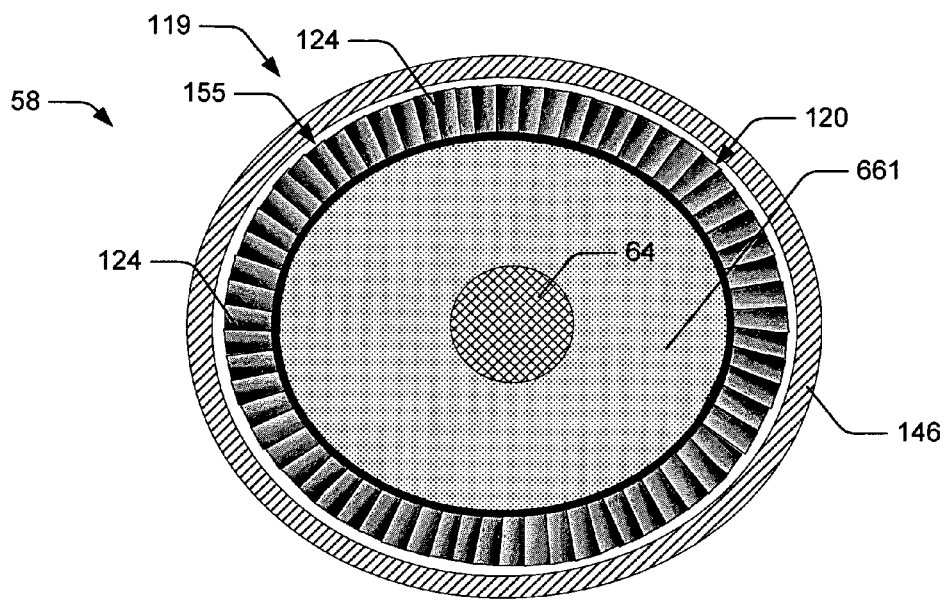
FIG. 23 is a cross-sectional view of one embodiment of a independently rotatable compressor rotor of the jet engine as taken along sectional lines 3-3 of FIG. 15.
Figure 24:
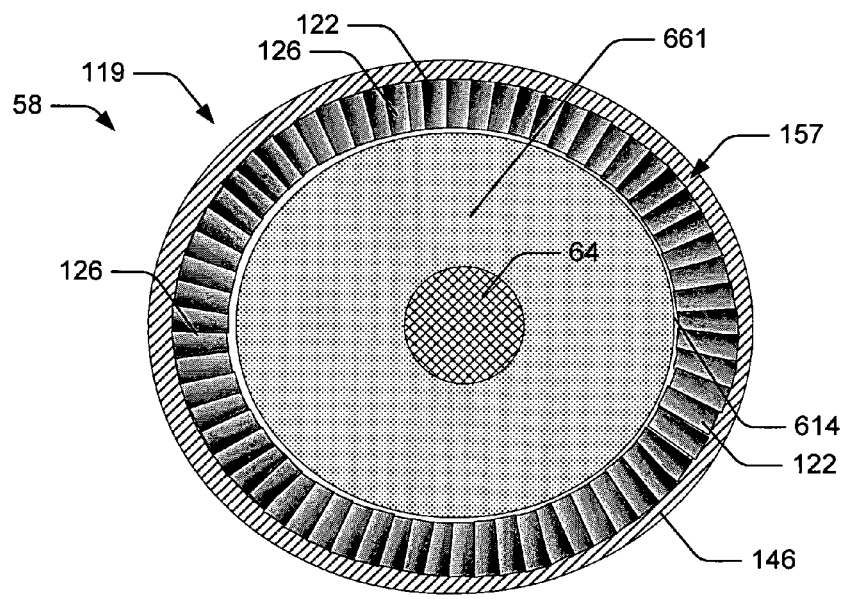
FIG. 24 is a cross-sectional view of one embodiment of a compressor stator of the jet engine as taken along sectional lines 4-4 of FIG. 15.
Figure 26:
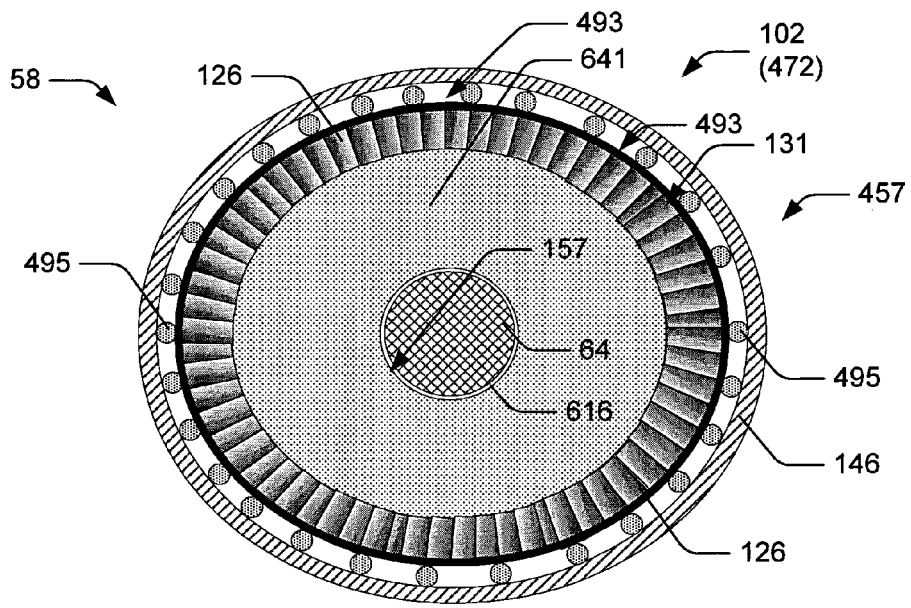
FIG. 26 is a cross-sectional view of an embodiment of an independently rotatable compressor stator of the jet engine as taken along sectional lines 4-4 of FIG. 15.
Figure 27:
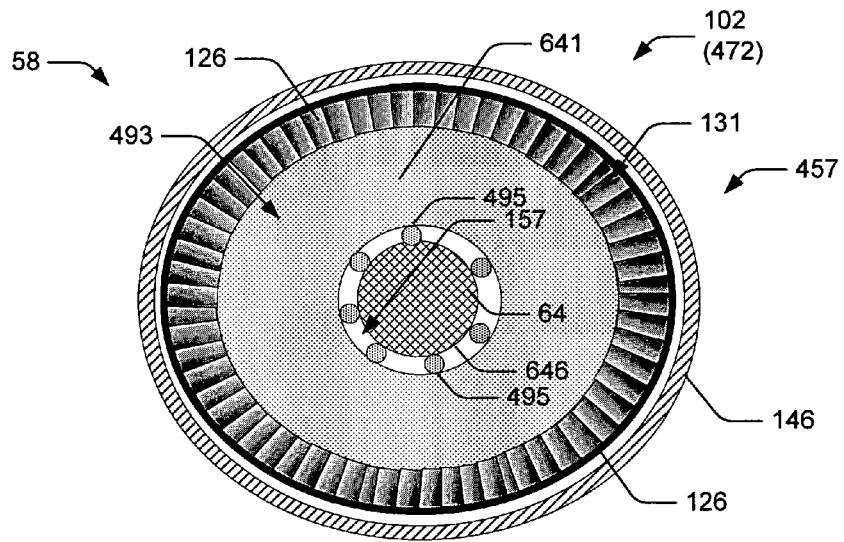
FIG. 27 is a cross-sectional view of another embodiment of the independently rotatable compressor stator of the jet engine as taken along sectional lines 4-4 of FIG. 15.

FIGS. 26 and 27 show a number of embodiments of the compressor rotatable stator assembly 457 including an at least one compressor rotatable stator 493 that can rotate independently of rotation of the compressor rotor assembly 155 of FIG. 23. Certain embodiments of the compressor rotatable stator 493 of FIGS. 26 and 27 can be supported on a number of bearings 495, and can be independently rotatably driven at a variable rotational velocity from the shaft 64. The bearings 495 of the FIG. 26 embodiment of the compressor rotatable stator assembly 457 are mounted about an outer periphery of the at least one compressor rotatable stator 493. The bearings 495 of the FIG. 27 embodiment of the compressor rotatable stator assembly 457 are mounted about an inner periphery of the at least one compressor rotatable stator 493. Certain embodiments of the bearings 495 as described with respect to FIGS. 26 and 27 may be ball bearings, race bearings, or other types of bearing configured to support the loads as rotational velocities of the members of the jet engines.

Certain embodiments of the at least one independently rotatable compressor stator 493, that are configured to rotate with respect to the jet engine casing 146, are described with respect to FIGS. 26 and 27. Certain embodiments of the at least for the at least one independently rotatable compressor stator 493 are mounted to rotate on one or more bearings 495 (e.g., typically a number of bearings). Within this disclosure, the term "independently rotatable compressor stator" indicates a member of the compressor rotatable stator assembly 457 that can rotate and/or be driven, and is positioned adjacent to independently rotatable compressor rotors and is configured to interact therewith such as to act to enhance compression of the working fluid through the compressor stages.

Certain embodiments of the at least one independently rotatable compressor stator 493, as described with respect to FIGS. 26 and 27, may be configured to operate as one embodiment of a compressor rotatable element, such as may be driven by the torque conversion mechanism 107 as described with respect to FIGS. 2 to 5, and 8-15. As such, the at least one independently rotatable compressor stator 493 may be precisely driven at a precise rotational, velocity (e.g., number of RPMs), such as may be appropriate to control driven shaft or compressor rotational velocity. Certain embodiments of the independently rotatable compressor stator 493 can also be configured to brake or position the compressor rotatable element such as by selectively controlling electric polarities as applied to the at least one independently rotatable compressor stator 493.

As such, certain embodiments of the at least one independently rotatable compressor stator 493 (along with the compressor stator blades 126) may be configured to rotate independently relative to both the shaft 64 and the jet engine casing 146. The at least one independently rotatable compressor stator 493, along with the compressor stator blades, may be configured to rotate or be rotatably driven as described with respect to FIGS. 26 and 27, other locations in this disclosure. Each independently rotatable compressor stator 493 may not satisfy the true definition of stator (e.g., remain stationary), and as such, these at least one independently rotatable compressor stator 493 may be considered as compressor counter rotating stators, compressor free wheeling stators, compressor rotatably driven stators, rotatable stator assembly, etc. As such, these embodiments of the independently rotatable compressor stator may be driven and therefore not be stationary relative to the jet engine casing 146, and therefore may not be considered to be a true stator except that they do interface with the compressor rotor assembly 155 as described with respect to FIGS. 23, and 25-28.

As such, within this disclosure as described with respect to FIG. 26, an at least one compressor rotatable stator assembly 457 can include an at least one rotatable stator member 582, at least one rotatable stator blades 584, and at least one rotatable stator bearing members 586. As described with respect to FIG. 28, certain embodiments of the at least one compressor rotatable stator assembly 457 can be driven by the at least one torque conversion mechanism 107, as described with respect to FIGS. 8 to 11. As described with respect to FIG. 28, the at least one compressor rotor assembly 155 of FIGS. 16 and 23 can be driven within the jet engine 58 to rotate in a first direction while the at least one compressor rotatable stator assembly 457 of FIG. 26 can be driven by the torque conversion mechanism to rotate in a second direction.

Since the at least one compressor rotatable stator assembly 457 as described in FIGS. 26 and 27 can be configured to rotate in the opposite direction from the at least one compressor rotor assembly 155, these two members rotating in opposed directions contribute to yield the effective relative rotation between the at least one compressor rotor assembly 155 and the at least one compressor rotatable stator assembly 457. The amount of fluid compression of the working fluid passing through the compressor stages of the compressor section is a function of the effective relative rotation of the compressor rotor assembly 155 and the adjacent compressor rotatable stator assembly 457.

Figure 28:
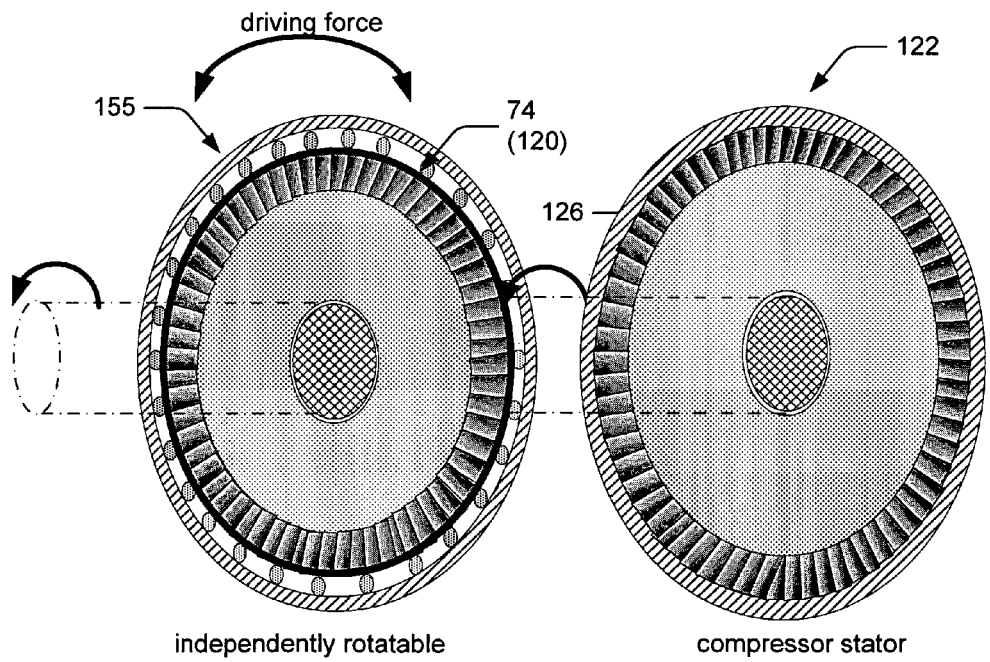
FIG. 28 is an exploded oblique view of an embodiment of a compressor stage including an embodiment of the rotatable compressor element.

As such, certain embodiments of the hybrid propulsive engine 100 can be configured as described with respect to FIGS. 26, 27, and 28 such that the compressor rotor assembly 155 and the independently rotatable compressor stator 493 (e.g., both of which may be viewed as compressor rotatable elements within this disclosure) can rotate in opposite rotational directions at a considerably lower rotational velocity, and still achieve similar fluid compression. For instance, instead of a compressor rotator assembly rotating at a desired rotational velocity to achieve a prescribed compression (for example, 1800 RPM), consider that the compressor rotor assembly 155 and the independently rotatable compressor stator 493 both rotate in opposite directions (assume each rotates at 900 RPM, though one may rotated faster than the other as desired or designed) to achieve substantially the same compression of the working fluid. Alternately, the compressor rotor assembly 155 could be rotating at 1200 RPM, and the independently rotatable compressor stator 493 could be counter-rotating at 600 RPM, for example.

Additionally, certain embodiments of the various components of the at least one compressor rotor assembly 155, by operating at a lower angular velocity, can experience lower stresses and fatigues. The associated wear on the compressor rotor assembly 155, the associated rotating turbine assembly, and the shaft will each experience lower loads, stress loadings, and fatigue. It is likely that the time between overhaul, and the expected operational lifetimes of such parts, may be extended. Not only might the fuel expenses associated with certain embodiments of the hybrid propulsive engines 100 be reduced as described in this disclosure, but the repair, overhaul, and replacement expenses may be limited as well.

Since the compressor rotatable elements 103, the turbine rotatable elements 105, and the shaft 64 of the jet engine 58, as described with respect to FIG. 16, can be all affixed to each other in a manner that allows joint rotation and the jet engine can operate at a lower rotational velocity with the compressor section achieving the same compression, less energy can be provided by the turbine section in rotating the at least one turbine rotatable element 105 at the lower rotational velocity, and subsequently may be viewed as an embodiment of a jointly-rotating compressor rotatable element. As such, certain embodiments of the gas turbines or jet engines can be configured to consume less fuel in those embodiments of the jet engines (that may be integrated in the at least one hybrid propulsive engine 100) that the at least one compressor rotatable stator assembly 457 is counter-rotating from the at least one compressor rotor assembly. Other portions of this disclosure provide more detail about the operations, efficiencies, and power of associated with certain embodiments of the compressor rotatable stator assembly 457.

Additionally, by the at least one compressor rotatable stator assembly 457 of FIGS. 26 and 27 being configured to rotate in the opposite direction from the at least one compressor rotor assembly 155, as described with respect to FIG. 28, a certain amount of the asymmetrical thrust as such power (such as produced by the jet engine as well as certain of the associated gyroscopic effects) can be reduced and/or limited. Certain ones of such asymmetrical thrust, as well as the associated gyroscopic effects, can have certain adverse effects such as making the aircraft more challenging to fly under certain instances, as well as providing undesired forces, stresses, and/or fatigue on the airframe as well as various portions of the hybrid propulsive engine 100 (or the associated engine pylons). Consider that providing considerable torque (about a single axis) can provide considerable torques, forces, stresses fatigues, etc. through such members of the aircraft as engines, engine pylons, wings, control surfaces, fuselage, etc. Reducing the rotational velocity of several of the components of the at least one hybrid propulsive engine 100 (such as the at least one compressor rotatable elements 103 and/or the at least one turbine rotatable elements 105) can have the effect of limiting the forces, stresses, and fatigue applied to those members.

By the components of the at least one compressor rotatable stator assembly 457 being configured to rotate in the opposite direction from the at least one compressor rotor assembly 155, the spooling duration for a jet engine to get up to speed can be limited. As mentioned above, the normal operational rotational velocity of certain ones of the at least one compressor rotatable elements 103 (such as the compressor rotor assembly 155) can be limited by counter-rotating the at least one compressor rotatable stator assembly 457, and therefore the mass and inertia associated with the at least one compressor rotatable elements 103 can be reduced, and the amount of time to accelerate the compressor rotor assembly to a desired operational rotational velocity can be limited.

The energy used to rotate the at least one compressor rotatable stator assembly 457 can therefore be provided at least partially from the at least one torque conversion mechanism 107 (and perhaps the associated energy storage device such as a battery), and may therefore will not directly derive energy from the jet engine, and more particularly the turbine rotatable elements.

The electricity that can at least partially provide power to the at least one torque conversion mechanism as described with respect to FIGS. 8 to 11 can be generated at least partially from either rotation of the at least one turbine rotatable element 105 or passage of particular working fluids through the jet engine, based on magnetohydrodynamic principles. Certain embodiments of the at least one energy extraction mechanism 66, that may include the electric generator 106, can therefore generate electricity resulting at least partially on rotary motion of the at least one turbine rotatable element(s) 105, working fluid passing through the jet engine or in the nozzle/exhaust region, or some combination thereof. The components used to generate the electricity may include, but are not limited to, the energy extraction mechanism 66 and the torque conversion mechanism 107. Certain embodiments of the torque conversion mechanism 107 can convert electric energy into mechanical energy, such as rotation of the compressor rotatable elements 103 and/or rotation of the at least one independently rotatable propeller/fan 258. Certain embodiments of the electric generator 106, as included with certain of the energy extraction mechanisms 66, can therefore, as with certain electric generators in general, be structured similarly and perform the inverse process to the torque conversion mechanism 107.

Certain embodiments of the energy extraction mechanism 66 can be configured to perform the process of converting mechanical energy (such as from passage of the working fluid within the jet at least one jet engine 58 as well as rotation of the at least one turbine rotatable elements 105) to produce electric energy, and can thereby perform both tasks of the energy extraction mechanism 66 and the torque conversion mechanism 107. Certain vehicle-based energy extraction mechanisms (such as may be used to generate electricity to run torque conversion mechanisms) can be operationally associated with a variety of motors, such as traction motors used on locomotives, as well as some electric and hybrid automobiles (including the Toyota Prius), provided the hybrid automobile is equipped with dynamic brakes.

A variety of configurations and embodiments of the at least one energy extraction mechanism 66 and/or the at least one torque conversion mechanism 107, such as described in block form relative to FIGS. 8 to 11, are now described schematically with respect to FIGS. 12, 13, 14, and 15. Certain embodiments of the at least one hybrid propulsive engine 100 can therefore include the torque conversion mechanism 107 to power the at least one independently rotatable propeller/fan 258 within the at least one independently rotatable propeller/fan engine 62. Certain embodiments of the torque conversion mechanism can thereby utilize electric energy to produce mechanical energy. In certain embodiments of this disclosure, the electric energy corresponds to the electricity generated by certain embodiments of the at least one energy extraction mechanism 66. FIG. 12, for example, shows one schematic diagram of an embodiment of the hybrid propulsive engine 100 including the energy extraction mechanism 66 (that may include the electric generator 106) that is directly connected to the shaft 64. Certain embodiments of the energy extraction mechanism 66 (e.g., the electric generator 106) can be situated relative to the shaft 64 at any location that rotates including, but not limited to, between the compressor section and the turbine section, downstream of the turbine section, upstream of the compressor section, or even connected to a distinct turbine situated in the jet engine.

Certain embodiments of the energy extraction mechanism 66, as described with respect to FIGS. 12 and 13, include an electric generator rotor 1062 and a electric generator winding 1064. Certain embodiments of the electric generator rotor 1064 include a magnetic or electrically conductive material, which can be displaced such as being rotated relative to the electric generator winding 1064. Proper motion of the electric generator rotor 1062 relative to the electric generator winding 1064 (such as rotation of the electric generator rotor in FIGS. 12 and 13) will result in generation of an electric current in the electric generator winding 1064.

In certain embodiments of this disclosure, the mechanical energy corresponds to the rotation of certain embodiments of the at least one independently rotatable propeller/fans 258 within the independently rotatable propeller/fan engine 62. It is envisioned that a variety of embodiments of the at least one torque conversion mechanism 107 that can remain within the intent of this disclosure.

Certain embodiment of the energy extraction mechanism 66, that may include the electric generator 106, can be configured to convert energy in the form of motion (e.g., rotation) of the electric generator rotor 1062 into electricity energy as described with respect to FIGS. 12 and 13. In instances of aircraft 75, for example, the electric energy provided by the energy extraction mechanism 66 as electric generators can provide electricity to the at least one torque conversion mechanism 107, which thereupon may be used to drive the at least one independently rotatable propeller/fan 258, or alternatively (not shown) drive a variety of compressor rotatable elements, turbine rotatable elements, provide power to the aircraft (or other vehicle) systems or instruments, etc. Certain embodiments of the electric generator rotor 1062 of the energy extraction mechanism 66 can be directly mechanically coupled to (and rotate responsibility to) rotatable configured to rely on motion of the turbine rotatable elements 105, which rotation can be transferred from rotary motion of the shaft 64. In certain embodiments, the shaft 64 can be configured as a rigid structure, and thereby relatively statically yet jointly rotatably affix at least some of the independently rotatable compressor rotors 120 (including at least some of the compressor rotor blades 124) relative to the at least some of the turbine rotors 132 (including at least some of the turbine rotor blades 134).

This disclosure provides a variety of jet engines included with the at least one independently rotatable propeller/fan assembly 108. Certain embodiment of the at least one independently rotatable propeller/fan assembly 108 can be configured, for example in the aircraft or other vehicle of FIG. 1, as a propeller for a turboprop engine or as a fan section for a turbofan engine. In general, the torque conversion mechanism 107 can be configured either in front or, or behind, the at least one jet engine 58 of the hybrid propulsive engine 100 such as to enhance the power of the decoupled engine. Not all the working fluid (e.g., air) flowing through the at least one independently rotatable propeller/fan assembly 108 can also be configured to pass through the other portions of the hybrid propulsive engine 100.

Certain embodiments of the energy extraction mechanism 66 that is configured to generate electricity based at least partially on the rotary motion of the turbine rotors configured as the turbine rotational element 105 is therefore described with respect to FIG. 13, in which the electric generator winding 1064 is mounted in proximity to and rotates relative to, the turbine rotatable element 105. As such, certain embodiments of the electric generator rotor 1062 can be at least partially integrated, mounted, associated, or otherwise formed relative to, and/or may rotate with, the turbine rotatable element 105 of FIG. 16, while other electric generator winding is situated in portion of jet engine proximate the turbine rotor or turbine rotor (e.g., the casing). The rotation of the at least one turbine rotor, turbine rotor blade, or at least one other turbine rotatable element can thereby be configured to generate an electric current in the at least one electric generator winding 1064, which electric current can subsequently be applied to the torque conversion mechanism 107 (which may be stored in the energy storage device of FIG. 2), as described with respect to FIGS. 8 to 11.

The above-described embodiments of the energy extraction mechanism 66 that may include the electric generator 106 can be configured to harness its energy from rotation of the turbine rotatable elements 107, or other rotatable element that rotate therewith. By comparison, certain embodiments of electric generators can generate electricity from energy of the working fluid passing through the jet engine 58. Such electric generators, as described with respect to FIG. 14, are configured as a magnetohydrodynamic electric generator. Magnetohydrodynamic electric generators, as applicable to the present disclosure, can operate generally by extracting power from the hot exhaust stream in or near the nozzle area 59 of the jet engine 58 as described with respect to FIG. 16. Certain embodiments of the magnetohydrodynamic electric generator can enhance magnetohydrodynamic aspects in which an electric conductor, such as iodine or cesium, can be injected in the jet engine upstream of the nozzle area. A magnetic field can thereupon be applied across the exhaust stream, and an electric current is thereupon established at ninety degrees, based on the left-hand rule, to the applied magnetic field. The electric current generated by the working fluid energy electric generator can then be applied to drive the torque conversion mechanism.

One or more types of energy extraction mechanisms 66 that include the electric generators can thereby be used to generate electricity, which can thereupon drive certain embodiments of the torque conversion mechanism 107 such as may include one or more electric motors.

This disclosure provides a number of embodiments of a hybrid propulsive engine 100 in which the independently rotatable propeller/fan engine 62 can be decoupled and/or controllably coupled from the at least one independently rotatable propeller/fan assembly 108, such as by having the at least one independently rotatable propeller/fan assembly capable of rotatably operating independently (e.g., being decoupled) from rotation of the at least one compressor section 102 and/or the at least one turbine section 104 of the at least one jet engine 58. Certain embodiments of the hybrid propulsive engine 100 can thereby be configured such that the shaft 64 (which may include a prime shaft and/or the multiple shafts) that provide relative motion between one or more turbine rotatable elements of the at least one turbine section 104 and one or more compressor rotatable elements of the at least one compressor section 102. Certain embodiments of the shaft 64 do not have to extend (or alternately can be otherwise connected to extend) to provide relative rotation to the at least one independently rotatable propeller/fan 258 of the independently rotatable propeller/fan engine 62 (or alternately provide rotation for only part of the time).

In certain embodiments of the hybrid propulsive engine 100, the shaft 64 therefore can be disconnected or configured to not provide a continuous mechanical connection between the propeller/fan section 62 and either the at least one turbine section 104; between or the at least one compressor section 102 and the turbine section, freedom of rotary motion as well as operation can be provided between the at least one independently rotatable propeller/fan 258 of the independently rotatable propeller/fan engine 62, as well as the rotatable elements of the jet engine 58. This disclosure describes a variety of such freedom of rotary motion and/or freedom (which may be continuous or alternately may be controlled during certain phases of vehicular operation such as flight) of operation between the independently rotatable propeller/fan engine 62 and the jet engine 58.

FIGS. 8 to 11 are block diagrams illustrating one embodiment of the hybrid propulsive engine 100 in which the electricity provided to the torque conversion mechanism 107 is derived based on the motion of the turbine rotatable element 105 from the energy extraction mechanism 66 such as the electric generator 106 in a substantially instantaneous manner (and do not include the optional energy storage device 264). As such, the electricity is not able to be stored for a considerable duration, such as in an energy storage device. As such, the electricity generated by a variety of the energy extraction mechanism 66 such as the electric generators 106 can be shared by more than one torque conversion mechanisms 107 in a number of embodiments of the hybrid propulsion engine 100.

Certain of these hybrid propulsive engines 100 as described with respect to FIGS. 8 to 11, by comparison, shows another embodiment of the hybrid propulsive engine 100 that includes the optional energy storage device 264 that can obtain at least some of the energy generated by the at least one energy extraction mechanism 66, and store it for some duration. The duration can range from instantaneous storage to storage for minutes, days, etc. in various embodiments of the energy storage device 264. Certain embodiments of the energy extraction mechanism 66 can thereby be configured to be operatively associated with a variety of the at least one energy storage device 264. Certain embodiments of the at least one energy storage device 264 can include, for example: an at-least-one high-power-rating battery, a rechargeable battery, an at least one flywheel, an at least one supercapacitor, or an at least one other suitable energy-storage device, etc., or combination thereof.

Certain embodiments of the energy storage device can be configured to intermediately store power generated by the at least one energy extraction mechanism 66, such that it can be used to provide power to the torque conversion mechanism 107 immediately or thereafter. As such, certain embodiments of the energy storage device 264 to act as a provision for storing generated electricity that exceeds the demand for that electricity. Such techniques to use certain embodiments of energy storage devices to run the at least one torque conversion mechanism 107 can in certain occurrences allow operation of the at least one independently rotatable propeller/fan engine 62 during the time of demand of the independently rotatable propeller/fan engine without putting an immediate electric drain on the at least one energy extraction mechanism 66.

Increasing the ability of the energy storage device 264 to store energy (e.g., using regenerative techniques such as being able to produce a considerable electric supply) can tend to increase the overall efficiency of the at least one hybrid propulsive engine 100. Consider that certain embodiments of the energy extraction mechanism 66 can be capable of providing energy obtained during low demand to be supplied during peak demand, and as such the maximum amount of energy required to be produced at any time (from the jet engine) can be limited. Larger or more efficient energy storage devices 264 could be expected to store a greater amount of electric energy such as could be retrieved upon periods of greater demand.

Certain embodiments of the energy storage device 264 that are capable of providing energy obtained during low demand to be supplied during peak demand may be considered as a type of a regenerative device. During many flights, for example, electricity can be stored in the energy storage device 264 during low demand periods, and retrieved from the energy storage device to be applied to the torque conversion mechanism 107 during high demand periods.

Certain conventional hybrid automobiles, such as the Toyota Prius, are configured to provide energy obtained during low demand to be thereupon stored in a manner that it can be supplied during peak demand. The Prius, as with other conventional hybrid automobiles and sport utility vehicles, can utilize energy-storage elements such as batteries to provide an alternative drive energy extraction mechanism. Certain hybrids such as the Prius can shut down its gas engine during periods of low demand, thereby running off the energy of the batteries to run the electric motor.

This disclosure describes a number of hybrid propulsive engines 100 that can shut down at least some of the jet engines during flight in such a manner that those jet engines can be restarted, and at least some of the rotatable working fluid displacement engine 74 can be run from energy from other operating jet engines and/or at least some energy storage devices 264, such as by using power sharing techniques as described in this disclosure. The design and energy storage capabilities of a number of such energy storage devices as batteries (particularly rechargeable batteries), flywheels, capacitor elements, fuel cells, etc. are improving, and in general are being made lighter and having a greater charge density, such as to be more useful in vehicles. Certain of such batteries can also be "plugged in" to an energy extraction mechanism to obtain an enhanced charge such as when on the ground, while at an airport, etc. Such enhanced charge can assist certain embodiments of the hybrid propulsive engine 100 to perform particularly during a requirement for peak performance, such as during take-off, certain emergency procedures, etc.

The role of the energy storage device 264 as it interfaces with certain embodiments of the hybrid propulsive engine 100, as described with respect to FIGS. 8 to 11, is not to be confused with a perpetual motion machine. Perpetual motion machines may be considered as a device in which more energy is created than which is provided therein. By comparison, certain embodiments of the energy storage device 264 can be configured to efficiently store, and subsequently efficiently provide at least some of the energy previously applied thereto. As such, certain relatively efficient embodiments of the at least one energy storage device 264 can be configured to store energy being produced by the at least one energy extraction mechanism 66, during a period of relatively low energy draw such as when the jet engine 58 as well as the independently rotatable propeller/fan engine 62 may both be operated at an idle or relatively low level (such as during a descent, slow cruise, or taxi). Such energy retrieved from the at least one energy storage device 264 during a period of low demand can be applied to power (provide at least some electricity to) the torque conversion mechanism 107 of the independently rotatable propeller/fan engine 62 during a period of relatively high demand, such as during take-off, climb, emergency procedure, etc.

Certain embodiments of the hybrid propulsive engine 100 could therefore be configured such as to include an electric aircraft engine having some/all energy generated by an onboard energy extraction mechanism 66 such as with the energy extraction mechanism 66, and used to power electric-motor propulsion. Certain embodiments of the hybrid propulsive engine 100 can therefore be configured to include the energy extraction mechanism 66, such as by using an energy extraction mechanism 66 as described with respect to FIGS. 8 to 11. The energy extraction mechanism 66 can be arranged in series with the energy extraction mechanism 66 in combination with the torque conversion mechanism 107 or in parallel. Certain embodiments of the energy storage device can thereby function to time-separate the generation of energy from the hybrid propulsive use of the energy.

Certain embodiments of the hybrid propulsive engine 100 may gain considerable efficiency where the bypass ratio is relatively large (in certain instances, having a bypass ratio greater than 10). The bypass ratio may be considered as the ratio of the working fluid flowing through the at least one independently rotatable propeller/fan assembly 108 (e.g., "cold portion") divided by the working fluid flowing through the at least one jet engine 58 (e.g., "hot portion"). As such, relatively large effective bypass ratios can be effected in certain embodiments of the hybrid propulsive engine 100 by using the at least one independently rotatable propeller/fan assembly 108 powered at-least-in-part by electric energy provided by turbine engine-driven energy extraction mechanisms (e.g., possibly utilizing intermediate storage-&-power conditioning).

Certain embodiments of the hybrid propulsive engine 100 can be configured with provisions for fans operating at different shaft-speed variations or significantly-different instantaneous shaft horsepower than the associated engines. Certain embodiments of the hybrid propulsive engine 100 can be configured to include the at least one independently rotatable propeller/fan assembly 108 which can thereby attain considerably greater hybrid propulsive efficiency by increasing the effective bypass ratio and near-constancy of prime-mover shaft-rate (in some embodiments, by significantly varying either/both fan blade-angle or shaft-rate, as well as by agile engine power-dumping into dynamic brakes).

Certain embodiments of the hybrid propulsive engine 100 including the at least one independently rotatable propeller/fan assembly 108 can thereby increase operational safety-margins by enabling thrust levels that are not to be slaved to some ratio of the engine power-levels, which is a function of the configuration of one or more shafts and/or mechanical gear ratios. Certain embodiments of the hybrid propulsive engine 100 may be both more agile in frequency-response, and also attain peak thrust levels quicker than engine power-levels, such as during emergency maneuvers. This increase in responsiveness is not a result of running a bypass fan (propeller) off a remote electricity source. This is a bypass-fan integrated with a jet engine in a manner that allows for decoupling or controllably coupling of the at least one independently rotatable propeller/fan assembly 108 relative to the at least one jet engine 58.

It is envisioned that within the hybrid propulsive engine 100, a variety of embodiments of power control devices 302 can be used to control the at least one jet engine 58 relative to the at least one independently rotatable propeller/fan assembly 108. In conventional aircraft 75, for example, the power of the at least one jet engine 58 is typically controlled using a throttle quadrant including a throttle for each engine, as illustrated relative to FIGS. 39, 40, and 41 for a conventional single engine jet, though similar throttle power quadrants could be provided for aircraft with two, three, four, or more of the at least one hybrid propulsive engine 100. By comparison, certain embodiments of aircraft 75 including the hybrid propulsive engine 100 can be configured to provide control for the at least one independently rotatable propeller/fan assembly 108 as well as control to the at least one jet engine 58.

Figure 39:
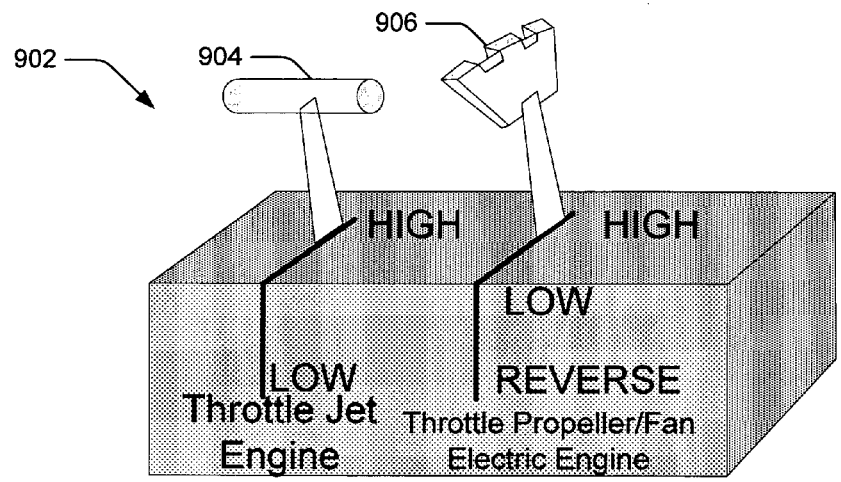
FIG. 39 is a diagram of one embodiment of a throttle quadrant such as may be used with certain embodiments of the hybrid propulsive engine.
Figure 40:
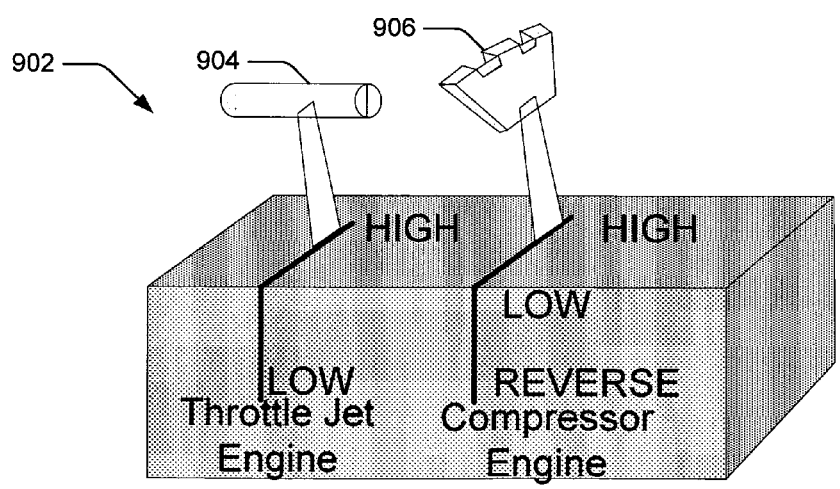
FIG. 40 is a diagram of another embodiment of a throttle quadrant such as may be used with certain embodiments of the hybrid propulsive engine.
Figure 41:
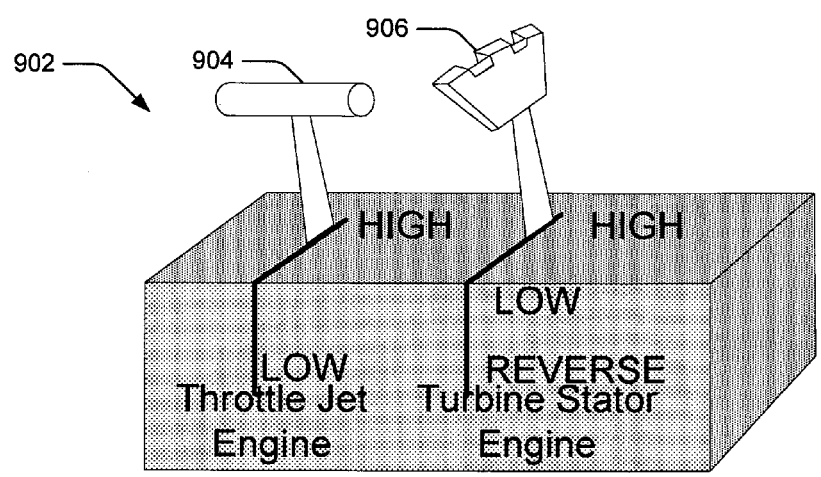
FIG. 41 a diagram of still another embodiment of a throttle quadrant such as may be used with certain embodiments of the hybrid propulsive engine.

The throttle quadrant typically includes a throttle for each engine, as illustrated relative to FIGS. 39, 40, and 41 for a single engine jet. Certain embodiments of aircraft or other vehicles can include an indicator that display rotational velocity (e.g., RPM) for each of the jet engine 58 and the independently rotatable propeller/fan engine 62, perhaps in the form of a so-called "stream gauge", not show, or alternately in the form of a digital readout, such as described with respect to FIGS. 42 to 44. Certain embodiments of the throttle quadrant can also be selected using computer interface, graphical user interface, computerized, controller, menu, slider, or other configurations such as may reasonably be expected in the input output interface 811 of the hybrid propulsive engine controller 97, as described with respect to FIGS. 8 to 11. It is likely that an electric engine RPM indicator 350 can be displayed in a variety of indicators such as mechanical LED, LCD, heads-up-display, as well as other indicators, as well as jet engine RPM indicator 352. Certain rotational velocity (e.g., RPM) indicators can be, or may not be, quantified as percentage of a maximum operating value, rather than some actual value as described in this disclosure with respect to FIG. 43 or 44, for example.

Certain embodiments of the at least one jet engine 58 as well as the at least one independently rotatable propeller/fan assembly 108 can be controlled during different phases of flight for various aircraft 75. Consider, for example, there are a variety of flight conditions including, but not limited to, engine off, engine on but aircraft 75 stopped, parking but operating, taxiing, taking off, climbing at all or multiple altitudes, cruising, descending, preparing to land, stopping (e.g., perhaps reverse thrust). Certain illustrative, but not limiting, examples of these flight conditions are now described, and it is to be understood that these conditions will vary depending on particular type, condition, operation, and other such aspects of the aircraft 75.

In at least some of the taxiing conditions, it may be desired to power the aircraft 75 using the at least one independently rotatable propeller/fan assembly 108 by itself, such as without at least some of the jet engines operating. This is largely because the amount of force to taxi in the aircraft 75 is relatively small. Quite often, for example in crowded airports, aircraft 75 are forced to sit or wait in line for extended periods. If taxiing could be performed at least primarily using a variety of the torque conversion mechanism 107 driven independently rotatable propeller/fan engine 62, compressor rotatable element 103, etc. while limiting operation of one or more of the jet engines 58, then considerable energy and cost savings could be realized. It may be desirable to associate an electric battery, electric fuel-cell, or other electric provider (not shown) to the torque conversion mechanism 107, as described with respect to FIG. 9. Such electric battery, fuel-cell, or other electric provider to be suitably configured to provide electricity to operate (e.g. rotate) the at least one independently rotatable propeller/fan assembly 108 using its own power, to taxi the particular aircraft 75, as well as operating the particular aircraft systems such as electric and air condition systems. Under this configuration, the aircraft 75 could taxi, brake, and wait, etc. without having to burn considerable aviation fuel.

Certain embodiments of the energy storage device based on batteries that at least partially power the torque conversion mechanism 107 can operate based at least partially on demand, such as is more commonly understood with batteries from a hybrid automobile. For instance, for at least some of the time that jet engines run, there is little or no demand on the torque conversion mechanism 107 (such as during idle, taxi, braking, descent, slow cruise, etc.). By comparison, much of the time that jet engines run, there is considerable demand for the power from the torque conversion mechanism 107 to power the at least one independently rotatable propeller/fan assembly 108, such as during take off, climb, fast cruise, certain emergency situations, etc. As such, certain of such batteries could store electricity during low-demand time, and provide such electricity during high-demand times (which is one of the efficiency aspects of they hybrid propulsive engines 100 as well as with hybrid automobiles).

There may be a variety of situations where such batteries storing electricity during low-demand times to be returned during high demand times could be particularly useful. Consider that most aircraft operations at the airport are low demand, during which time the batteries that are associated with the at least one torque conversion mechanism 107 could become more charged. By comparison, take-off and climb operations are high demand, during which time the aircraft could be using full power from the jet engines 58 as well as the batteries to provide as much power to the at least one independently rotatable propeller/fan assembly 108 as practicable. Alternately, most descending aircraft operations are low demand, during which time the batteries that are associated with the at least one torque conversion mechanism 107 could become more charged. By comparison, certain emergency climbing operations are high demand, during which time the aircraft could be using full power from the jet engines 58 as well as the batteries to provide as much power to the at least one independently rotatable propeller/fan assembly 108 as practicable when appropriate.

Efficiency of gas turbine usage (or reducing fuel burn or usage for a given operating condition) is important in jet engine design since it allows the aircraft 75 driven by the jet engines to travel greater distances on the same fuel. Alternately, the aircraft 75 with more efficient jet engines can travel a given distance with less fuel on board. When a given aircraft 75 weighs less, such as by carrying less fuel and/or by itself weighing less, the aircraft can typically accelerate faster and climb quicker based on equation (1), which is Newton's second law:

$$\text{force} = \text{mass} \times \text{acceleration} \quad (1)$$

Which implies the greater the mass of an object, the more force is necessary for a given acceleration. As such, since certain embodiments of the at least one hybrid propulsive engine 100 for a given aircraft 75 may be configured to weigh less due to, as described in this disclosure, limit the use or size of certain aircraft parts such as extended shafts, certain control surfaces, certain mechanical ducting and vanes such as used for reverse thrust, some fuel as a result of less energy used, etc., such aircraft can be expected to fly faster, as well as use less fuel.

Newton's second law of equation (1) can be modified to apply to rotatable accelerations of bodies, such as rotatable components of the at least one jet engines 58 as well as the independently rotatable propeller/fan engine 62, as per equation 2:

$$\tau = I\alpha \quad (2).$$

Where $\tau$ is the torque of the object, I is the moment of inertia of the object, and $\alpha$ is the rotatable acceleration of the object. The energy to rotatably accelerate to certain embodiments of the turbine rotor assemblies 129, the independently rotatable compressor rotors 120, the shaft 65, etc. is therefore related to the moment of inertia of each particular rotatable element of the hybrid propulsive engine 100. There have been a variety of attempts of efficiency in jet engine and gas turbine design therefore can, and still involve, limiting the mass and/or inertia of respective movable or rotating parts.

Within this disclosure, depending on context, a propeller may be considered as operating similarly to, and actually being equivalent to, a fan, as envisioned by the at least one independently rotatable propeller/fan assembly 108. Both propellers and fans, for instance, provide thrust without addition of heat as with gas turbines or jet engines. As such, the one or more turboprop type of at least one jet engines 58 as described with respect to FIG. 3, and other locations in this disclosure, or one or more turbofan type of at least one jet engines 58 as described with respect to FIG. 4, and other locations in this disclosure, may be referred to herein inclusively as engines or the hybrid propulsive engines 100.

Certain embodiments of the hybrid propulsive engines 100 thereby include the independently rotatable propeller/fan engine 62. Within this disclosure, depending on context, the term "turbofan" may or may not be used interchangeably with "turboprop", just as "fan" may or may not be alternatively used as "propeller". A variety of relatively efficient aircraft can be designed using, for example, composite, aluminum, titanium, or other suitable materials or alloys. Similarly, a variety of the jet engines can be designed using relatively efficient technologies. It is likely that the energy efficiency of such fuel efficient or even less-then-extremely fuel efficient, aircraft design can have their energy efficiency improved utilizing a variety of techniques as provided by certain embodiments of the hybrid propulsive engines 100, as described in this disclosure.

Certain embodiments of the hybrid propulsive engine 100 can be quite efficient, and provide for a considerable control of a considerable variety of operations. There are a variety of propeller or fan equations, which apply to the propeller/fan that illustrate that while the at least one independently rotatable propeller/fan assembly 108 is often more efficient at low speeds, at least one jet engines 58 are typically more efficient at high speeds.

Equation 3 provides generalized equation concerning thrust by the at least one independently rotatable propeller/fan assembly 108 as well as the at least one jet engine 58, or combination thereof:

$$\text{Thrust} = (\text{mass-rate of flow}) \text{times} (V_{out} - V_{in}) \quad (3),$$

in which:
$V_{out}$ defines the output velocity of the jet engine, turbojet, or turboprop,
$V_{in}$ defines the input velocity of the jet engine, turbojet, or turboprop,
thrust is the force applied by the jet engine, turbojet, or turboprop, and
(mass-rate of flow) is the mass rate of flow of the working fluid or air applied to the jet engine, turbojet, or turboprop.

As such, the jet engine 58 as well as the at least one independently rotatable propeller/fan assembly 108 can be configured to provide thrust. Thrust is one of the four forces acting on aircraft during flight, and tends to accelerate the aircraft towards its direction of flight. As such, the direction of thrust of the jet engine 58, as well as the at least one independently rotatable propeller/fan assembly 108, is generally directed along the direction of flight of the aircraft, or the direction of travel of the vehicle, in general. Equation 4 provides generalized equation concerning energy of the at least one independently rotatable propeller/fan assembly 108, as well as the jet engine, or combination thereof:

$$\text{Energy} = \tfrac{1}{2} \text{ mass times } (V_{out}^2 - V_{in}^2) \quad (4)$$

Turbojets without relatively high bypass ratios are considered as typically having relatively poor efficiency at low speeds. This limited efficiency is a result of the squared function in equation (4) which when the velocity is low results in considerably less energy than when the velocity is high), but efficiency for turboprops without bypass is relatively good at high speeds. Certain embodiments of propellers and fans have relatively high efficiency at low speeds, but lose some of the efficiency at high speeds since equation (3) can be used to indicate the energy increases.

2. Interaction Between Multiple Hybrid Propulsive Engines

A variety of conventional jet engines, as well as conventional turbojets and conventional turboprops, can be driven by one or more turbines via one or more shafts. As such, if the turbine in a conventional jet engine, conventional turbojet, or conventional turboprop stops rotating, so will the shaft and the associated rotatable compressor elements, fans, and/or propellers. As such, malfunction of an important component such as one of the rotatable working fluid displacement engines 74 can cease the operation of certain conventional jet engines, conventional turbojets, and conventional turboprops. Certain embodiments of the hybrid propulsive engine 100 can be configured to independently rotate at least some of these independently rotatable components. Various rotating components of certain embodiments of the at least one hybrid propulsive engine 100 can be configured to be driven by one or more shafts, each driven by distinct rotating turbine element. The operation of certain embodiments of the hybrid propulsive engine 100, that may be controlled by the at least one hybrid propulsive engine controller 97, can therefore involve supplying electricity as desired to such non-limiting embodiments of the rotatable working fluid displacement engine 74 as at least one of the independently rotatable propeller/fan engine 62 as described with respect to FIGS. 3, 4, 8, and other locations in this disclosure; to at least one of the independently rotatable compressor rotor 120 as described with respect to FIGS. 5, 16, 9, 28, 29, as well as other locations in this disclosure; to at least one of the independently rotatable compressor stator 493 as described with respect to FIGS. 5, 16, 10, 28, 29, as well as other locations in this disclosure; and at least one of the independently rotatable turbine stator 477 as described with respect to FIGS. 5, 11, 16, 28, 29, as well and in this disclosure.

Certain embodiments of the at least one hybrid propulsive engine 100, by comparison, can include the various rotatable working fluid displacement engine 74 (e.g., the at least one independently rotatable propeller/fan engine 62, the at least one independently rotatable compressor rotor 120, the at least one independently rotatable compressor stator 493, and/or the at least one independently rotatable turbine stator 477, as described above) that can be driven by the at least one torque conversion mechanism 107 that may include the electric motor. As a result, certain embodiments of the various rotatable working fluid displacement engine 74 may therefore be able to operate even if a jet engine is not operating. This section describes a number of embodiments of the at least one independently rotatable propeller/fan engine 62 that can be driven by the torque conversion mechanism 107.

Electricity generated by the at least one energy extraction mechanism 66, as described with respect to FIG. 8, as well as other locations in this disclosure, can be applied to any of the at least one various rotatable working fluid displacement engine 74 (e.g., the at least one independently rotatable propeller/fan engine 62, the at least one independently rotatable compressor rotor 120, the at least one independently rotatable compressor stator 493, and/or the at least one independently rotatable turbine stator 477, as described above) of the aircraft of FIG. 1. As such, within certain embodiments of the at least one hybrid propulsive engine 100, multiple ones of those various rotatable working fluid displacement engines 74 that run at least partially off power from the torque conversion mechanism 107 can often be configured to operate independently of other component of the at least one hybrid propulsive engine 100.

Additionally, within certain embodiments of the at least one hybrid propulsive engine 100, multiple ones of those various rotatable working fluid displacement engines 74 (e.g., including but not limited to, the at least one independently rotatable propeller/fan engine 62, the at least one independently rotatable compressor rotor 120, the at least one independently rotatable compressor stator 493, and/or the at least one independently rotatable turbine stator 477, as described in this disclosure) that run at least partially off power from the torque conversion mechanism 107 can share power from the at least one torque conversion mechanism 107, and can thereby continue to operate even if the corresponding jet engine malfunctions, shuts down, or even is shut down intentionally or unintentionally. Conversely, within certain embodiments of the at least one hybrid propulsive engine 100, the at least one torque conversion mechanism 107 can obtain electricity from the at least one energy extraction mechanism 66 associated with an associated jet engine, or at least one another energy extraction mechanism that is not associated with the jet engine.

Certain embodiments of the at least one hybrid propulsive engine 100, in which electricity from an torque conversion mechanism 107 can therefore be used to power one or more electrically demanding rotatable working fluid displacement engines 74 (e.g., the at least one independently rotatable propeller/fan engine 62, the at least one independently rotatable compressor rotor 120, the at least one independently rotatable compressor stator 493, and/or the at least one independently rotatable turbine stator 477, as described in this disclosure), may be, depending on context, configured and/or considered as power sharing devices since they can share electricity relative to the electricity demanding components. Various aspects about power-sharing features is that one more jet engine 58 can be configured to supply power to more than one torque conversion mechanism 107 (and/or the energy storage device 264 such as a battery, etc.). In certain instances, for example, the at least one jet engine physically associated with a particular independently rotatable propeller/fan engine 62 may not be the one supplying power to the torque conversion mechanism associated with the particular independently rotatable propeller/fan engine.

A variety of illustrative, but not limited, power-sharing schemes are now described with respect to FIGS. 45 to 50. Certain embodiments of such power sharing schemes can rely on a configuration or operation of a particular torque conversion mechanism 107 (or associated energy storage device 264) being configured to obtain at least some electricity from a portion of one or more non-associated ones of the at least one jet engine. Such being configured to obtain at least some electricity from a portion of one or more non-associated ones of the at least one jet engine can be dynamic, since those jet engines from which each torque conversion mechanism can receive electricity over time can vary based on, for example, on such factors as user preference, charge of the energy storage device, one or more jet engines being shut down or failing, or use of electricity by one or more of the rotatable working fluid displacement engines 74.

Figure 45:
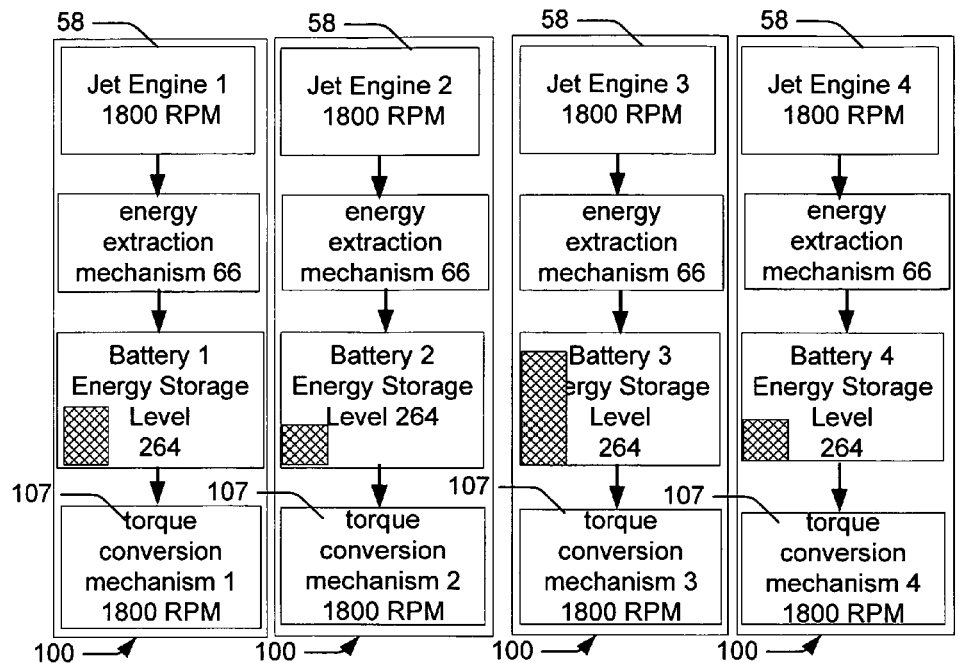
FIG. 45 is a diagram of an embodiment of a power sharing that illustrates the power is contained within a number of energy storage devices and the power being applied to a plurality of torque conversion mechanisms of the hybrid propulsive engine.

FIG. 45, for example, illustrates an embodiment of the hybrid propulsive engine 100 in which the power-sharing scheme provides for the aircraft's jet engines 58 providing power to its individual energy storage device 264, such as the battery. In this embodiment, each energy storage device 264 can be utilized to individually power its respective torque conversion mechanism 107 (that in turn powers its independently rotatable propeller/fan engine 62 or rotatable compressor element) at a desired rotatable rate. Such power-sharing schemes can be based on each torque conversion mechanism 66 using electricity generated by its respective associated jet engine (or more particularly an associated turbine section of the associated jet engine 58).

Figure 46:
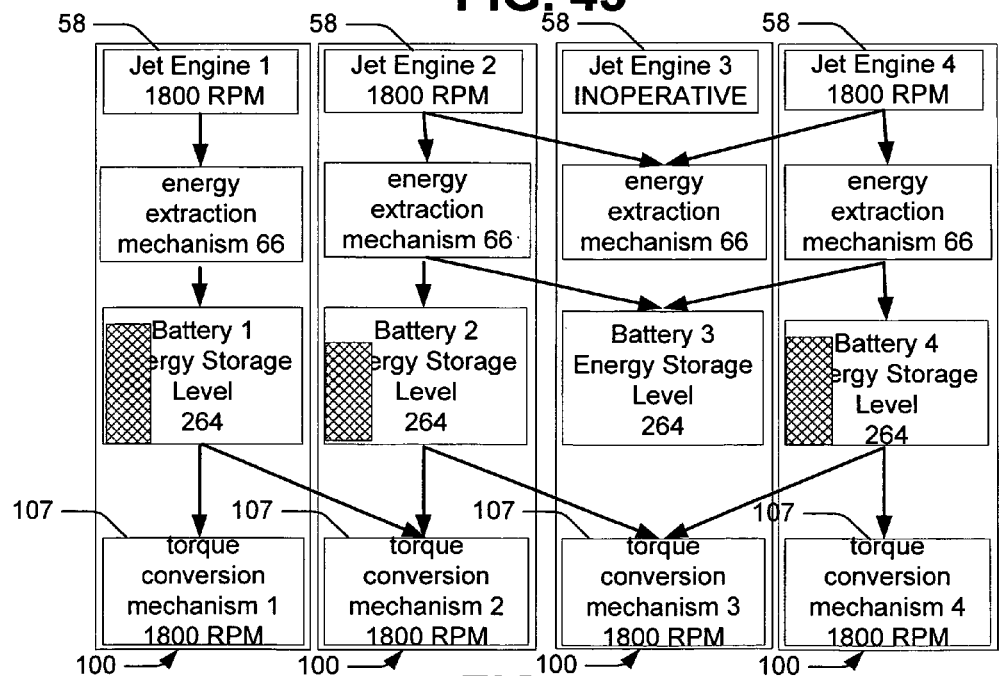
FIG. 46 is a diagram of an embodiment of the power sharing that illustrates the power is contained within a number of the energy storage devices and the power being applied to a plurality of the torque conversion mechanisms of the hybrid propulsive engine.

FIG. 46, for example, illustrates an embodiment of the hybrid propulsive engine 100 in which the power-sharing scheme, in which for the aircraft's jet engines 58 each individually provide power to its individual energy storage device 264 (e.g., a battery). Consider, for example, that the third jet engine of FIG. 46 becomes inoperative, or otherwise shuts down (perhaps intentionally as an energy saving technique). Alternatively, the third energy storage level or element could become inoperative or otherwise shut down. The third torque conversion mechanism could thereupon receive its electricity (that it may use to at least partially drive the rotatable working fluid displacement engines 74 such as independently rotatable propeller/fan engine 62 of FIG. 8, or at least a portion of the jet engine 58 such as the respective independently rotatable compressor rotor 120 or independently rotatable compressor stator 493 of FIG. 9 or 10) from one or more other jet engines or energy storage devices, or at least a portion of the jet engine 58 such as the independently rotatable turbine jet stator 477 of FIG. 11). One aspect of such power-sharing schemes might be to limit differences in the power available to each of the at least one rotatable working fluid displacement engine 74 from one or more jet engines and/or energy storage devices.

Additionally, certain of the at least one energy storage devices 264, as described with respect to FIGS. 8 to 11, that has a low charge can receive a charge transferred from one or more other jet engines (e.g., transfer electricity, or power associated therewith, from jet engine 2 to jet engine 4 of FIG. 46). Such power sharing, at one or more levels, can be performed at least partially using sensed electric levels, as well as the hybrid propulsive engine controller 97 such as to sense uneven energy states between multiple energy storage devices, and increase the power supply to the lower-charged energy storage devices as compared to others, as well as to limit the drain to the lower charged energy storage devices as compared to others. Such unevenness of energy states in certain embodiments of energy storage devices 264 can be based on such factors as a variation of electricity by various torque conversion mechanisms 107, current state of the at least one rotatable working fluid displacement engines 74, variation of electricity supply by certain jet engines 58, etc. Such power sharing between different ones of the at least one rotatable working fluid displacement engines 74 can be performed either manually, such as by a pilot or flight engineer observing an indicator in the cockpit that indicates those batteries that have low power or are not operating as desired; or automatically, such as by using one or more of certain embodiments of the hybrid propulsive engine controller 97. Such automatic control by certain embodiments of the hybrid propulsive engine control or 97 can be used to reduce variations of the electricity supplied for, or being applied to the corresponding components of different hybrid propulsive engines 58.

Figure 47:
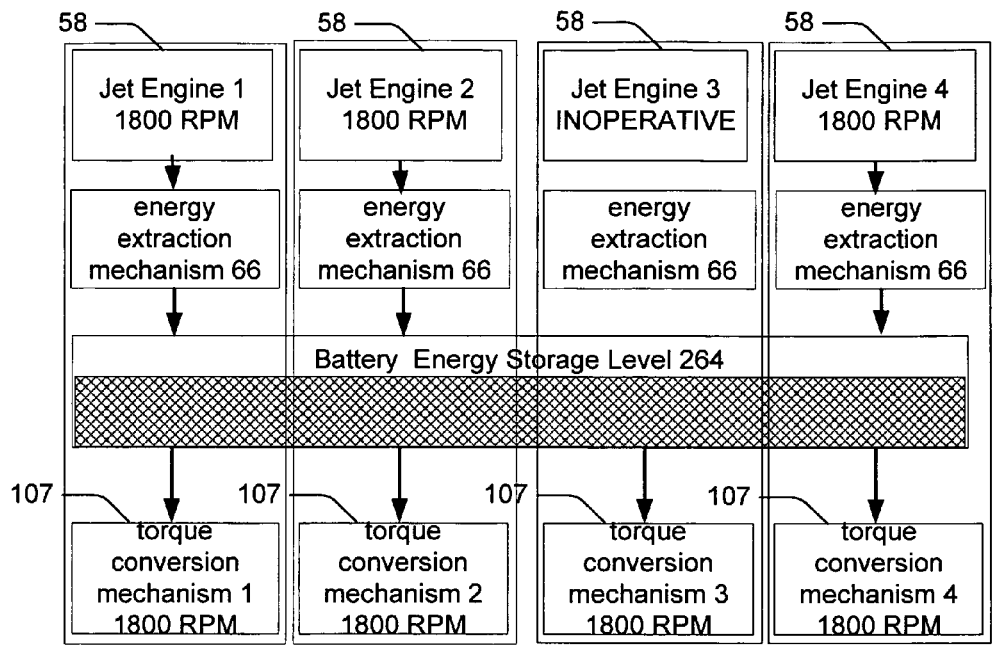
FIG. 47 is a diagram of an embodiment of the power sharing that illustrates the power is contained within a number of the energy storage devices and the power being applied to a plurality of the torque conversion mechanisms of the hybrid propulsive engine.

FIG. 47 illustrates an embodiment of the hybrid propulsive engine 100 in which the power-sharing scheme in which for the aircraft's jet engines 58 can each individually provide power to a single energy storage device (e.g., the unitary bank of batteries or a battery). For instance, a single battery or other energy storage device could be used to supply all the electricity to all of the torque conversion mechanisms (or at least a number thereof). It may be possible, for example, to provide one centralized energy storage device for all the aircraft hybrid needs in the fuselage, or to provide a centralized energy storage device for those of the hybrid propulsive engine 100 situated on a wing in that wing or within the fuselage.

Figure 48:
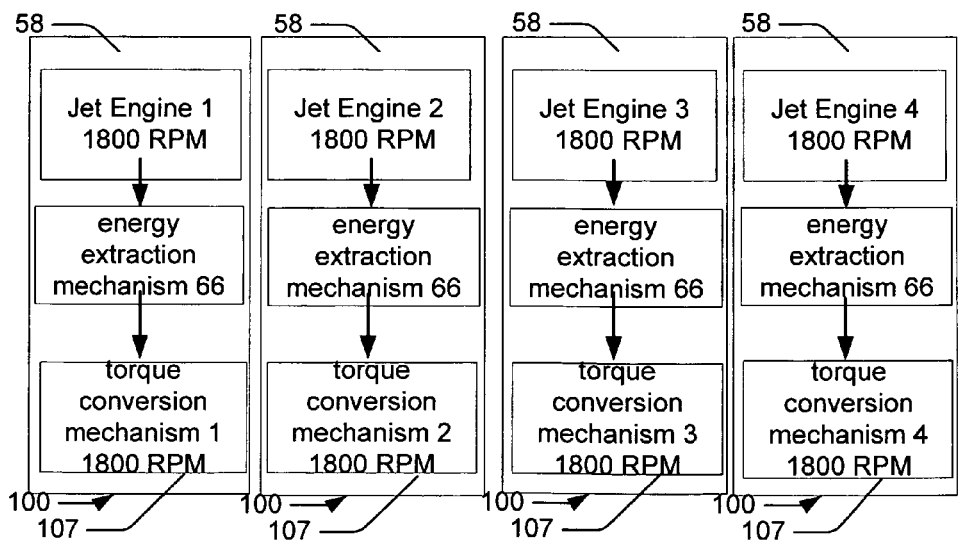
FIG. 48 is a diagram of an embodiment of the power sharing that illustrates the power being applied to a plurality of the torque conversion mechanisms of the hybrid propulsive engine.
Figure 49:
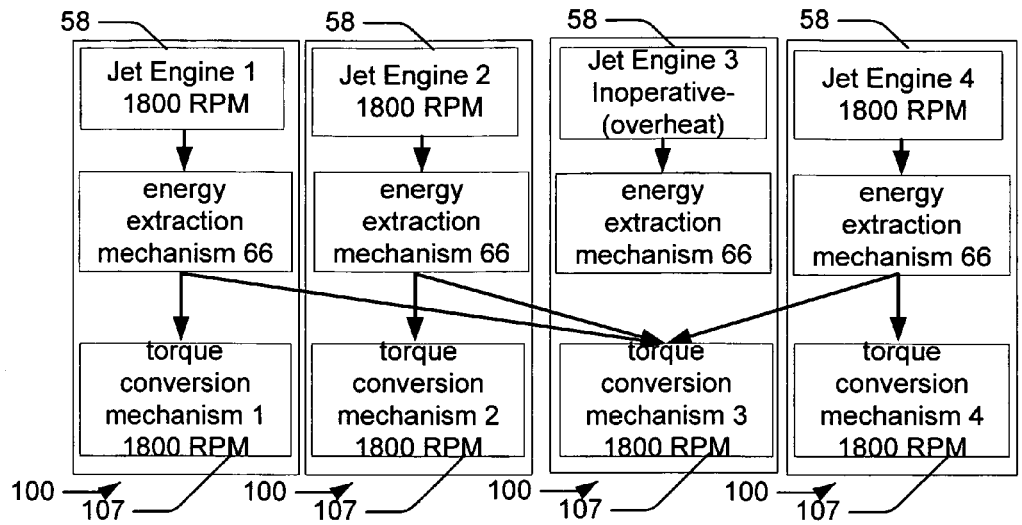
FIG. 49 is a diagram of an embodiment of the power sharing that illustrates the power being applied to the plurality of the torque conversion mechanisms of the hybrid propulsive engine.
Figure 50:
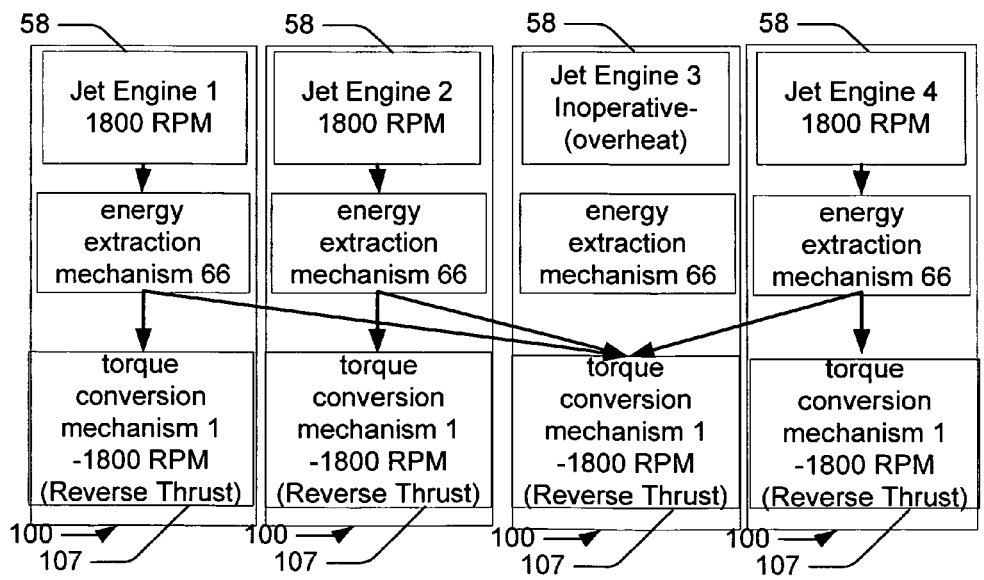
FIG. 50 is a diagram of an embodiment of the power sharing that illustrates the power being applied to the plurality of the torque conversion mechanisms of the hybrid propulsive engine.

FIGS. 48, 49, and 50 illustrates a number of embodiments of multiple ones of the hybrid propulsive engine 100 in which the power-sharing scheme in which for the aircraft's jet engines 58 each energy extraction mechanism 66 can be configured to individually provide power to one or more torque conversion mechanism 107. For example, there are no energy storage device(s) between each energy extraction mechanism 66 and each respective torque conversion mechanism 107, in the FIGS. 48, 49, and 50 embodiments of the hybrid propulsive engine 100. As such, FIG. 48 illustrates each jet engine 58 providing at least some electricity to power its respective torque conversion mechanism. Certain embodiments of the hybrid propulsive engine controller 97 can control the power sharing aspects (sensing as well as operation or control) between the jet engines and the torque conversion mechanisms of the hybrid propulsive engine 100, as described in this disclosure, or alternately a pilot, operator, or controller could control such power sharing aspects, particularly to those torque conversion mechanisms 107 used to power the rotatable working fluid displacement engines 74.

FIGS. 45 and 46 illustrate an embodiment of the hybrid propulsive engine 100 utilizing a power-sharing scheme in which power is maintained to a desired set of torque conversion mechanisms, even when one or more jet engines (that may be associated with certain ones of the desired set of torque conversion mechanisms) becomes inoperative or otherwise is shut down. In the case, the third torque conversion mechanism draws its power from other than the third jet engine (in the FIG. 45 diagram, the second and fourth jet engine) to provide the desired instantaneous operation. FIG. 46 illustrates that a similar power sharing scenario as FIG. 45, except the torque conversion mechanisms are being used to provide reverse thrust (e.g., operate in the opposite direction) as compared with the normal operation of the torque conversion mechanism of FIG. 45.

This disclosure therefore provides a variety of relatively energy efficient power sharing aspects of the at least one independently rotatable propeller/fan 258 which may be operationally separated from the jet engine. For example, certain embodiments of the hybrid propulsive engine 100 can be configured without such mechanical linkages as one or more shaft (or an associated gear-box) connecting from the jet engine to the at least one independently rotatable propeller/fan 258. Such powering of certain embodiments of the at least one independently rotatable propeller/fan 258 from one or more of the energy extraction mechanism 66 (e.g., excluding mechanical linkages, mechanical shafts, gear boxes, etc.) can limit the amount of energy applied to rotatably accelerate the components of the jet engine 58 to operate, or start the jet engine. As such, the jet engine can be started up quite quickly.

Certain embodiments of the hybrid propulsive engine 100 can utilize certain of the energy efficiency aspects characteristics of hybrid energy sources that have been applied to automobiles, light trucks, and other vehicles. Certain embodiments of the energy sources can be configured as, for example, a primary battery or a fuel-driven energy extraction mechanism, etc. Consider that certain embodiments of the hybrid propulsive engine 100 can be considered as a hybrid vehicle due to the multiple energy/power provides (the at least one rotatable working fluid displacement engines 74 as operationally combined with the jet engine 56). Such driving of the at least one rotatable working fluid displacement engines 74 by the torque conversion mechanism can make the use of a variety of heavy and cumbersome mechanical linkages such as extended shafts and gear-boxes particularly challenging.

Such mechanical linkages as extended shafts, mechanical connectors, and gear boxes as are often used in conventional turboprops/turbofans tend to add considerable weight, particularly since they have to operate at sufficient rotatable velocities for the jet engines and/or the at least one independently rotatable propeller/fan 258, and since they have to be designed with sufficient structural integrity not to fail in flight. In addition, such mechanical linkages, mechanical connectors, and gear boxes typically do not allow for such independent operation between the associated elements, in the turboprops or turbofans between the at least one rotatable working fluid displacement engines 74 and the jet engine 58. Utilizing the torque conversion mechanisms 107 to power the at least one rotatable working fluid displacement engines 74 of the independently rotatable propeller/fan engine 62 (in place of the mechanical linkages associated with the extended shafts and gear boxes) can, based on use of powerful batteries and torque conversion mechanisms 107 (certain of the batteries or torque conversion mechanisms may involve a number or recently developed or other aspects such as may provide considerable power) as described with respect to FIGS. 8 to 11. The use of the torque conversion mechanisms to power the at least one rotatable working fluid displacement engines 74, etc. can limit the overall weight of the hybrid propulsive engine 100, and thereby allow for more efficient operation, and perhaps longer range, increased payloads, etc. of the aircraft 75 as described with respect to FIG. 1, and in addition can add in certain instances to safe operation of the aircraft. Utilizing certain embodiments of the torque conversion mechanisms 107 to power the at least one rotatable working fluid displacement engines 74. Such power-sharing can provide for a considerable amount of independent operation, such as between multiple torque conversion mechanisms 107, even if the associated jet engine 58 is inoperative.

Such independent operation, such as power sharing, between multiple respective torque conversion mechanisms 107 to power multiple respective rotatable working fluid displacement engines 74 of FIGS. 8 to 11, can be useful to limit asymmetrical thrust for aircraft 75 being powered by multiple hybrid propulsive engines 100. Consider that if the at least one independently rotatable propeller/fan 258 slows down, becomes stopped, or windmills for any reason, not only will the thrust being produced by that respective hybrid propulsive engine 100 be limited, but individual blades of the at least one independently rotatable propeller/fan 258, when not rotating, can act as a "drag" to (perhaps not uniformly) brake the aircraft or cause the aircraft to yaw, pitch, or bank in the direction of the inoperative jet hybrid propulsive engine 100. By allowing the torque conversion mechanism 107 to power the at least one independently rotatable propeller/fan 258 even if the jet engine 58 is operating improperly or not operating at all, then the thrust characteristics as well as the drag characteristics of the not-fully operating hybrid propulsive engine 100, in general, may be more similar to a completely operating hybrid propulsive engine than is the case with conventional turboprops, turbo jets, etc.

By providing power sharing between multiple torque conversion mechanisms 107 of electricity generated by the energy extraction mechanism 66, it is possible that a single jet engine 58 may be operatively associated with multiple torque conversion mechanisms 107, at any given time, each of which torque conversion mechanism 107 can provide at least some power to individual ones of the at least one rotatable working fluid displacement engines 74 of FIGS. 8 to 11. This may allow one or more coaxial and/or one or more non-coaxial rotatable propeller/fan 258, for example, to be substantially aligned with the jet engine 58 during normal cruise. For instance, on each wing of an airplane, a jet engine 58 may power a substantially coaxially situated rotatable working fluid displacement engine 74 (e.g., rotatable propeller/fan 258) that may be, in certain turboprop/turbofan configurations, the working fluid passing through the jet engine may power the rotatable turbine element 105. In certain instances, one or more rotatable propeller/fans may be mounted on the wing inboard or outboard of, and thus not substantially coincident with though perhaps at least partially coincident with in various embodiments, the particular rotatable turbine element 105 of the jet engine that powers the at least one rotatable working fluid displacement engine 74.

Certain embodiments of the at least one jet engine 58 can be configured as dual-spool engines, in which at least some of the at least one compressor section 102 and at least a portion of the at least one turbine section 104 (typically at the high pressure side) accelerate during the first spooling, while at least some of the at least one turbine section 104 (typically the low pressure side) of at least part of they compressor rotary elements and the independently rotatable propeller/fan engine 62 accelerate during the second spooling. Dual or multiple spooling hybrid propulsive engines 100 (whether the at least one rotatable working fluid displacement engine 74 such as the at least one independently rotatable propeller/fans 258 are mechanically or electrically driven by the jet engine) are often quicker to start, require the same or less energy to start, and are more responsive to accelerate or spool than similarly sized and configured conventional engines such as single-spool conventional turboprops/turbofan engines.

There are a variety of multi-spool configurations that can be provided in which the variation is based at least partially on the particulars of the second spooling. In certain embodiments of the hybrid propulsive engine 100, the at least one independently rotatable propeller/fan assembly can be configured to accelerate by itself, such as being powered by the torque conversion mechanism 107, with some assistance perhaps certain embodiments of the rotatable working fluid displacement engine 74 provide or enhance a flow of working fluid through the jet engine 58.

In a second embodiment of the at least one independently rotatable propeller/fan assembly, as the at least a second portion of the compressor rotary element accelerates during the second spooling (e.g., the first portion of the compressor rotary element that includes one or more rotatable portions of the stages, accelerates during the first spooling). Since the second compressor portion is not accelerated during the first spooling, the first spooling can be performed more quickly. A third embodiment of the second spooling includes the components of the first two embodiments.

To indicate how important an increased spooling rate may relate to how quickly a jet engine 58 and/or the at least one independently rotatable propeller/fan engine 62 can accelerate to a desired rate. Consider those instances of an aircraft descending, while approaching at a relatively low altitude above an airport. Under these circumstances, the power setting of the jet engines of the aircraft may be quite low, since the aircraft is descending, and does not require much thrust to maintain the lift during descending. Consider an instance where another aircraft or obstruction is on the landing runway, or perhaps the pilot cannot visually detect the airport at the end of an approach, and must therefore execute a missed approach. Also consider a low instrument approach on a foggy or cloudy day when an aircraft bursts out of the clouds at an undesired or uncertain location, and it is important to apply thrust quickly to perform a missed approach. The pilot or crew could attempt to allow the aircraft to climb by pushing the throttle forward and accelerating the aircraft, and certain embodiments of the least one hybrid propulsive engine 100 can be accelerated and/or spooled relatively quickly because of the less inertia associated with increasing engine speed during spooling. Since the actual thrust produced by certain embodiments of the hybrid propulsive engine 100 may be considerably below the desired thrust during these spooling periods, it is more likely that the aircraft will be able to perform as well as desired or necessary during the spooling periods (e.g., climb at a desired rate).

Relatively low spooling rates (considerable time for the engine to spool up) are recognized by pilots as potentially providing a dangerous situation, and jet engine manufacturers, aircraft manufacturers, as well as flight crew may request an increase in the rate of rotatable engine speed (during spooling) as much as practicable. Certain embodiments of the hybrid propulsive engine 100 can be configured to increase the rate of rotatable engine speed during spooling, largely by reducing the associated inertia of the turboprop/turbofan being accelerated, and thereby allow the aircraft to achieve its desired flight configuration related to rotational velocity of the jet engine, such as a desired rate of climb, quickly.

Certain embodiments of the hybrid propulsive engine 100 can be configured to operate with reduced noise. In general, conventional propeller aircraft are quieter during take-off than jet aircraft, to the surroundings. Consider that in sound-sensitive aircraft applications (such as are becoming more common with aircraft taking off from and/or landing at more airports), fewer jet engines can be operated. Additionally, more power from those fewer jet engines can be powershared from the operating jet engines and provided to multiple ones of the independently rotatable propeller/fan engine 62 to reduce the noise associated with jet engines, while remaining within selected operating characteristics as described with respect to FIGS. 8 to 11, and 45-50, as well as other locations in this disclosure. Alternately, the jet engines can be operated at lower power settings, and some of the power to the aircraft can be powershared from the operating jet engines and provided by the independently rotatable propeller/fan engine 62.

Turboprop engines as well as turbofan engines have typically proven themselves to be relatively energy efficient as compared with comparable jet engines alone. Certain embodiments of the hybrid propulsive engine 100 are capable of obtaining a relatively rapid spooling acceleration response such as an increased spooling rate. The more rapid response rates of the at least one hybrid propulsive engine 100, being configured with a respective propeller or fan that may improve climb characteristics, particularly at lower altitudes, may provide for such aspects as taking off and emergency climbing within shorter distances, as well as short field take-offs and landings. Considering the design of the hybrid propulsive engine 100, a percentage of the working fluid (e.g., air) that passes through the respective propeller or the fan also passes through the jet engine (aka, turbine powered engine) as per the reference character 54 as relatively described with respect to FIGS. 8 to 11. Since the respective propeller or the fan of the turboprop or the turbojet may typically be considerably larger in diameter than the rotatable components of the jet engine described with respect to FIGS. 8 to 11, some percentage of the air that passes through the respective propeller or the fan can also flow around the inlet of the at least one jet engine 58 as per the reference character 56, and thereby be characterized as a bypass flow passing through the bypass region 144.

3. Hybrid Propulsive Engine Including Independently Rotatable Propeller/Fan Engines This disclosure now describes a number of embodiments of the at least one rotatable working fluid displacement engines 74 configured as at least one independently rotatable propeller/fan engines 62. As such, certain embodiments of the hybrid propulsive engine 100 are configured such that the at least one torque conversion mechanism 107 that is used to at least partially power at least one of the at least one rotatable working fluid displacement engines 74 is configured particularly as independently rotatable propeller/fan engines 62. Those embodiments in which the at least one rotatable working fluid displacement engines 74 is configured particularly as independently rotatable propeller/fan engines 62 are described, particularly with respect to FIGS. 3, 4, 8, 30, 31, and 32, as well as other locations in this disclosure. This can allow for continued operation of at least some of the independently rotatable propeller/fan engines 62 under the power of the at least one torque conversion mechanism, even if one or more of the at least one jet engines 58 becomes inoperable, or is shutdown. Certain of such embodiments of the hybrid propulsive engine 100 can provide for improved operational inefficiencies since of thrust provided by the independently rotatable propeller/fan engine 62 can be varied in certain embodiments relative to the jet engine.

Such independent driving of certain embodiments of the independently rotatable propeller/fan engines 62 can, depending on context, be in either direction as well as some controllable rotational velocity, such as can be provided by certain embodiments of the torque conversion mechanism 107 (e.g., the electric motor) as described with respect to FIG. 2, and other locations in this disclosure. Certain embodiments of the hybrid propulsive engine 100 can be configured in which the at least one torque conversion mechanism 107 can be used to at least partially power at least one of the independently rotatable propeller/fan engine 62 in a manner that allows for increased energy-efficiency, since the at least one independently rotatable propeller/fan engine 62 and the at least one jet engines 58 can each be operated at independent rotational velocities from each other in an attempt to improve or optimize the operation such as to at least partially rely on the current operating conditions, altitude, desired speed of the aircraft, etc. As such, certain embodiments of the hybrid propulsive engine controller 97, as well as the pilot or operator of the aircraft, can operate in an attempt to efficiently achieve a combination of the rotational velocities between the at least one jet engine 58 and the at least one independently rotatable propeller/fan engine 62 for each instantaneous condition. For example, propellers and fans are generally more efficient than jet engines at lower altitudes and while climbing at lower altitudes; while jet engines are generally more efficient and powerful than propellers and fans at higher altitudes. It may be desirable to alter or control the efficiency of the at least one hybrid propulsive engine 100 by increasing the ratio of the power provided by the at least one independently rotatable propeller/fan engine 62 relative to the at least one jet engine 58 at lower altitudes; and increasing the ratio of the power provided by the at least one jet engine 58 relative to the at least one independently rotatable propeller/fan engine 62 at higher altitudes.

This disclosure provides for a variety of independent rotatable operations of the at least one independently rotatable propeller/fan 258 of the independently rotatable propeller/fan engine 62 with respect to the jet engine(s) 58. Certain instances of such independent rotation of the at least one independently rotatable propeller/fan engine 62 with respect to the at least one jet engine 58 can provide for increased efficiency of the hybrid propulsive engine 100 using a variety of techniques, certain of such techniques might be recognizable to designers and/or users of hybrid automobiles or other efficient aircraft or vehicle design, as described herein. Certain embodiments of the at least one hybrid propulsive engine 100 can therefore include, and have the at least one independently rotatable propeller/fan assembly 108 be powered at least partially by, the combination of the at least one energy extraction mechanism 66 and the at least one torque conversion mechanism 107.

Certain embodiments of the at least one hybrid propulsive engine 100 as driven by the at least one independently rotatable propeller/fan engine 62 can perform well even at higher altitudes. Typical piston-driven internal combustion engines can suffer diminished performance a higher altitudes as a result of the less dense oxygen, such as 10,000 or 20,000 feet. By comparison, certain torque conversion mechanisms such as those that rely on electric motors do not suffer from such performance limitations at higher altitudes, and may be expected that such torque conversion mechanisms can operate consistently even into space environments (even though the associated propellers or fans may not perform as well).

Certain embodiments of at least one jet engines 58 in addition to the at least one independently rotatable propeller/fan engine 62, as described with respect to FIGS. 3, 4, and 8, as well as other locations in this disclosure, can be integrated into a variety of turboprop engines and/or turbofan engines. The independently rotatable propeller/fan engine can be situated in different embodiments either in front of (proximate the jet engine inlet such as with FIGS. 3 and 4), or behind certain embodiments of the at least one jet engine 58 (adjacent the nozzle 59 of FIG. 11) in certain embodiments of the at least one hybrid propulsive engine 100. This disclosure describes what are likely to be more common configuration, where the independently rotatable propeller/fan engine 62 is situated proximate the jet engine inlet, but might be representative of certain design modifications (e.g., allow portions of the independently rotatable propeller/fan engine to withstand the heat and velocity of the exhaust from the jet engine 58).

With certain conventional turboprops and conventional turbofans, the respective at least one propeller or fan may be connected to be mechanically driven via at least one shaft by a turbine of the jet engine (either directly or more typically via a gear box). As such, the rotational velocity of certain conventional propellers/fans in conventional turboprops/turbofans are often constrained to some fixed percentage (based on the configuration of the gear box or lack thereof) of at least one rotatable element of the jet engine.

Certain embodiments of independently rotatable propeller/fan engine 62, as described with respect to FIGS. 3, 4, 8, 30, 31, and 32, can include, but is not limited to, the at least one torque conversion mechanism 107 and at least one rotary propeller/fan 258. With certain embodiments of the at least one independently rotatable propeller/fan assembly 108, the at least one torque conversion mechanism 107 rotatably drives the at least one rotary propeller/fan 258. Typically, larger jets may be fitted with turbofan engines in which a fan assembly (typically comprising a fan hub and ducted fan blades) is operationally associated with the at least one at least one jet engine 58. By comparison, medium and/or smaller jets, may typically be fitted with turboprop engines (in which the rotary propeller/fan 258 includes the propeller having propeller blades and a propeller hub, not shown) or turbofan engines, though there are exceptions. Jet engines are used primarily for aircraft applications, but also have been applied to land and sea vehicles (including hydocraft), all of which, depending on scope, are intended to be covered by the teachings of this disclosure.

Certain embodiments of the at least one jet engine 58 can be configured as a stand-alone devices to provide thrust to aircraft or other vehicles, or alternately can be configured to be independently associated with a respective fan or propeller such as to form the hybrid propulsive engine 100. As such, certain embodiments of the hybrid propulsive engine 100 may be configured to provide independent operation between the at least one jet engine 58 and the at least one independently rotatable propeller/fan 258. Additionally, certain conventional jet engines as well as conventional turbojets or turboprops could be retrofitted to, in effect, become an embodiment of the hybrid propulsive engine 100 (such as by the addition of the at least one independently rotatable propeller/fan engine 62 which may be controlled by an associated pilot, operator, and/or hybrid propulsive engine controller 97).

Such independent rotatable operation of the rotatable portions of the jet engine 58 relative to the at least one independently rotatable propeller/fan 258 can be considered as being representative of certain embodiments of a hybrid turboprop or hybrid turbofan design. This hybrid turboprop or hybrid turbofan design may thereby be viewed as to provide independent rotational operation between the at least one jet engine 58 and the at least one independently rotatable propeller/fan 258. Such independent operation may, or may not, indicate the jet engine 58 operates at different controllable rotational velocities, or operates in the same or reverse directions, from the independently rotatable propeller/fan engine 62. The term "hybrid", as applied to this disclosure can, depending on context, be viewed as similar to usage with hybrid automobiles, wherein either, neither, or both of a gas engine (e.g., the jet engines) and a torque conversion mechanism can be configured to apply power, at any given time and/or condition, to propel the vehicle at certain times of operation.

By being able to reverse the direction of the at least one independently rotatable propeller/fan engine 62, a change between normal thrust as compared with reverse thrust can be effected. Such changing of direction or polarities of such electric motors, as may be associated with the at least one independently rotatable propeller/fan engine 62, can be performed quickly, such as may be useful to ease the mechanical structure associated with many reverse thrust applications. A variety of electric motors can provide considerable power for relatively brief durations, such as may be useful for relatively quick bursts of power such as with take-offs and climbs, etc. The type of performance associated with particular electric motors can be considered relating to the particular aircraft performance and application.

With certain embodiments of the at least one hybrid propulsive engine 100, at least one jet engine 58 that is malfunctioning or not operating can be even shut down and/or may be properly treated, and the aircraft can operate under the supplemental power from the independently rotatable propeller/fan engine 62 using power sharing concepts as described with respect to FIGS. 45 to 50. If the aircraft has one or more relatively powerful hybrid propulsive engine 100 with an energy storage device 264, as described with respect to FIG. 9, then additional power derived on less energy intensive portions of flying (e.g., landing, etc.) can be provided for can be operated to provide power for more energy intensive portions of flying (e.g., take-off, cruising, emergencies, etc.).

Additionally, certain embodiments of the at least one independently rotatable propeller/fan engine 62 can be configured to control or affect the aerodynamics of the aircraft (for multi-engine aircraft). For example, with an engine outage of certain embodiments of conventional jet, turboprop, or turbofan engines could result in asymmetrical thrust if at least one hybrid propulsive engine 100 (for multi-engine aircraft) is shut down. Such asymmetrical thrust in which an axis aligned with the averaged thrust of remaining operating engines are far from aligned with the center of mass of the aircraft can make flying certain aircraft difficult, or even impossible, to control. Asymmetrical thrust can make aircraft more difficult to fly, and has even been credited as a contributing factor in a number of airplane crashes. By allowing the at least one independently rotatable propeller/fan engine 62 to continue to operate even if the jet engine malfunctions or is shut down, the assymetrical thrust effects can be reduced.

As such, the at least one independently rotatable propeller/fan engine 62 of the at least one hybrid propulsive engine 100 can continue to operate and generate thrust even when an associated jet engine 58 is shut down, the thrust differential between the malfunctioning or shut down hybrid propulsive engine and the others can be limited. In certain instances, if a particular hybrid propulsive engine 100 is shut down, then the at least one independently rotatable propeller/fan engine 62 can be accelerated or even run at full speed to limit differential of total thrust between the functioning and non-functioning hybrid propulsive engines.

Certain embodiments of the hybrid propulsion engine 100, as shown in FIGS. 3 and 4, illustrates the independently rotatable propeller/fan engine 62 that can be tilted from a substantially aligned position (shown in solid) to a substantially tilted position (shown in dotted-line). The selection between the substantially aligned position as well as the tilted position can be arbitrary, and may differ depending on the configuration of each particular one of the hybrid propulsive engine 100. Certain embodiments of the independently rotatable propeller/fan engine 62 can be configured to rotate about the rotatable propeller/fan axis 305 when in the substantially aligned position (shown in solid) resulting from input from the torque conversion mechanism 107. When the independently rotatable propeller/fan engine 62 is rotating within its substantially aligned position, the rotatable propeller/fan axis 305 can be substantially collinear with the direction which the working fluid passes through the jet engine 58, and it is configured to provide a thrust that is substantially parallel to the rotatable propeller/fan axis 305. Instead of being tiltable, certain embodiments of the independently rotatable propeller/fan engine 62 can be fixedly mounted at a fixed angle relative to the jet engines, as well as being adjustable. When the thrust as provided to the independently rotatable propeller/fan engine 62 is substantially parallel to an axis of rotation (e.g., the shaft) of the jet engine 58 (in the solid position of the independently rotatable propeller/fan engine 62 illustrated in FIGS. 3 and 4), then the thrust provided by the independently rotatable propeller/fan engine 62 adds directly to the thrust provided by the jet engine.

Certain embodiments of the independently rotatable/fan engine can use a tilt adjuster (not shown), to adjust the angle of the independently rotatable propeller/fan engine 62 from a first aligned position (e.g., in which the rotatable propeller/fan axis 305 is substantially parallel to a generalized direction of flow of the working fluid passing through the jet engine 58) to the substantially tilted position (shown in dotted-line), in which the rotatable propeller/fan axis 305 is tilted relative to the generalized direction of flow of the working fluid passing through the jet engine. It is envisioned that such tilt adjusters can use such know technologies as pivots, leveraging, hydraulics, fly-by-wire, or other known systems to provide such tilting function either as input from the pilot, or alternately using certain embodiments of the hybrid propulsive engine controller 97 as described with respect to FIG. 8.

As the independently rotatable propeller/fan engine 62 is tilted from the rotatable propeller/fan axis 305 to the tilted rotatable propeller/fan axis 305*a*, the thrust as provided by the independently rotatable propeller/fan engine 62 also tilts from being parallel to the rotatable propeller/fan axis 305 to being parallel to the tilted rotatable propeller/fan axis 305*a*.

When the thrust as provided to the independently rotatable propeller/fan engine 62 is tilted relative to the axis of rotation of the jet engine 58 (in the dotted-line position of the independently rotatable propeller/fan engine 62 illustrated in FIGS. 3 and 4), then a horizontal component of the thrust (perhaps in addition to the vertical component of thrust) can be provided by the independently rotatable propeller/fan engine 62 and the horizontal component of the propeller/fan engine thrust can thereby substantially add to the jet engine thrust provided by the jet engine. Though the horizontal component of the propeller/fan engine thrust as provided by certain embodiments of independently rotatable propeller/fan engine 62 can be taken relative to the ground, the jet engine, or the aircraft by comparison, the vertical component of thrust can add to the lift of the wings of the aircraft, as well as may be considered as overcoming the weight (or gravity) of the aircraft. The vertical component of the propeller/fan engine thrust as provided by certain embodiments of independently rotatable propeller/fan engine 62 can be taken relative to the ground, the jet engine, or the aircraft.

As such, by tilting the independently rotatable propeller/fan engine 62 such that the rotatable propeller/fan axis tilts from being substantially aligned with the rotatable propeller/fan axis 305 to being substantially aligned with the tilted rotatable propeller/fan axis 305*a*, the (e.g., forward) thrust can be reduced, while the upward component of thrust can be increased. Such tilting of the independently rotatable propeller/fan engine 62 may be appropriate, for example, in certain instances or configurations if it might be desired to switch from providing greater horizontal acceleration or horizontal velocity to providing greater lift.

Such tilting configurations and the resulting modification of the vertical component of thrust as well as the horizontal component of thrust are intended to be illustrative in nature, but not limiting in scope. Such tilting of the independently rotatable propeller/fan engine 62 as to relatively adjust the vertical component of thrust with respect to the horizontal component of thrust can be used in certain instances to adjust certain performance aspects of the aircraft. For instance, if it is desired to accelerate quicker or go faster in a direction aligned with the aircraft or the jet engine (such as when accelerating along a runway during takeoff prior to rotation), certain embodiments of the independently rotatable propeller/fan engine 62 can, depending on context, be aligned with the rotatable propeller/fan axis 305 such as to increase the horizontal component of thrust, as described with respect to FIGS. 3 and 4. By comparison, if it is desired to climb quicker, be able to carry greater loads, fly at slower speeds, etc., certain embodiments of the at least one independently rotatable propeller/fan engine 62 can, depending on context, be more aligned with the tilted rotatable propeller/fan axis 305*a* such as to increase the vertical component of thrust, as described with respect to FIGS. 3 and 4. For instance, during rotation, certain embodiments of the hybrid propulsive engines 100 can be configured such that the at least one independently rotatable propeller/fan engine 62 is tilted such as to provide an increased vertical component of thrust, and allow the aircraft to operate as if it weighs less and can thereby in certain embodiments take off after rotation with, for example, a quicker rate of climb, a shorter take-off run, a slower airspeed, and perhaps other such performance characteristics.

For example, when an airplane is taking off during the initial take-off run along the runway, certain embodiments of the independently rotatable propeller/fan engine 62 may be substantially aligned with the rotatable propeller/fan axis 305. As the aircraft is accelerating to reach its rotation point (where the plane takes off), certain embodiments of the independently rotatable propeller/fan engine 62 may be substantially aligned with the rotatable propeller/fan axis 305.

By tilting the at least one independently rotatable propeller/fan engine 62, the performance parameters of a variety of hybrid propulsive engines can be modified. For example, by tilting the at least one independently rotatable propeller/fan engine 62 downward, the aircraft may have more of a tendency to be steered downwardly such as to descend. It may be desired to tilt certain embodiments of the at least one independently rotatable propeller/fan engine 62 downwardly following touch-down, such that the aircraft will have the effect of weighing more, such as perhaps being configured to "stick" to the runway.

Another "displacement" that can be provided to certain embodiments of the independently rotatable propeller/fan engine 62 relative to the at least one jet engine 58 can involve laterally offsetting the independently rotatable propeller/fan engine 62 (in either a vertical offset, a horizontal offset, or some combination thereof) relative to the remainder of the hybrid propulsive engine or the aircraft. While the figures do not display such offset, it can involve displacement of at least one of the independently rotatable propeller/fan engine 62 in a direction substantially perpendicular to that of the working fluid flowing through the jet engine. Certain embodiments of the independently rotatable propeller/fan engine 62 can be positioned in a fixed offset location, or alternately can be displaceably offset during flight or on the ground.

Certain embodiments of the tilting of the independently rotatable propeller/fan engine 62 can be controlled at least partially by a variety of sensed, determined, and/or calculated parameters by the pilot or operator, or alternately can be controlled at least partially by the hybrid propulsive engine controller 97. A variety of generally known, but not limiting, mechanisms or actuators such as pivoted linkages, hydraulics, pneumatics, stepper motors, etc. can be used. Such particular tilting configurations and operations of the independently rotatable propeller/fan engine 62 are intended to be illustrative in nature, but not limiting in scope. Since certain embodiments of the torque conversion mechanism 107, such as electric motors, can be relatively easily tilted, offset, angled, or otherwise displaced in combination with the independently rotatable propeller/fan engine 62, it can be relatively simple in construction such as can provide such displacements for a variety of embodiments of hybrid propulsive engines 100 (and may not have to rely on such mechanical connections as shafts, gearing, etc. to transfer torque from, for example, conventional jet engines).

Certain embodiments of the torque conversion mechanism 107 can be configured to allow a variety of embodiments of the rotatable working fluid displacement engine 74 as described with respect to FIG. 2 to shut down, as well as being restarted either on the ground or in flight. Certain examples of such rotatable working fluid displacement engine 74 that can be configured to be accelerated, and thereupon cause the at least one jet engine 58 to accelerate or start can include, but are not limited to: the at least one independently rotatable propeller/fan 258 as described with respect to FIG. 8, the at least one independently rotatable compressor rotor 120 as described with respect to FIG. 9, the at least one independently rotatable compressor stator 493 as described with respect to FIG. 10, as well as the at least one independently rotatable turbine stator 477 as described with respect to FIG. 11. By providing more suited configurations of the at least one independently rotatable propeller/fan engine 62 relative to the at least one jet engine 58, certain embodiments of the hybrid propulsive engine 100 can be configured to considerably increase fuel efficiency of the aircraft. The various embodiments of the rotatable working fluid displacement engine 74 can be accelerated relatively quickly, since it is accelerated by the torque conversion mechanism 107 and not the jet engine 58, and thereby reducing spooling of the jet engine. In an aircraft having multiple jet engines, at least some of the jet engines can be shut down at less than peak demand and restarted when the demand increases. Alternately, at least some percentage of the energy associated with operation of the jet engine can be converted into electricity, which can be used to power the independently rotatable propeller/fan engine 62.

Certain embodiments of the independently rotatable propeller/fan engine 62 can be operated, for some prescribed duration depending on the configuration of the hybrid propulsive engine 100, during loss of operation of the jet engine 58. Consider, for example, an aircraft taking off and losing power soon after take-off. It would be highly desirable to provide sufficient power (e.g., using the independently rotatable propeller/fan engine 62), to such aircraft in these of other difficult to control scenarios as to allow suitably propulsion and/or steerability such as to allow improved control during flight and/or landing, even if the aircraft is damaged.

It should be noted that different embodiments of aircraft are configured for different types of operations and can be configured to provide different types of flight characteristics. For example, certain jet fighters equipped with certain embodiments of hybrid propulsive engines might utilize the tiltability and/or offset of certain embodiments of independently rotatable propeller/fan engines 62 such as to provide improved maneuverability, increased acceleration, and/or decreased spooling rate. By comparison, certain jet aircraft or business jets equipped with certain embodiments of hybrid propulsive engines might utilize the tiltability and/or offset of certain embodiments of independently rotatable propeller/fan engines 62 such as to provide increased fuel economy, certain improved take off, climb, or landing characteristics, etc.

Certain embodiments of the at least one hybrid propulsive engine 100 can be operated to provide, or enhance, steerage, such as by selectively accelerating or decelerating the rotational velocity of at least some of the at least one rotary propeller/fan 258 using the torque conversion mechanism 107, as well as offsetting or tilting at least certain ones of the at least one independently rotatable propeller/fan engine 62. Such steerage can be used for normal as well as emergency conditions. Consider the aircraft of FIG. 1, if the turboprop, turbofan, or jet engines situated on one side (e.g., the left side) of the aircraft are operating more powerfully than those on the other side (e.g., the right side) of the aircraft, there will be an asymmetrical thrust that is stronger on the left side of the aircraft, and the plane will tend to yaw to the right. If the level of asymmetrical thrust is great enough, the aircraft might even become uncontrollable. Operating at least certain of the independently rotatable propeller/fan engine 62 can reduce, limit, or even eliminate such asymmetrical thrust, as well as the effects thereof. While such asymmetrical thrust may be undesired in certain instances for providing uncontrollability, it may be desired, when within limits, to provide steerage to the airplane 75 or other vehicle.

Certain embodiments of the at least one hybrid propulsive engine 100 can thereby be configured to provide or ensure certain types of steerage to a variety of aircraft. Consider if certain of the at least one hybrid propulsive engine 100, as well as certain of the at least one independently rotatable propeller/fan engine 62, on the left-side of an aircraft are operated at a higher speed to those of the right side of the aircraft. The tendency would be for the aircraft to yaw in a direction opposite to the side on which the jet engine being accelerated is situated (i.e., to the right). Another tendency might be, for example, for the aircraft to bank to the right as well since the left-wing would-be traveling faster than the right wing, and therefore the faster left wing would have greater lift than the slower right-wing (since wings traveling faster, all other things being equal, have a greater force contributing to lift than slower wings). As such, accelerating the at least one independently rotatable propeller/fan engine 62 on one side of an aircraft (typically in a multi-engine aircraft) while maintaining the independently rotatable propeller/fan engine 62 on the other side of the aircraft may result in a bank and a resulting turn towards the opposite side of the aircraft from the accelerated aircraft. Similarly, decelerating the rotational velocity of the at least one independently rotatable propeller/fan engine 62 on one side of an aircraft while maintaining the at least one independently rotatable propeller/fan engine on the other side of the aircraft may cause a bank and resulting turn to the side of the aircraft that is being decelerated.

Such powering of the turn may be performed to be coordinated, particularly without the application of considerable control surfaces. Within this disclosure, control surfaces of airplanes, for example, can include but are not limited to ailerons, rudders, and elevators which pilots or operators can use to control the path of the aircraft. By selective positioning of the at least one hybrid propulsive engine 100 relative to the center of gravity of the aircraft, the steerage as provided by the at least one hybrid propulsive engine can be effected about at least one of the aircraft's yaw, pitch, or bank axes. Such steerage about the pitch axis, for example, can be accomplished by providing more or less power through each of the engines of the hybrid propulsive engine 100, simultaneously. Certain embodiments of aircraft, perhaps including drones and other unmanned aircraft, can utilize these techniques to achieve steerage, and may in certain instances limit the use of suitable control surfaces, such as rudders, ailerons, elevators, flaps, etc.

Certain embodiments of the at least one hybrid propulsive engine 100 can be configured to provide or enhance certain types of trim to a variety of aircraft. In aircraft, trim refers to a control adjustment mechanism by which the pilot, a user, or a remote aircraft controller, can select or input a control pressure applied, for example, from a control surface to a control yolk or stick can be limited such as by slightly displacing a so-called "trim tab". Trim tabs can operate by altering airflow over the particular control surface, etc. such as to limit the need for trim. Flying a manned or unmanned aircraft without trim can be inefficient since excessive control force and control surface applications may be necessary to control the out-of-trim aircraft. When improperly applied, trim tabs or trim surfaces can actually act as speed brakes, since excessive control force and control surface applications become necessary and may require the aircraft to fly in an uncoordinated manner.

Trim tabs are most often used to limit control pressure along the pitch axis, and in certain aircraft along the yaw axis. For instance, if the aircraft was tending to yaw to one side of the aircraft (e.g., the left), one or more of the independently rotatable propeller/fan engines 62 on that side (e.g., the left) of the aircraft might be increased. By comparison, trim can either involve a gross or a fine adjustment effected by controlling the relative operation of certain of the at least one hybrid propulsive engine 100, particularly certain of the at least one independently rotatable propeller/fan engine 62. By providing a variety of embodiments of the at least one hybrid propulsive engine 100 that can provide or enhance steerage and/or trim, the size and/or even necessity for certain control surfaces and/or trim tabs can be limited considerably, such as by controllable operation of certain embodiment of the at least one hybrid propulsive engine 100. By limiting the use of and/or the size of certain control surfaces and/or trim tabs, it is envisioned that certain aircraft could flow through the air more efficiently, resulting in increased fuel economy.

Certain aircraft, perhaps comprising unmanned drones, etc., can be designed with reduced control surfaces and/or trim surfaces, etc., about one or more flight axis with the steerage being provided at least partially using the above control techniques by powering or depowering at least certain ones of the independently rotatable propeller/fan engine 62 or certain of the at least one jet engine 58 of the at least one hybrid propulsive engine 100, as described in this disclosure.

Certain embodiments of the at least one hybrid propulsive engine 100 can be configured such that the at least one independently rotatable propeller/fan 258 can provide reverse thrust, such as during landing to decelerate the aircraft. Such reverse thrust can be provided, for example, by reversing the direction of rotation of the at least one independently rotatable propeller/fan 258 such as can be effected by reversing the direction of the associated at least one torque conversion mechanism 107 (e.g., the polarity). Such reverse thrust, as with forward thrust, should be adjustable such as to control the application thereof. Since torque conversion mechanisms can accelerate or reverse directions quite quickly, they can quickly switch to or from reverse thrust mode (typically more quickly than the time for spooling for certain conventional jet engines). Also, certain embodiments of the at least one independently rotatable propeller/fan 258, as described with respect to FIGS. 3 to 11, can go into reverse thrust mode without the actuation of relatively complex vanes and ducting involved in conventional turbofans and turboprops for reverse thrust. Certain embodiments of the torque conversion mechanism 107, that can be configured as an electric motor, can be configured to switch the direction of rotation, often by pressing a switch or contact to switch polarities of the electric motor. Additionally, the vanes and ducting involved in conventional turbofans and turboprops can add considerable weight, and complexity in design to the aircraft, both of which can be limited by the use of the torque conversion mechanism configured as an independently rotatable propeller/fan 258.

The use of autopilots can add considerably to fuel efficiency of aircraft, since many autopilots limit variations in the control surfaces, and the resultant variation of the amount of adjustment to yaw, pitch, and/or bank as compared to variations applied by the pilot or operator (particularly with inexperienced pilots or operators). For instance, continuously turning the aircraft far to the left and right of the desired course, as well as climbing above or descending below a desired altitude, can provide for diminished fuel efficiency. Certain embodiments of the at least one hybrid propulsive engine 100 can result in considerable fuel efficiency particularly when used in combination with autopilots. In many cases, it is desirable for the pilot/operator to fly as consistent of a path as possible (without climbing or descending, or turning left or right from the desired path excessively) to increase the fuel efficiency of the aircraft. Also consider the relative size of the control surfaces, trim tabs, actuators, linkages, cable members, control rods, etc. can be limited using certain embodiments of the at least one hybrid propulsive engine 100. In aircraft design, limiting the size of such control surfaces, trim tabs, etc. can result in overall limiting the weight of the aircraft 75 while limiting in the complexity of the associated members.

Certain jet aircraft are typically more efficient at higher altitudes (but require a considerable amount of energy to climb to altitude), particularly when traveling long distances at higher altitudes. Propeller-driven aircraft, for example, typically have a relatively low service ceiling, such as they may not be able to operate at altitudes greater than 10,000 to 20,000 feet, though powerful piston aircraft such as certain powerful military piston aircraft may have a higher service ceiling. Certain embodiments of the hybrid propulsive engine 100 can allow certain of the at least one hybrid propulsive engine 100 can provide for improved altitude performance, since the most efficient engines (between the at least one jet engine 58 and the at least one independently rotatable propeller/fan engine 62) can be operated. The selection of the particular altitude can be selected based on such considerations as the density altitude, the pressure, the desired airspeed, etc. For example, at over 20,000 feet, jet engines 58 can be used primarily. Below 10,000 feet, and during operations at noise sensitive airports, certain embodiments of the independently rotatable propeller/fan engine 62 can be used, etc.

Certain embodiments of the hybrid propulsive engine 100 are therefore configured to utilize certain of the efficiencies of jet engines with certain of the efficiencies of propellers and/or fans to yield relatively efficient engines. As such, certain embodiments of the at least one jet engines 58, as well as certain embodiments of the at least one independently rotatable propeller/fan engine 62, or a combination thereof, can be configured for efficient operation at certain flight activities, altitudes, conditions, operations, etc.

Certain jet engines or gas turbines having relatively efficient design can be integrated in a variety of embodiments of the hybrid propulsive engine 100 to provide for relatively efficient operation. The structure and operation of a variety of embodiments of the hybrid propulsive engine 100 are described later in this disclosure, such as described with respect to, but not limited to, FIG. 8. Within this disclosure, the relative power, rotatable velocities, and other characteristics and/or parameters of the at least one independently rotatable propeller/fan engine 62 as compared with the at least one jet engine 58 can be varied or relatively adjusted. For instance, in certain aircraft, the independently rotatable propeller/fan engine 62 can be robust enough and/or an (optional) energy storage device 264 of FIG. 8 may not be charged enough, to maintain the aircraft at certain cruise levels or even allow a slight climb (particularly at lower altitudes) where propellers and/or fans are particularly effective when one or more of the at least one jet engine 62 is inoperative. By comparison, with certain embodiments of aircraft, the at least one independently rotatable propeller/fan engine 62 may not (by itself) be robust enough, or the associated battery may not be charged enough, to maintain the aircraft at certain cruise levels. Even if the at least one independently rotatable propeller/fan engine 62 is insufficient to maintain the aircraft at a particular altitude, or climb at a particular rate; the use of the at least one independently rotatable propeller/fan engine 62 should be sufficient to increase the jet-engine out glide distance. With such increasing the jet engine out glide distance of the aircraft, for instance, the aircraft will be able to glide for an increased distance, such as may include a suitable or desirable airport or landing location. As such, the relative power of certain embodiments of the independently rotatable propeller/fan engine 62, as well as the energy storage capabilities of certain embodiments of the at least one energy storage device 264, can interface with the jet engine to provide suitable operational characteristics of certain embodiments of the at least one hybrid propulsive engine 100.

Certain aircraft or other vehicles can utilize and energies towards element, of some type, to enhance the efficiency of the particular vehicle. Certain embodiments of the at least one hybrid propulsive engine 100 can include at least one energy storage device 264, such as a battery, flywheel, capacitor, etc. to allow electricity generated by at least a portion of the jet engine 58 (using the energy extraction mechanism 66) to be stored by the at least one optional energy storage device 264 such as a battery or flywheel, etc., and thereupon the electricity can be provided to a torque conversion mechanism 107 of the independently rotatable propeller/fan engine 62, as described with respect to FIG. 8. By comparison, certain embodiments of the at least one hybrid propulsive engine 100 as described with respect to FIG. 8 do not include the at least one optional energy storage device, and instead the electricity generated from the at least one jet engine 58 (using the energy extraction mechanism 66) is thereupon applied substantially instantaneously to power the torque conversion mechanism 107. The amount of energy that can be stored/retrieved from the at least one energy storage device 264 can be selected based on the amount of energy to operate the at least one independently rotatable propeller/fan engine 62 for some suitable duration at some suitable rotational velocity. As described with respect to FIGS. 3, 4, 30, and 31, a mount 42 of some suitable and structurally rigid configuration can be used to physically attach at least one independently rotatable propeller/fan engine 62 (typically including the torque conversion mechanism 107 and/or the physically associated rotatable propeller/fan 258) to the jet engine 58 or some other suitable portion of the airframe, such as to physically support and/or secure the torque conversion mechanism and/or the physically associated rotatable propeller/fan 258. The mount 42 can include one or a number of support members, rods, bars, mounts, fasteners, etc. to support the torque conversion mechanism 107 and/or the associated at least one independently rotatable propeller/fan 258, in a manner that allows the at least one independently rotatable propeller/fan 258 to have rotary motion (that may be provided at least partially by the at least one torque conversion mechanism 107), relative to the jet engine 58.

This disclosure provides a variety of techniques by which a rotational velocity of the at least one independently rotatable propeller/fan 258 of the independently rotatable propeller/fan engine 62 can be controlled relative to the rotational velocity of turbine rotatable element(s) 105 within the jet engine 58 can be controlled, using a variety of manual levers, selectors, and/or indicators, etc. such as can be actuated by or viewed by the pilot or operator such as with the input output interface 811 of FIG. 8 of the hybrid propulsive engine controller, and/or automated using a variety of embodiments of the hybrid propulsive engine controller as described with respect to FIG. 8. Such control of the rotational velocity can be absolute, in which the rotational velocity of the at least one independently rotatable propeller/fan 258 and the at least one jet engine 58 are each individually controlled; or relative, where the rotational velocity of the at least one independently rotatable propeller/fan 258 is controlled relative to the at least one jet engine 58.

It might be challenging, under normal or stressful situations, for a pilot to memorize and/or properly control the power settings (a desired RPM as set by the pilot, flight crew, and/or remotely) for the at least one independently rotatable propeller/fan 258 as well as the independently rotatable propeller/fan engine 62 as described with respect to FIG. 8, under certain instances, manually. However, the power settings can in many instances be determined or controlled more properly or reliably at least partially utilizing certain (e.g., manual or automated) embodiments of the hybrid propulsive engine controller 97, as well as the use of written or digital check lists. The operation, input/output, as well as the structure of certain embodiments of the hybrid propulsive engine controller 97 is described within this disclosure.

Certain embodiments of the hybrid propulsive engine 100 can be arranged such that the jet engine 58 can therefore accelerate (including the at least one turbine rotatable element 105 and the at least one compressor rotatable elements 103) during spooling, and the independently rotatable propeller/fan engine 62 can accelerate using force provided by the torque conversion mechanism 107. Multi-stage spooling can often be accomplished more quickly than single stage spooling since, with turboprops/turbofans, more rotatable elements totaling greater inertia have to be started when more of the turbine rotatable elements 105, the compressor rotatable elements 103, and/or the rotary propeller/fan 258 are spooled at the same time using the same applied force (e.g., from the turbine). Certain conventional propellers/fans of the turboprops/turbofans often have a fixed mechanical linkage (perhaps including one or more shafts and/or a gearbox) that all be accelerated from the force applied from the turbine of the jet engine.

In certain embodiments of the hybrid propulsive engines 100, the independently rotatable propeller/fan engine 62 may be positionally secured in some manner relative to the at least one jet engines 58 to allow rotation of the at least one compressor section 102 and the at least one turbine section 104 of the at least one jet engines 58, and a shaft 64 via one or more shafts 64. Such transmission of rotation via the shaft 64 may be equated to providing a mechanical rotatable connection there between. The mechanical connection of the shaft can allow for the rotation of the shaft 64 to be directly transferred from at least some of the turbine rotor 130 shown in FIG. 11 to other rotatable members (such as at least some independently rotatable compressor rotors 120 or connected compressor rotor blades 122 of the at least one compressor section 102, or alternately the shaft or multiple shaft sections) directly to a non-rotatable extension of the shaft 64 (or alternately via a gear-box) that provides some constant gear ratio between the shaft 58 connecting to the turbine rotor 130 shown in FIG. 11 to other rotatable members (such as at least some independently rotatable compressor rotors 120 or connected compressor rotor blades 122 of the at least one compressor section 102). As such, an embodiment of the hybrid propulsive engines use electricity generated from the rotary component of the at least one turbine section 104 can, depending on context, be configured to provide electricity that can operate the at least one compressor section 102, as well as the at least one independently rotatable propeller/fan 258 indirectly from the at least one turbine section 104.

Certain embodiments of the hybrid propulsive engine 100, particularly those that propel person-carrying aircraft, are intended to operate safely, such as by enabling the at least one independently rotatable propeller/fan engine 62 to continue to operate as desired even upon failure of at least one jet engine. Having the at least one independently rotatable propeller/fan 258 operate at a slower rate than desired, or stop rotation during flight, can obviously be adverse to desirable flight characteristics of the aircraft 75. Just as with a propeller in a propeller-driven aircraft, slowing or stopping the at least one independently rotatable propeller/fan 258 of the independently rotatable propeller/fan engine 62 can reduce the aerodynamics of the aircraft 75 at certain speeds (e.g., the stall speed can increase).

Consider that a non-rotating propeller is likely not to be able to generate lift, and instead can provide air resistance proportional to the frontal area of the non-rotating propeller, and thereby increase drag. Consider those instances where at least portion of the at least one jet engine 58 in a turboprop/turbofan becomes inoperative and does not provide the desired or designed thrust, such as with a so-called "compressor stall". With such compressor stalls, the operation of both the at least one jet engine 58 and the at least one independently rotatable propeller/fan 258 could be affected, typically by slowing down or stopping the flow of the working fluid through the jet engine, and both would be expected to consume less fuel while in generating similar combined thrust as a result of the slower rotatable velocities of the turbine rotatable elements 105 and the compressor rotatable elements 103.

The amount of energy used for an aircraft to climb, such as during take-off, can be reduced with certain embodiments of the independently rotatable propeller/fan engine 62. In certain embodiments, the batteries can be charged such as during taxi, or the batteries being plugged in, prior to take-off. As such, the thrust provided by the hybrid propulsive engine 100 can include the total of a first thrust of the torque conversion mechanism 107 (e.g., electric motor) as provided by the at least one independently rotatable propeller/fan engine 62 plus a second thrust provided by the jet engine. The torque conversion mechanism can operate independently from the jet engine (no torque is transferred via a shaft such as with conventional turboprops or turbofans), and as such the thrust provided to the at least one independently rotatable propeller/fan engine 62 does not limit the thrust produced by the at least one jet engine 58.

Depending upon the particular configuration, under the circumstances, the at least one independently rotatable propeller/fan 258 can be stalled, be stationary, windmill, or may provide otherwise potentially undesired are unsuited operation to generate a desired lift. It may be expected that the jet engine 58 may be configured to be smaller and/or lighter to produce somewhat less power than conventional jet engines; because the combined thrust of jet engine as combined with the at least one independently rotatable propeller/fan assembly 108 that is powered by the torque conversion mechanism 107, can provide similar thrust as with the conventional jet engines. Additionally, as result of the constrained connection of the shaft 64 between the at least one jet engine 58 and the at least one independently rotatable propeller/fan 258, the rotatable operation of the at least one independently rotatable propeller/fan 258 is dependent upon rotation of the at least one jet engine 58.

Certain embodiments of this disclosure, as described with respect to FIGS. 3, 4 8, 30, 31, and 32, as well as other locations in this disclosure, can provide for independent rotatable operation of the at least one independently rotatable propeller/fan 258 with respect to the at least one jet engine 58. As such, certain embodiments of the at least one independently rotatable propeller/fan 258 can (depending on the constraints of the electric power provided to the torque conversion mechanism 107 such as an electric motor) rotate at the same rotational velocity, only one operating at an rotational velocity while the other is stopped, each operating at different rotatable velocities, each operating in the same direction, or each operating in reversed directions as the at least one jet engine 58. Such control of the rotational velocity of the at least one independently rotatable propeller/fan 258 as well as the jet engine can be performed by the pilot or the flight crew, at least partially from the hybrid propulsive engine controller 97, or even at least partially via remote control (such as in the case of a drone aircraft controlled from the ground).

Certain embodiments of the at least one independently rotatable propeller/fan 258 can have the motive force provided at least partially from the torque conversion mechanism 107, resulting from electricity generated in some manner from electricity generated from the rotation of the turbine rotors 130, including the turbine blades 132.

The independent rotatable operation of the of the at least one independently rotatable propeller/fan 258 with respect to the at least one jet engine 58 can be controlled in certain embodiments by the pilot or flight crew, the hybrid propulsive engine controller 97 can be situated on the aircraft, or remotely from the aircraft. Such independent rotatable operation of the rotatable portions of the jet engine relative to the at least one independently rotatable propeller/fan 258 can be considered as being representative of certain embodiments of a hybrid turboprop or turbofan design. The hybrid turboprop or turbofan design may thereby be viewed as to provide independent operation between the at least one jet engine 58 and the at least one independently rotatable propeller/fan 258. The term "hybrid", as applied to this disclosure can, depending on context, be similar to as used with hybrid automobiles, wherein either, neither, or both a gas engine and an torque conversion mechanism can be configured to apply power to propel the vehicle at certain times of operation.

With certain of such hybrid embodiments of the hybrid propulsive engine 100, the timing and percentage of power provided by the jet engine 58 and the torque conversion mechanism 107 can vary depending upon such factors as velocity of the vehicle, electricity available for the torque conversion mechanism, whether the vehicle is climbing or descending, etc. Such independent rotatable operation of the rotatable portions of the jet engine relative to the at least one independently rotatable propeller/fan 258 can provide for generally improved and extended flight operations, with increased payloads such as by limiting extended shafts, gear boxes, and other mechanical linkages to provide rotary motion to the at least one independently rotatable propeller/fan 258.

Certain embodiments of such independent rotatable operation of the rotatable portions of the jet engine 58 relative to the at least one independently rotatable propeller/fan 258 can also provide for power sharing of power (electricity) generated from one jet engine to be shared between one or more rotatable propeller/fan assembly 108. Conversely, certain embodiments of such independent rotatable operation of the rotatable portions of the jet engine 58 relative to the at least one independently rotatable propeller/fan 258 can also provide for power sharing of power (electricity) utilized by one independently rotatable propeller/fan assembly 108 that was generated from the rotatable turbine components and/or the working fluid included within more than one jet engines. Such power sharing between one or more jet engines 58 relative to one or more of the energy extraction mechanism powered rotatable propeller/fan assemblies 108 can be utilized for typical operating operations, as well as emergency conditions.

For example, it may be desired for efficiency reasons to shut down certain of the at least one jet engines 58 (e.g., the in-board two hybrid propulsive engines or the two out-board jet engines in a four jet engine aircraft). By shutting down certain of the jet engines for relatively efficient power sharing purposes, as described with respect to FIGS. 45 to 50, the energy (e.g., generated electricity) from the operating engines can be used to generate electricity to provide the rotatable force to all of the at least one independently rotatable propeller/fan 258, such as to effect powering of one or more of the at least one independently rotatable propeller/fans 258, as desired or necessary, by their individual torque conversion mechanisms 107 as described in this disclosure. It may not be necessary that each torque conversion mechanism 107 (that is associated with a particular one of the jet engine 58 and/or the at least one independently rotatable propeller/fan 258) receive power from that particular energy extraction mechanism 66. Power, in the form of generated electricity, can be shifted between causing force to be applied to different ones of the at least one independently rotatable propeller/fan 258. This shifting of power from at least one energy extraction mechanism 66 such that a corresponding force is applied to different ones of the at least one independently rotatable propeller/fan 258 can also be referred to as power sharing in which power produced by at least one jet engines can be distributed to more than one of the at least one independently rotatable propeller/fan 258, or alternately as power equalizing in which power differences between multiple of the at least one independently rotatable propeller/fan 258 as provided by one or more jet engines 58 are reduced.

It may also be desired, for certain power sharing or power equalizing schemes as described with respect to FIGS. 45 to 50, to increase the rate of rotation (the rotational velocity such as may be measured by rotations per minute, or RPM) of certain of the at least one independently rotatable propeller/fans 258 to be greater or less than others by, for example, controlling the electricity supplied to the relevant at least one torque conversion mechanisms 107. Consider that if one or more jet engines are not being operated, or are inoperative, at a given time during flight, the associated at least one independently rotatable propeller/fans 258 can be accelerated to a greater rotational velocity (or decelerating to a lesser rotational velocity), such as to maintain more equal propulsion between those engines 100 whose jet engine is not operating as compared with those hybrid propulsive engines 100 whose jet engine is operating.

It may be desired to relatively control the rotational velocity of certain ones of the certain of the at least one independently rotatable propeller/fans 258 to steer the aircraft about at least one axis. For instance, it might be desired to accelerate those of the at least one independently rotatable propeller/fans 258 that are situated on one side of the aircraft (e.g., the right), as described with respect to FIG. 1, to effectively yaw the aircraft to another side of the aircraft (e.g., its left). By comparison, to yaw the aircraft 78 to the right, at least one of the hybrid propulsive engine 100 to the left of the aircraft can be rotatably accelerated (RPM increased) as compared to those to the right, and/or alternatively, those on the left can be decelerated. As such, certain embodiments of aircraft 75, or other vehicles 98, can be configured to be steered or otherwise operated, by the selective control of certain embodiments of the hybrid propulsive engine 100, particularly the at least one independently rotatable propeller/fan 258. The increase in rotational velocity of the at least one hybrid propulsive engine 100 to the left of the aircraft as compared to those to the right, for example, can result in the left wing accelerating faster (with more thrust) than the right wing, and also likely cause considerably more lift to the left wing than the right wing. The reverse is also true if the wing to the right of the aircraft is accelerated faster than that to the right of the aircraft.

To increase the overall velocities of the aircraft, at least some of the hybrid propulsive engines on both sides of the aircraft can be similarly increased, e.g. by a similar number of RPMs. During cruise, it would likely be desirable to be able to control the relative rotational velocity at which the at least one independently rotatable propeller/fan 258 is operated, and therefore the thrust of the at least one independently rotatable propeller/fan. Such relative control of the rotational velocity of a number of the at least one independently rotatable propeller/fan 258 can be referred to as power sharing, and certain portions of this disclosure describe this process as power sharing. The most basic form of power sharing involves attempting to equalize (or limit differences between) the rotatable acceleration and/or the thrust between different ones of the at least one independently rotatable propeller/fan 258.

Certain embodiments of the hybrid propulsive engine 100 are configured to limit fuel starvation, such as by allowing operation of either the jet engine 58 or the independently rotatable propeller/fan engine 62, if the other one fails or otherwise malfunctions. Such causes of fuel starvation can include, but are not limited to, clogged fuel lines, broken fuel lines, running out of jet fuel, etc.

As such, it may therefore be desired to operate the at least one independently rotatable propeller/fan 258 at a consistent rotational velocity, even if one of more of the at least one jet engines 58 associated with one or more of the at least one independently rotatable propeller/fan 258 is not operating. Such shutting down of certain at least one jet engines 58 while maintaining operation of more of the at least one independently rotatable propeller/fan 258 to provide for improved efficiency of operation, tends to increase the range for the aircraft 75, increased time in air, etc., each of which may be considered an improvement in efficiency of the aircraft 75 or other vehicle 98 during certain cruise, take-off, landing, or emergency operational configurations. While operating in certain noise-restricted airports, for example, it may be desired to limit the number of jet engines 58 operating, or limit the rotatable velocities of the jet engines (which are typically relatively noisy); while perhaps maximizing the number of the at least one independently rotatable propeller/fan engine 62 or the operating rotatable velocities of the at least one independently rotatable propeller/fan engines 62 (which are typically quieter).

This disclosure thereby describes a variety of embodiments of the hybrid propulsive engine 100, as described with respect to FIG. 8, which can be powered by, during at least portions of the operation, a torque conversion mechanism 107 and at least one jet engine 58. Certain embodiments of the at least one jet engine 58 can include, but is not limited to, the at least one compressor section 102, the at least one turbine section 104, and the energy extraction mechanism 66. Certain embodiments of the torque conversion mechanism 107, such as can be included in the at least one independently rotatable propeller/fan assembly 108, can obtain at least some of its power from the energy extraction mechanism 66. The at least one energy extraction mechanism 66 may be at least partially integrated in the at least one turbine section 104, as described in this disclosure. There are a variety of embodiments of the energy extraction mechanism 66 that are configured to generate electricity based at least partially on the rotary motion of the turbine rotors 132.

FIGS. 2, 3, 4, 8, 30, 31, and 32 show certain embodiments of the hybrid propulsive engine 100 including a number of embodiments of the energy extraction mechanism 66 (as described with respect to FIG. 8) that provide electricity that can be used to power the torque conversion mechanism 107. Certain embodiments include the energy extraction mechanism 66 and the optional energy storage device 264. Certain embodiments of the energy extraction mechanism 66 (which may be viewed, in general, as electrical generators as described with respect to FIGS. 12-15) can generate electricity based at least partially on the rotation of the turbine rotatable element 105. Certain embodiments of the turbine rotatable element 105 can include the energy extraction mechanism 66 relying on motion of the turbine or the shaft 64, and/or the working fluid passing through the jet engine. Certain embodiments of the energy storage device 264 can store energy generated by the energy extraction mechanism 66 until utilized by the torque conversion mechanism 107. The torque conversion mechanism 107, as described with respect to FIG. 8, at least partially drives the at least one rotary propeller/fan 258. Certain embodiments of the at least one rotary propeller/fan 258 can be configured to extract external energy such as from the at least one energy extraction mechanism 66, while others may not.

Certain elements of certain embodiments of the hybrid propulsion engine 100 can be operationally associated with certain elements of other hybrid propulsion engines as described with respect to FIGS. 2, 3, and 4. For example, during flight, it may be desired to stop certain jet engines 58, and allow other engines to run, have energy extracted therefrom using certain embodiments at least one energy extraction mechanism 66, and have the extracted energy (in the form of electricity) applied perhaps to the energy storage device 264 as well as to the torque conversion mechanism 107. Such extracted energy can be used to drive at least one rotatable working fluid displacement engine 74 that may include the at least one independently rotatable compressor stators 493. Operating fewer jet engines 58 during such low-demand periods as cruise and/or descent could be expected to improve fuel mileage and efficiency of the at least one hybrid propulsive engines 100, as well as limit wear, stress, fatigue, etc. to certain of the components of the at least one hybrid propulsive engine. As such, certain embodiments of the at least one rotary propeller/fan 258 can receive power from one or more energy extraction mechanism 66, that may be considered as an aspect of power sharing as described in this disclosure. Similarly, each energy extraction mechanism can receive generated power from one or more distinct jet engines 58, as described in this disclosure, that may be considered as another aspect of power sharing as described in this disclosure.

Additionally, certain embodiments of the at least one rotary propeller/fan 258 can be configured to ease starting of the jet engine without a remote starter. Such starting or attempts to start the jet engine may take place on the ground, or alternately may occur in flight. Such ease of restart can occur partially because the at least one rotary propeller/fan 258, as well as other components of the independently rotatable working fluid displacement engine 74, may not each require as high rotational velocities to restart, and the mass of at least certain ones of the independently rotatable working fluid displacement engine 74 can be accelerated by the at least one torque conversion mechanism 107 and not the at least one jet engine 58, as described in this disclosure. As such, starting the at least one jet engine 58 may require less inertia in certain embodiments of the at least one hybrid propulsion engine 100, and as such certain embodiments of the at least one jet engines can be configured to start in flight in a manner assisted by the use of certain embodiments of the at least one rotary propeller/fan 258.

If certain embodiments of the at least one jet engines can be more easily started during flight, then it is also true that they can be stopped during flight with the expectation that they can be restarted. Consider that the manner that certain hybrid automobiles increase their fuel mileage is to turn their gas motor off during certain times of non-peak (torque) demand. Similarly, at least some of certain embodiments of the at least one jet engine associated with at least one hybrid propulsive engine 100 can be configured to stop during times of less than peak demand, such as cruise and descent, and the electricity generated by only those operating jet engines 58 can be extracted using certain embodiments of the energy extraction mechanism 66. The electricity extracted from a particular one of the at least one jet engine 58 can be applied to the at least one energy storage device 264 and/or an at least one torque conversion mechanism 107 that may, or may not, be associated with that particular at least one jet engine, as described with respect to FIGS. 45 to 50. Similarly, the electricity extracted from a particular one of the at least one jet engine 58 can ultimately be used to rotate the one or more rotatable working fluid displacement engines 74 (configured as the at least one rotary propeller/fan 258) that may or may not be operationally associated with that particular jet engine 58, as described with respect to FIGS. 45 to 50.

FIG. 39 illustrates one embodiment of a power quadrant 902 that may be used by a pilot or flight crew member of the aircraft 75, such as by use of the throttles can be used to control the power being output by the at least one jet engine 58 as well as the at least one independently rotatable propeller/fan engine 62. Certain embodiments of the throttle quadrant 902, as described with respect to FIG. 39, can include one each of a jet engine throttle 904 and a propeller/fan electric engine throttle 906 for each hybrid propulsive engine 100 of the aircraft 75. Certain embodiments of the throttle quadrant 912 can be configured such that the rotational velocity of the at least one jet engine 58 can be independently controllable from certain embodiments of the at least one independently rotatable propeller/fan engine 62 (even when a particular jet engine is operationally associated with a particular independently rotatable propeller/fan engine).

Motion of certain embodiments of the jet engine throttle 904 may be configured to accelerate, or decelerate, the compressor rotatable element(s) 103 and/or the turbine rotatable element(s) 105 of the jet engine 58 as described with respect to FIG. 8. Motion of certain embodiments of the propeller/fan electric engine throttle 906 are configured to accelerate, or decelerate, the torque conversion mechanism 107, and therefore the at least one independently rotatable propeller/fan 258. The embodiment of the throttle quadrant 902 as illustrated in FIG. 23 applied to an aircraft having a single hybrid propulsive engine 100 (one jet engine 58 as well as one independently rotatable propeller/fan engine 62). For an aircraft having N (an integer from 1 to 4, or even more such as 8) hybrid propulsive engines 100, there would be N jet engine throttles 904 and N propeller/fan electric engine throttles 906 to properly control the rotatable velocities (RPM) of the at least one jet engine 58 as well as at least one independently rotatable propeller/fan engine 62.

Certain embodiments of the hybrid propulsive engine controller 97 can be configured such that during at least part of the time, a setting of the at least one jet engine 58 can be used to set the at least one independently rotatable propeller/fan engine 62. For instance, a number of sensors (not illustrated) can be arranged around the aircraft to sense parameters related to jet engine operation, flight conditions, external conditions, throttle settings, flight condition (e.g., take-off, cruise, etc.), etc.; and based on at least certain of the settings the hybrid propulsive engine controller 97 can appropriately set the at least one independently rotatable propeller/fan engine 62.

6. Hybrid Propulsive Engine Including Independently Rotatable Compressor Rotor

This disclosure now describes a number of embodiments of the at least one rotatable working fluid displacement engines 74 configured to rotate at least one independently rotatable compressor rotor 120 (as described, particularly with respect to FIGS. 5, 9, and 28, as well as other locations in this disclosure). Within this disclosure, two embodiments of the at least one independently rotatable compressor rotors 120 can be powered to be rotated independently of rotation provided by the turbine rotors, shaft, etc. Certain embodiments of the hybrid propulsive engine 100 are configured such that the at least one torque conversion mechanism 107 can be used to at least partially power at least one of the at least one rotatable working fluid displacement engines 74, which in turn is configured as the at least one independently rotatable compressor rotor 120. Such independent driving of certain embodiments of the independently rotatable compressor rotors 120 can, depending on context, be in either direction as well as some controllable rotational velocity, such as can be provided by certain embodiments of the torque conversion mechanism 107 (e.g., the electric motor) as described with respect to FIG. 2, and other locations in this disclosure.

Certain embodiments of the hybrid propulsive engine 100 can include two types of compressor rotors, all of which are configured to rotate to drive at least some working fluid through the compressor section: a) those that are attached to and driven by at least one of the at least one shafts 64 as described with respect to FIGS. 12 to 15, and those that are driven independently of rotation of the at least one shaft 64, which can, depending on context, be referred to herein as "independently rotatable compressor rotor". Certain of the compressor rotors can be configured to be switched between being configured as the independently rotatable compressor rotor and being configured as the shaft rotatable compressor rotor. For instance, certain of the independently rotatable compressor rotors can be rotationally locked, rotationally attached, rotationally magnetically secured, or otherwise rotationally secured to the at least one shaft 64 such as to rotate in unison with the at least one shaft, and thereby function as shaft rotatable compressor rotors (similar to conventional compressor rotors). By comparison, rotationally unlocking, rotationally de-attaching, or rotationally magnetically unsecuring such independent rotatable compressor rotors that are attached to the shaft allows them to act again as independent rotatable compressor rotors.

Certain embodiments of the hybrid propulsive engine 100 are configured such that at least one of the at least one torque conversion mechanisms 107 as described with respect to FIGS. 12 to 15 is used to at least partially power the at least one independently rotatable compressor rotor 120 (as described, particularly with respect to FIGS. 5, 9, and 28, as well as other locations in this disclosure). Such powering of the at least one independent rotatable compressor rotors 120 by the at least one torque conversion mechanism 107 can allow for independent operation and rotation from those shaft driven compressor rotors that are driven via the shaft 64 (shown in FIGS. 12 to 16). As such, during the initial stages of operation, only certain of the compressor rotors can be shaft driven, such that others of the compressor rotors that are configured as at least one independently rotatable compressor rotors 120 do not have to be accelerated by the shaft, resulting in less mass and inertia being accelerated by the shaft. This allows for an increased rate of start-up of, continued operation of, as well as rotational acceleration (e.g., spooling) of the at least some independently rotatable compressor rotors 120 under the power of the at least one torque conversion mechanism. Certain embodiments of the at least one independently rotatable compressor rotor can continue to operate even if the jet engine 58 becomes inoperable, or is shutdown. Certain of such embodiments of the hybrid propulsive engine 100 can provide for improved operational inefficiencies since of rotational velocity and thrust provided by the at least some independently rotatable compressor rotors 120 can be varied in certain embodiments relative to the jet engine.

As described with respect to FIG. 16, certain embodiments of the compressor section 102 can include a number of compressor stages 119. Certain embodiments of each compressor stage 119 can include at least one independently rotatable compressor rotor 120, and at least one compressor stator 122. Certain embodiments of the at least one independently rotatable compressor rotor 120 can be affixed to the shaft 64 (that is rotated from turbine rotors 130 of the turbine section 105), and rotates therewith. Certain embodiments of the at least one compressor stator 122 (as compared with the independently rotatable compressor stators 493 as described in the next section with respect to FIGS. 6 and 29) do not have to rotate with at least a portion of the shaft 64, and in actuality typically remain substantially fixed relative to the non-rotating portions of the jet engine 58.

The embodiments of the hybrid propulsive engine 100 as described with respect to FIGS. 5, 9, and 28, as well as other locations in this disclosure, that can be used in combination, or any alternative, with to use the at least one torque conversion mechanism 107 to at least partially power the at least one compressor rotor 120. There are a number of embodiments of the hybrid propulsive engine 100 in which the at least one torque conversion mechanism can be used to at least partially power the at least one independently rotatable compressor rotor 120.

As such, with certain embodiments of the hybrid propulsive engine 100, certain of the at least one independently rotatable compressor rotor 120 can be driven via the shaft from at least some of the turbine rotors of the turbine section, while certain of the turbine rotors can be driven to rotate independently from the rotation of the shaft 64. For instance, certain of the independently rotatable compressor rotors 120 such as those included in the high-pressure compressor stages (e.g., closer to the combustion chamber of FIG. 16), may be configured to rotate with the shaft; while with other of the independently rotatable compressor rotors 120 such as those included in the low-pressure compressor stages (e.g., further from the combustion chamber of FIG. 16), may be configured to rotate independently from the shaft such as to be driven by the at least one torque conversion mechanism. The selection of which compressor stages are configured with the independently rotatable compressor rotor 120, and which are configured with a shaft driven compressor rotor represents a design or engineering choice.

Those portions of the at least one independently rotatable compressor stators 493 that are not stationary can be driven by the at least one torque conversion mechanism 107. The fuel applied via the combustion chamber to heat and expand the working fluid passing through the jet engine has a relatively low efficiency (typically less than 20 percent). Much of the energy from the jet engine can be converted, with increased efficiencies, into electricity at least partially based on the at least one energy extraction mechanism 66. Certain embodiments of the at least one independently rotatable compressor rotors 120 can be configured to extract external energy such as from the at least one energy extraction mechanism 66, while others may not.

Certain elements of certain embodiments of the hybrid propulsion engine 100 can be operationally associated with certain elements of other hybrid propulsion engines as described with respect to FIGS. 2 and 28. For example, during flight, it may be desired to stop certain jet engines 58, and allow other engines to run, have energy extracted therefrom using certain embodiments at least one energy extraction mechanism 66, and have the extracted energy (in the form of electricity) applied perhaps to the energy storage device 264 as well as to the torque conversion mechanism 107. Such extracted energy can be used to drive at least one rotatable working fluid displacement engine 74 that may include the at least one independently rotatable compressor rotors 120. Operating fewer jet engines 58 during such low-demand periods as cruise and/or descent could be expected to improve fuel mileage and efficiency of the at least one hybrid propulsive engines 100, as well as limit wear, stress, fatigue, etc. to certain of the components of the at least one hybrid propulsive engine. As such, certain embodiments of the at least one independently rotatable compressor rotors 120 can receive power from one or more energy extraction mechanism 66, that may be considered as an aspect of power sharing as described in this disclosure. Similarly, each energy extraction mechanism can receive generated power from one or more distinct jet engines 58, as described in this disclosure, that may be considered as another aspect of power sharing as described in this disclosure.

Additionally, certain embodiments of the at least one independently rotatable compressor rotors 120 can be configured to ease starting of the jet engine without a remote starter. Such starting or attempts to start the jet engine may take place on the ground, or alternately may occur in flight. Such ease of restart can occur partially because the at least one independently rotatable compressor rotors 120, as well as other components of the independently rotatable working fluid displacement engine 74, may not each require as high rotational velocities to restart, and the mass of at least certain ones of the independently rotatable working fluid displacement engine 74 can be accelerated by the at least one torque conversion mechanism 107 and not the at least one jet engine 58, as described in this disclosure. As such, starting the at least one jet engine 58 may require less inertia in certain embodiments of the at least one hybrid propulsion engine 100, and as such certain embodiments of the at least one jet engines can be configured to start in flight in a manner assisted by the use of certain embodiments of the at least one independently rotatable compressor rotors 120.

If certain embodiments of the at least one jet engines can be more easily started during flight, then it is also true that they can be stopped during flight with the expectation that they can be restarted. Consider that the manner that certain hybrid automobiles increases their fuel mileage is to turn their gas motor off during certain times of non-peak (torque) demand. Similarly, at least some of certain embodiments of the at least one jet engine associated with at least one hybrid propulsive engine 100 can be configured to stop during times of less than peak demand, such as cruise and descent, and the electricity generated by only those operating jet engines 58 can be extracted using certain embodiments of the energy extraction mechanism 66. The electricity extracted from a particular one of the at least one jet engine 58 can be applied to the at least one energy storage device 264 and/or an at least one torque conversion mechanism 107 that may, or may not, be associated with that particular at least one jet engine, as described with respect to FIGS. 45 to 50. Similarly, the electricity extracted from a particular one of the at least one jet engine 58 can ultimately be used to rotate the one or more rotatable working fluid displacement engines 74 (configured as the at least one independently rotatable compressor rotors 120) that may or may not be operationally associated with that particular jet engine 58, as described with respect to FIGS. 45 to 50.

Powering of the different independently rotatable compressor rotors from different torque conversion mechanisms 66 (such as includes an energy extraction mechanism 66) and/or different torque conversion mechanisms (such as can each include an electric motor) can increase the probability that the at least one hybrid propulsive engine will continue to operate Certain embodiments of the hybrid propulsive engine 100 can provide enhanced power since the portion of the independently rotatable compressor rotors, driven by the torque conversion mechanism 107 can be controlled to operate at desired rotational velocities that may be more suited to establishing desired compression of the working fluid. Instead of each compressor rotor operating at the same rotational velocity, for example, at least certain rotors can be selected to operate at desired rotational velocities such as to improve efficiency. With certain embodiments of the at least one hybrid propulsive engine 100, one or more of the compressor rotors can be rotatably driven independently from rotation of the jet engine to provide at least one hybrid propulsive engine with increased efficiencies. Those portions of the at least one independently rotatable compressor rotor 120 that are not driven by the jet engine directly from the shaft (and the rotatable turbine element) are driven by the at least one torque conversion mechanism 107, which does not have as limited of an energy efficiency as conventional jet engines (e.g., Brayton cycle).

Much of the energy from the jet engine can be converted, with increased efficiencies, into electricity at least partially based on the operation of the at least one energy extraction mechanism 66 driving the independently operable independently rotatable compressor rotors. By allowing at least some of the independently rotatable compressor rotors to be independently controllable, such independently rotatable compressor rotors don't have to be driven at such high rotational velocities when the jet engine is in a period of relatively low demand (such as when descending, taxiing, or in cruise). Such use of energy during a latter period of relatively high demand from a period of relatively low demand may be viewed as a regenerative operation of the at least one hybrid propulsive engine 100. Additionally, during such periods when the at least one torque conversion mechanism 107 of FIG. 9 is at least partially driving at least some of the at least one independently rotatable compressor rotors, such driving force does not have to be supplied by the at least one jet engine 58 to drive the at least one independently rotatable compressor rotors. As such, the force applied from the jet engine to drive the independently rotatable compressor rotors can be correspondingly decreased. Such decreasing the force applied to accelerate the at least one of the independently rotatable compressor rotor to a particular rotational velocity can have the effect of allowing for quicker acceleration, or spooling rate, of the independently rotatable compressor rotor as well as other portions of the jet engine. Such increased spooling rate can, in certain instances, allow the aircraft to climb quicker, and perhaps climb out of a dangerous or routine situation quicker (and likely more efficiently).

During cruise, for example, certain of the compressor rotors can be configured to operate as at least one independently rotatable compressor rotors, and less effort can be used to rotate the at least one shaft 64 driving the remaining shaft driven compressor rotors.

Certain embodiments of the independently rotatable compressor rotors 120 can therefore be configured to rotate in the same direction, the reverse direction, or remain fixed relative to the compressor rotatable element 103 as driven by the shaft. The compressive effect of the compressor section therefore is a function of the relative rotation of the independently rotatable compressor rotors. As such, certain compressive effects can be achieved even if the shaft is rotating at considerably slower rotatable velocities than with certain conventional compressors.

Certain embodiments of the independently rotatable compressor rotors 120 can provide for enhanced efficiency, since the independently rotatable compressor rotors 120 can be driven by the torque conversion mechanism 107 and rely on regenerative energy, retrieval of energy from low demand periods to high demand periods, as well as other energy efficiency techniques. Additionally, there may be a relative rotational velocity between the shaft rotatable compressor rotors and the independently rotatable compressor rotors 120, for one or more stages, that can provide for increased efficiency. Such efficient power settings between the shaft rotatable compressor rotors and the independently rotatable compressor rotors 120 can be determined computationally based on relative rotational velocities, or empirically such as by setting up a test stand for the hybrid propulsive engine.

Certain embodiments of the at least one propulsive engine 100 can be configured to drive the compressor rotatable elements of one or more compressor stages 119, as described with respect to FIGS. 16 and/or 28. As such, instead of the torque conversion mechanism 107 powering one or more of the at least one independently rotatable compressor rotors 120 as described with respect to FIG. 9, this disclosure can also provides a variety of hybrid propulsive engines 100 in which a variety of embodiments of the jet engine 58 can be individually controlled with respect to a variety of embodiments of the at least one independently rotatable compressor rotors 120.

Certain embodiments of the independently rotatable compressor rotors 120 as driven by the torque conversion mechanism can utilize controlling the polarity in a manner as to provide a clutch function, a brake function, or a locking-in-place function by the appropriate control of the polarity of the torque conversion mechanism. The control of rotational velocities, modes, and directions of torque conversion mechanisms in general is well understood, and the application of such braking or locking-in-place functions of the independently rotatable compressor rotors 120 of FIG. 9 could provide for useful operations.

With certain embodiments of the hybrid propulsion engine 100, at least a portion of the at least one independently rotatable compressor rotors 120 can thereby be powered at least partially using the at least one torque conversion mechanism 107. Certain embodiment so they hybrid propulsive engine 100 in which the at least one torque conversion mechanism 107 is used to at least partially powered the at least one independently rotatable compressor rotors 120 may allow fuel-efficient operation, as well as operation which may continue, even if the shaft as well as the turbine rotatable elements, for any reason, cease operation.

7. Hybrid Propulsive Engine Including Independently Rotatable Compressor Stators This disclosure now describes a number of embodiments of the at least one rotatable working fluid displacement engines 74 configured to rotate the at least one independently rotatable compressor stator 493 as described with respect to FIGS. 6, 10 and 29. As such, within this disclosure, the term "independently rotatable compressor stator" can be configured as an independently rotatable device, such as may rotate at a desired rotational velocity relative to a particular at least one compressor rotor. Certain embodiments of the hybrid propulsive engine 100 can be configured such that the at least one torque conversion mechanism 107 is used to at least partially power at least one of the at least one rotatable working fluid displacement engines 74 configured particularly as the at least one independently rotatable compressor stator 493 (as described, particularly with respect to FIGS. 6, 10, and 29, as well as other locations in this disclosure). Such independent driving of certain embodiments of the independently rotatable compressor stator can, depending on context, be in either direction as well as some controllable rotational velocity, such as can be provided by certain embodiments of the torque conversion mechanism 107 (e.g., the electric motor) as described with respect to FIG. 2, and other locations in this disclosure.

Figure 29:
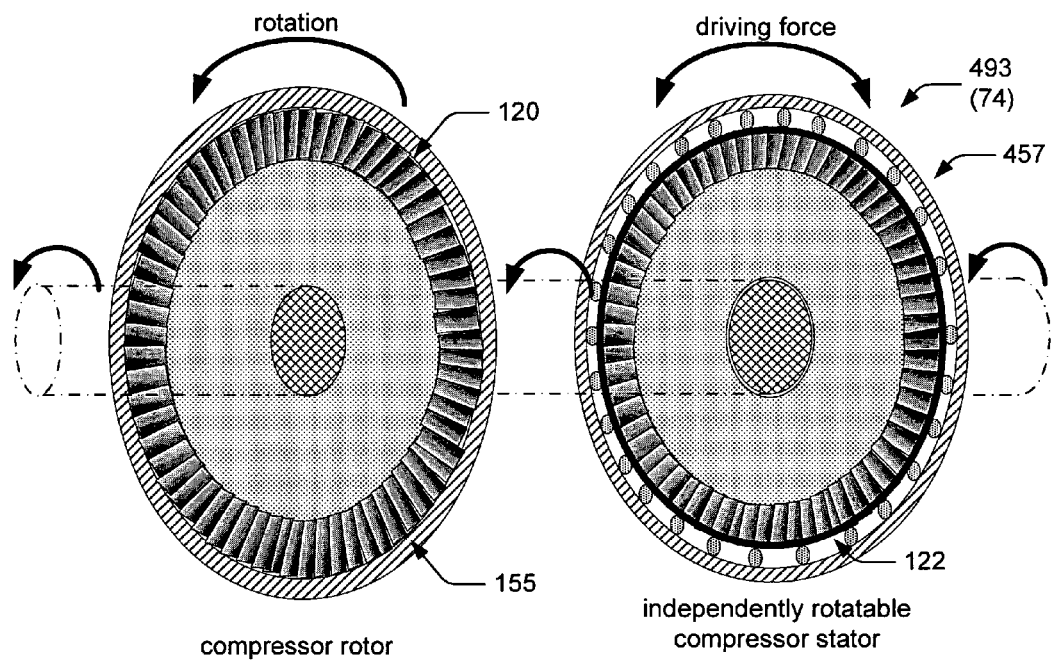
FIG. 29 is an exploded oblique view of another embodiment of a compressor stage including an embodiment of the independently rotatable compressor rotor and an embodiment of the independently rotatable compressor stator.

Certain embodiments of the at least one independently rotatable compressor stator 493 are described, particularly with respect to FIGS. 6, 10, and 29, as well as other locations in this disclosure. Certain embodiments of the hybrid propulsive engine 100 are configured such that the at least one torque conversion mechanism 107 is used to at least partially power the at least one independently rotatable compressor stator 493 in a manner that can allow for independent operation and rotation from the shaft 64 shown in FIGS. 12 to 16, as well as the at least one turbine rotors 130. This can allow for start-up of, continued operation of, as well as increased acceleration of the at least some independently rotatable compressor stators 493 under the power of the at least one torque conversion mechanism even if the jet engine 58 becomes inoperable, or is shutdown. Certain of such embodiments of the hybrid propulsive engine 100 can provide for improved operational inefficiencies since of rotational velocity and thrust provided by the at least one independently rotatable compressor stator 493 can be varied in certain embodiments relative to the jet engine.

The embodiments of the hybrid propulsive engine 100 as described with respect to FIGS. 6, 10, and 29, as well as other locations in this disclosure, can be used in combination, or any alternative, with the at least one torque conversion mechanism 107 using the at least one torque conversion mechanism to at least partially power the at least one independently rotatable compressor stator 493. There are a number of embodiments of the hybrid propulsive engine 100 in which the at least one torque conversion mechanism can be used to at least partially power the independently rotatable compressor stator 493.

Certain embodiments of the at least one independently rotatable compressor stator 493 can utilize a clutch mechanism (not shown) such that, when the clutch is secured, the independently rotatable compressor stators 493 are rotatably secured to be stationary, and remain stationary therewith when acting as a conventional compressor stator. Alternatively, the clutch of the at least one independently rotatable compressor stator 493 can be released or loosened from being stationary such that it can be driven by a variety of embodiments of the torque conversion mechanism 107, as described with respect to FIG. 10. It is likely that only certain of the compressor stators within a compressor section will be configured as the at least one independently rotatable compressor stator 493 to be driven by the at least one torque conversion mechanism 107; while other compressor stators will be configured as conventional stators to be stationary such as to remain static relative to the housing of the hybrid propulsive engine 100. As such, perhaps in certain embodiments of the hybrid propulsive engine 100, the low pressure (e.g., those furthest from the combustion chamber of FIG. 16) embodiments of the compressor stator may be configured as at least one independently rotatable compressor stator 493, while high pressure (e.g., those closest to the combustion chamber of FIG. 16) compressor stator may be configured as stationary; or vice versa.

With certain embodiments of the hybrid propulsive engine 100, one or more of the independently rotatable compressor stator 493 can be rotatably driven independently from a stationary location of the jet engine. Such independence of rotation of the at least one independently rotatable compressor stator 493 can lead to such aspects as increasing efficiency, improving a variety of safety-related aspects such as reducing spooling rate, as well as allowing for increased overall power (either for a brief period or over a long period).

With certain embodiments of the at least one hybrid propulsive engine 100, one or more of the independently rotatable compressor stator 493 can be rotatably driven independently from a fixed location of the jet engine, such as in the opposite direction of rotation as the compressor rotor 120 as described with respect to FIG. 29. Having the independently rotatable compressor stator 493 being rotatably driven in the opposite direction of rotation as the compressor rotor 120, relative rotation therebetween equals the sum of the two rotational velocities. As such, certain embodiments of the independently rotatable compressor stator 493 can result in providing a relative rotational velocity between the independently rotatable compressor stator 493 and the at least one compressor rotor 120 while the at least one compressor rotor can operate at a considerably reduced rotational velocity. By driving the at least one compressor rotor 120 at a considerably reduced rotational velocity, the forces and energy to rotate the compressor rotor (as well as the associated shaft 64 and/or turbine rotational elements as described with respect to FIG. 16) can additionally be reduced. By driving the at least one compressor rotor 120 at a considerably reduced rotational velocity, the stresses and fatigues being applied to the compressor rotor (as well as the associated shaft 64 and/or turbine rotational elements as described with respect to FIG. 16) can be limited and the possibility of failure of such components can be limited. Those portions of the at least one independently rotatable compressor stators 493 that are not driven by the jet engine directly from the shaft (and the rotatable turbine element) are driven by the at least one torque conversion mechanism 107. The fuel applied via the combustion chamber to heat and expand the working fluid passing through the jet engine has a relatively low efficiency (typically less than 20 percent). Much of the energy from the jet engine can be converted, with increased efficiencies, into electricity at least partially based on the at least one energy extraction mechanism 66. Certain embodiments of the at least one independently rotatable compressor stators 493 can be configured to extract external energy such as from the at least one energy extraction mechanism 66, while others may not.

Certain elements of certain embodiments of the hybrid propulsion engine 100 can be operationally associated with certain elements of other hybrid propulsion engines as described with respect to FIGS. 2 and 29. For example, during flight, it may be desired to stop certain jet engines 58, and allow other engines to run, have energy extracted therefrom using certain embodiments at least one energy extraction mechanism 66, and have the extracted energy (in the form of electricity) applied perhaps to the energy storage device 264 as well as to the torque conversion mechanism 107. Such extracted energy can be used to drive at least one rotatable working fluid displacement engine 74 that may include the at least one independently rotatable compressor stators 493. Operating fewer jet engines 58 during such low-demand periods as cruise and/or descent could be expected to improve fuel mileage and efficiency of the at least one hybrid propulsive engines 100, as well as limit wear, stress, fatigue, etc. to certain of the components of the at least one hybrid propulsive engine. As such, certain embodiments of the at least one independently rotatable compressor stators 493 can receive power from one or more energy extraction mechanism 66, that may be considered as an aspect of power sharing as described in this disclosure. Similarly, each energy extraction mechanism can receive generated power from one or more distinct jet engines 58, as described in this disclosure, that may be considered as another aspect of power sharing as described in this disclosure.

Additionally, certain embodiments of the at least one independently rotatable compressor stators 493 can be configured to ease starting of the jet engine without a remote starter. Such starting or attempts to start the jet engine may take place on the ground, or alternately may occur in flight. Such ease of restart can occur partially because the at least one independently rotatable compressor stators 493, as well as other components of the independently rotatable working fluid displacement engine 74, may not each require as high rotational velocities to restart, and the mass of at least certain ones of the independently rotatable working fluid displacement engine 74 can be accelerated by the at least one torque conversion mechanism 107 and not the at least one jet engine 58, as described in this disclosure. As such, starting the at least one jet engine 58 may require less inertia in certain embodiments of the at least one hybrid propulsion engine 100, and as such certain embodiments of the at least one jet engines can be configured to start in flight in a manner assisted by the use of certain embodiments of the at least one independently rotatable compressor stators 493.

If certain embodiments of the at least one jet engines can be more easily started during flight, then it is also true that they can be stopped during flight with the expectation that they can be restarted. Consider that the manner that certain hybrid automobiles increases their fuel mileage is to turn their gas motor off during certain times of non-peak (torque) demand. Similarly, at least some of certain embodiments of the at least one jet engine associated with at least one hybrid propulsive engine 100 can be configured to stop during times of less than peak demand, such as cruise and descent, and the electricity generated by only those operating jet engines 58 can be extracted using certain embodiments of the energy extraction mechanism 66. The electricity extracted from a particular one of the at least one jet engine 58 can be applied to the at least one energy storage device 264 and/or an at least one torque conversion mechanism 107 that may, or may not, be associated with that particular at least one jet engine, as described with respect to FIGS. 45 to 50. Similarly, the electricity extracted from a particular one of the at least one jet engine 58 can ultimately be used to rotate the one or more rotatable working fluid displacement engines 74 (configured as the at least one independently rotatable compressor stators 493) that may or may not be operationally associated with that particular jet engine 58, as described with respect to FIGS. 45 to 50.

With certain embodiments of the at least one hybrid propulsive engine 100, one or more of the at least one independently rotatable compressor stator 493 can be rotatably driven. Those portions of the at least one independently rotatable compressor stator 493 that are not driven by the jet engine directly from the shaft (and the rotatable turbine element) can therefore be driven by the at least one torque conversion mechanism 107. As such, portions of the compressor section corresponding to the at least one independently rotatable compressor stator 493 can continue to operate even while other portions that are driven by the turbine rotatable elements do not. Such powering of independently rotatable compressor stator 493 from different torque conversion mechanisms 66 (such as includes an energy extraction mechanism 66) and/or different torque conversion mechanisms (such as can each include an electric motor) can increase the safety of the at least one hybrid propulsive engine. The fuel applied via the combustion chamber to heat and expand the working fluid passing through the jet engine has a relatively low efficiency (typically less than 20 percent). Much of the energy from the jet engine can be converted, with increased efficiencies, into electricity at least partially based on the at least one energy extraction mechanism 66.

Certain embodiments of the at least one independently rotatable compressor stator 493 can therefore be configured to rotate in the same direction, the reverse direction, or remain fixed relative to the compressor rotor 120 as driven by the shaft. The compressive effect of the compressor section therefore is a function of the relative rotation of the independently rotatable compressor stator 493 relative to the compressor rotor 120. As such, the compressive effect based can be achieved even if the shaft is rotating at considerably slower rotatable velocities than with certain conventional compressors.

For example, instead of the compressor rotatable element 103 that is positioned relive to a (stationary) compressor stator, in which the compressor rotatable element has to operate at N rpm (N is an integer, for example, 1800 RPM). By comparison, those embodiments of the at least one hybrid propulsive engine 100 that include at least one stage including the compressor rotor 120 and the independently rotatable compressor stator 493 can instead have relative rotation provided by the relative rotational rate between the independently rotatable compressor stator 493 and/or the at least one compressor rotor 120. For instance, to achieve a relative rotation of 1800 RPM, the compressor rotor could rotate at a rotational velocity of 900 RPM, while the adjacent independently rotatable compressor stator 493 can rotate at a rotational velocity of 900 RPM in the reversed direction. Such counter-rotation of the compressor rotor 120 (as driven by the shaft from the turbine) relative to the independently rotatable compressor stator 493 (as driven by the torque conversion mechanism) can provide an output rotation of 1800 RPM, while maintaining the pressure of the compressed working fluid applied from the compressor section. As such, the use of certain embodiments of the at least one independently rotatable compressor stator 493 can provide for a decreased rotational velocity of the at least one compressor rotor 120, while allowing for similar rotational velocities therebetween, and similar compression of the working fluid.

Certain embodiments of the intrastage compressor rotatable elements can provide for enhanced efficiency, since the independently rotatable compressor stator 493 can be driven by the torque conversion mechanism 107 and rely on regenerative energy, retrieval of energy from low demand periods to high demand periods, as well as other energy efficiency techniques. Additionally, there may be a relative rotational velocity between the compressor rotors 120 and the independently rotatable compressor stator 493, for one or more stages that can provide for increased efficiency. Such efficient power settings between the compressor rotors 120 and the independently rotatable compressor stator 493 can be determined computationally based on relative rotational velocities, or empirically such as by setting up a test stand for the hybrid propulsive engine 100.

By allowing the rotational velocity of the compressor rotor 120 to be driven more slowly (due to the controllably counter-rotating independently rotatable compressor stator 493), the shaft can be driven at a slower rotational velocity. As such, the amount of associated components can operate at a reduced rotational velocity, resulting in less noise being provided, and limiting the force, stress, and fatigue applied to the rotating components as a result of the lower rotational velocity components of the associated rotatable compressor element. There have been instances of rotational turbine and compressor components fracturing during operation, and it could be expected that operating the shaft and the associated compressor rotating elements at slower rotational velocities could limit such damage, and perhaps extend the operating lifetimes of these rotatable compressor elements, and the associated structures.

Certain embodiments of the independently rotatable compressor stator 493 can be independently powered and controlled from the torque conversion mechanism 107. As such, certain of the independently rotatable compressor stator 493 can accelerate and spool quite quickly. Such independent operation of the independently rotatable compressor stator 493 can also allow the compressor rotatable elements to achieve its operating rotational velocities relatively quickly, since the rotational velocities of the compressor rotors 120 may be slower than that of the comparable conventional compressor rotors (e.g., 900 RPM as compared with 1800 RPM for a relative rotational velocity as with conventional compressor rotatable elements).

As described with respect to FIG. 29, certain embodiments of the at least one hybrid propulsive engine 100 may therefore be configured to provide independent operation of the at least one independently rotatable compressor stator 493 relative to the at least one turbine rotatable element. As such, certain embodiments of at least certain ones of the at least one independently rotatable compressor stator 493 can be rotatably rotated at least partially using the torque conversion mechanism 107.

Certain embodiments of the at least one propulsive engine 100 can be configured to drive the compressor rotatable elements of one or more compressor stages 119, as described with respect to FIGS. 6, 10, 16, and/or 29. As such, this disclosure can also describe a variety of hybrid propulsive engines 100, certain of which are described in block form with respect to FIG. 10, in which a variety of embodiments of the jet engine 58 can be individually controlled with respect to a variety of embodiments of the at least one independently rotatable compressor stator 493. With various embodiments of the hybrid propulsive engine 100, such powering of the at least one independently rotatable compressor stator 493 using the at least one torque conversion mechanism can be performed at various durations or flight conditions in the alternative, in combination, or distinct from each other.

Certain embodiments of the at least one independently rotatable compressor stator 493 can be configured to rotate at a particular rotational velocity rate since they are driven by the at least one torque conversion mechanism. A sensor, indicator, and/or controller can be provided to monitor and/or control the rotational velocity of the at least one independently rotatable compressor stator 493. If the actual rotational velocity of certain embodiments of the at least one independently rotatable compressor stator 493 varies from a desired or set rotational velocity by some amount, the torque conversion mechanism can be actuated to suitably adjust the rotational velocity.

Certain embodiments of the independently rotatable compressor stator 493 as driven by the torque conversion mechanism can utilize controlling the polarity in a manner as to provide a clutch function, a brake function, or a locking-in-place function by the appropriate control of the polarity of the torque conversion mechanism. The control of rotational velocities, modes, and directions of torque conversion mechanisms in general is well understood, and the application of such braking or locking-in-place functions of the independently rotatable compressor stator 493 of FIGS. 10 and 29.

Certain embodiments of the at least one rotatable working fluid displacement engine 74 of FIG. 2 can involve the clutch mechanism 372 (such as described with respect to FIGS. 32 and 33) that can be configured to adjust a ratio between a jet engine power provided to the at least one rotatable working fluid displacement engine 74 from the at least one jet engine as compared with a torque conversion mechanism power provided to the at least one rotatable working fluid displacement engine 74 from the at least one torque conversion mechanism. Such clutch mechanisms 372 can be applied to such embodiments of the rotatable working fluid displacement engine 74 as the independently rotatable propeller/fan engine 62 of FIG. 8, the independently rotatable rotatable compressor rotor 120 of FIG. 9, the independently rotatable compressor stator 493 of FIG. 10, and the independently rotatable compressor stator 477 of FIG. 11.

With certain embodiments of the hybrid propulsion engine 100, at least a portion of the at least one independently rotatable compressor stator 493 can thereby be powered at least partially using the at least one torque conversion mechanism 107. Certain embodiment so they hybrid propulsive engine 100 in which the at least one torque conversion mechanism 107 is used to at least partially powered the at least one independently rotatable compressor stator 493 may allow for relatively fuel-efficient operation, as well as operation which may continue, even if the shaft as well as the turbine rotatable elements, for any reason, ceases operation.

8. Hybrid Propulsive Engine Including Independently Rotatable Turbine Stators

Figure 22:
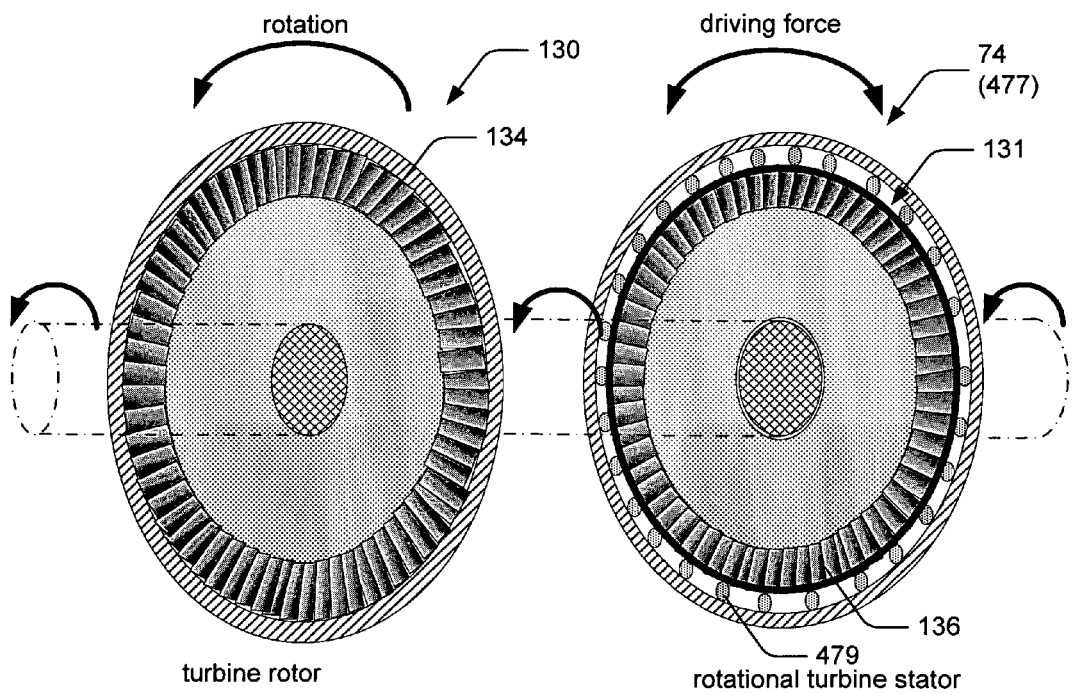
FIG. 22 is an exploded oblique view of an embodiment of a turbine stage including an embodiment of the turbine rotor and an embodiment of the independently rotatable turbine stator.

This disclosure now describes a number of embodiments of the at least one rotatable working fluid displacement engines 74 configured to rotate at least one independently rotatable turbine stator 477, as described with respect to FIGS. 7, 11 and 22. Conventional turbine stators, as described with respect to FIG. 18, typically remain stationary relative to the casing of the jet engine 58. By comparison, the at least one independently rotatable turbine stator 477 can be rotatably driven by the torque conversion mechanism at a controllable rotational velocity, or at a relative velocity relative to an at least one turbine rotor, as described with respect to FIG. 17. Such independent driving of certain embodiments of the independently rotatable turbine stator 477 can, depending on context, be in either direction as well as some controllable rotational velocity, such as can be provided by certain embodiments of the torque conversion mechanism 107 (e.g., the electric motor) as described with respect to FIG. 2, and other locations in this disclosure.

As such, within this disclosure, the term "independently rotatable turbine stator" can be configured as an independently rotatable device, such as may rotate at a desired rotational velocity relative to the particular turbine rotor. Certain embodiments of the hybrid propulsive engine 100 are configured such that the at least one torque conversion mechanism 107 is used to at least partially power at least one of the at least one rotatable working fluid displacement engines 74 configured particularly as the at least one independently rotatable turbine stator 477 (as described, particularly with respect to FIGS. 7, 11, and 22, as well as other locations in this disclosure).

Certain embodiments of the at least one independently rotatable turbine stator 477, as described, particularly with respect to FIGS. 7, 11 and 22, as well as other locations in this disclosure) are configured such that the at least one torque conversion mechanism 107 is used to at least partially power the at least one independently rotatable turbine stator 477. Such powering of the at least one independently rotatable turbine stator 477 can be performed in a manner that can allow for independent operation and rotation from the shaft 64 shown in FIGS. 12 to 16, as well as the at least one turbine rotors 130.

This allows for start-up of, continued operation of, as well as increased acceleration of the at least some independently rotatable turbine stators 477 under the power of the at least one torque conversion mechanism even if the jet engine 58 becomes inoperable, or is shutdown. Certain of such embodiments of the hybrid propulsive engine 100 can provide for improved operational inefficiencies since of rotational velocity and thrust provided by the at least one independently rotatable turbine stator 477 can be varied in certain embodiments relative to the jet engine.

The embodiments of the hybrid propulsive engine 100 as described with respect to FIGS. 7, 11 and 22, as well as other locations in this disclosure, can be used in combination, or any alternative, with the at least one torque conversion mechanism 107 using the at least one torque conversion mechanism to at least partially power the at least one independently rotatable turbine stator 477. There are a number of embodiments of the hybrid propulsive engine 100 in which the at least one torque conversion mechanism can be used to at least partially power the independently rotatable turbine stator 477.

Certain embodiments of the at least one independently rotatable turbine stator 477 can utilize a clutch mechanism (not shown) such that, when the clutch is secured, the at least one independently rotatable turbine stator 477 are rotatably secured to be stationary, and remain stationary therewith when acting as a conventional turbine stator. Alternatively, the clutch of the at least one independently rotatable turbine stator 477 can be released or loosened from being stationary such that it can be driven by a variety of embodiments of the torque conversion mechanism 107, as described with respect to FIG. 11. It is likely that only certain of the turbine stators within a turbine section will be configured as the at least one independently rotatable turbine stator 477 to be driven by the at least one torque conversion mechanism 107; while other turbine stators will be configured as conventional stators to be stationary such as to remain static relative to the housing of the hybrid propulsive engine 100. As such, perhaps in certain embodiments of the hybrid propulsive engine 100, the low pressure (e.g., those furthest from the combustion chamber of FIG. 16) embodiments of the turbine stator may be configured as at least one independently rotatable turbine stator 477, while high pressure (e.g., those closest to the combustion chamber of FIG. 16) turbine stator may be configured as stationary; or vice versa.

With certain embodiments of the hybrid propulsive engine 100, one or more of the independently rotatable turbine stator 477 can be rotatably driven independently from a stationary location of the jet engine. Such independence of rotation of the at least one independently rotatable turbine stator 477 can lead to such aspects as increasing efficiency, improving a variety of safety-related aspects such as reducing spooling rate, as well as allowing for increased overall power (either for a brief period or over a long period).

Figure 30:
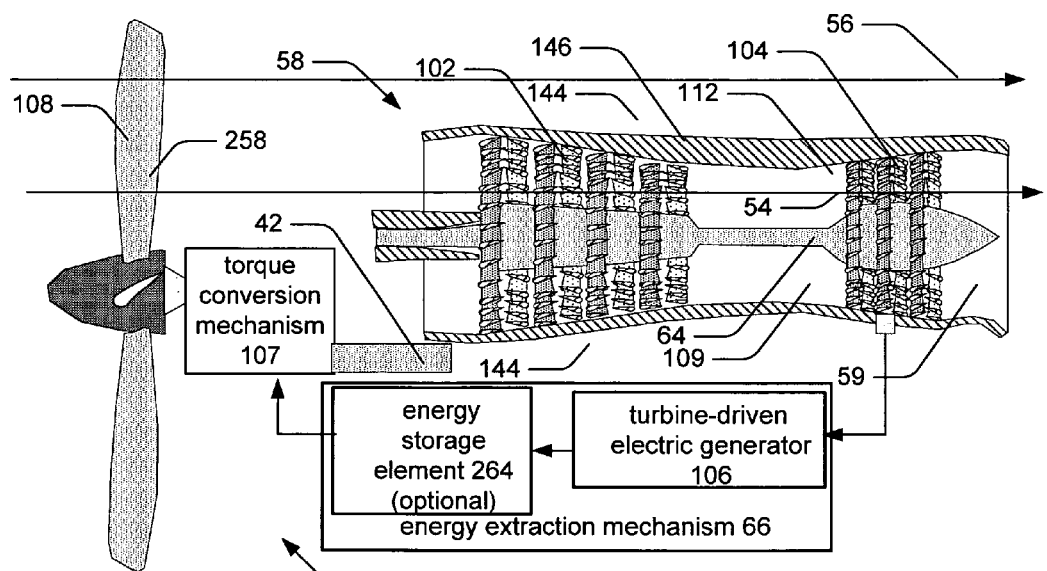
FIG. 30 is a diagram of one embodiment of the hybrid propulsive engine including the jet engine of the type described with respect to FIG. 15.
Figure 31:
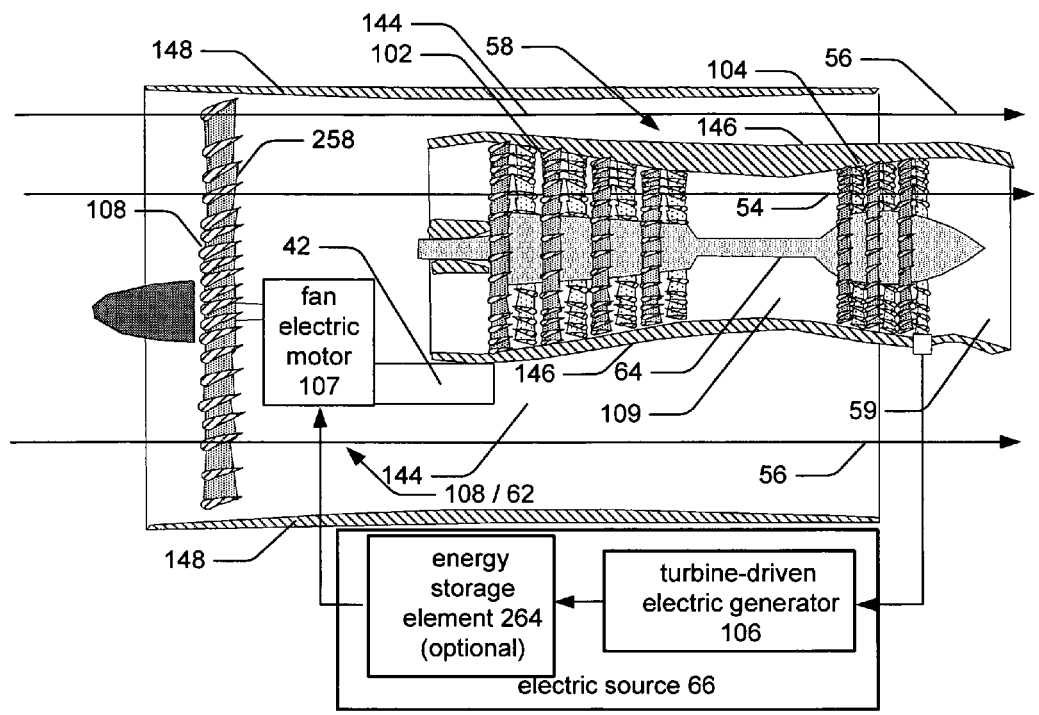
FIG. 31 is a diagram of another embodiment of the hybrid propulsive engine including the jet engine of the type described with respect to FIG. 15.
Figure 32:
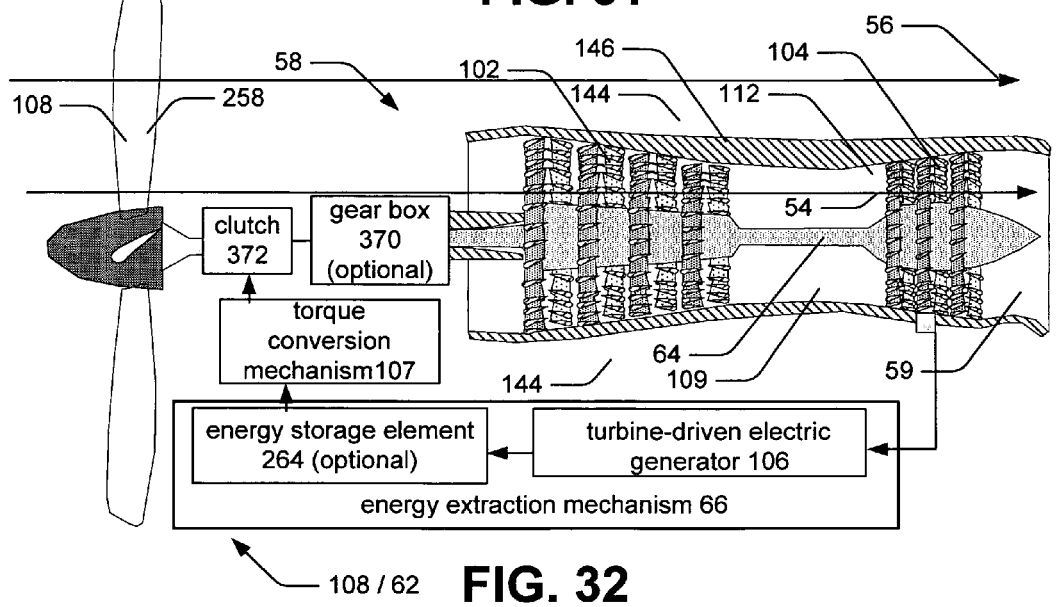
FIG. 32 is a diagram of another embodiment of the hybrid propulsive engine including the jet engine of the type described with respect to FIG. 15.
Figure 33:
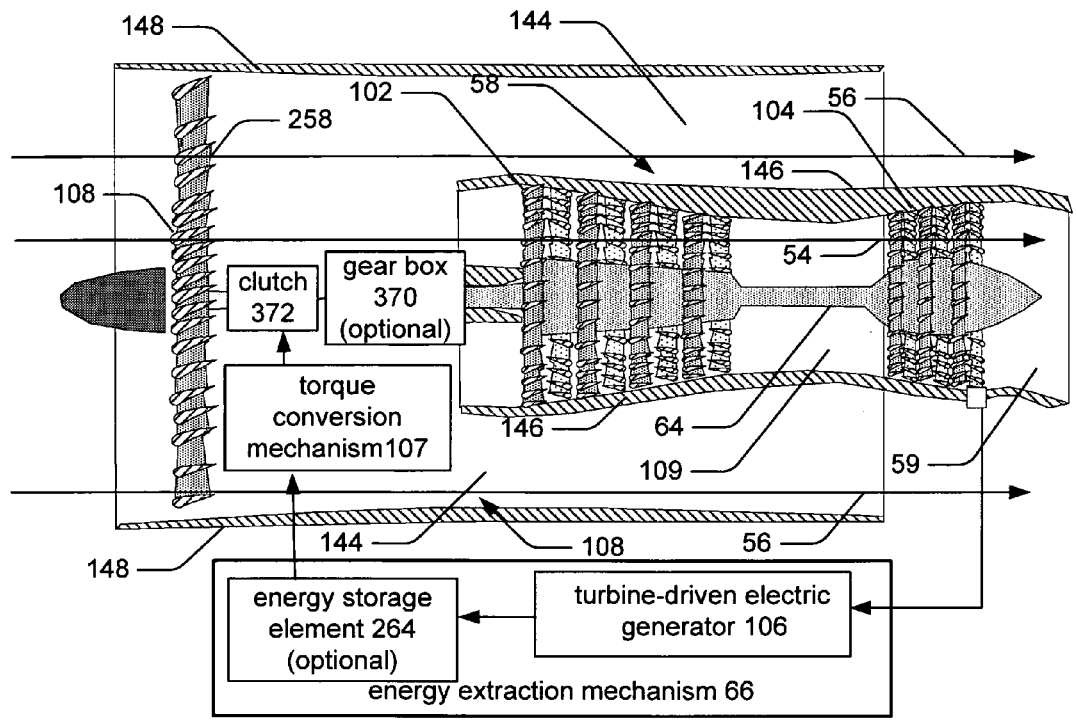
FIG. 33 is a diagram of yet another embodiment of the hybrid propulsive engine including the jet engine of the type described with respect to FIG. 15.
Figure 34:
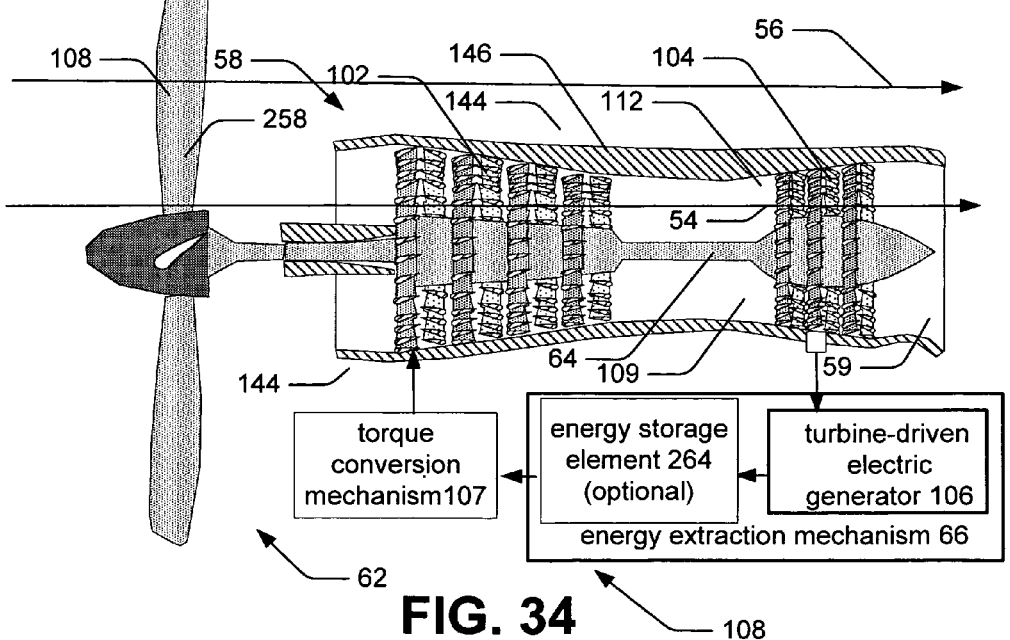
FIG. 34 is a diagram of another embodiment of the hybrid propulsive engine in which the torque conversion mechanism is used to drive a rotatable compressor element of the jet engine as described with respect to FIG. 15.
Figure 35:
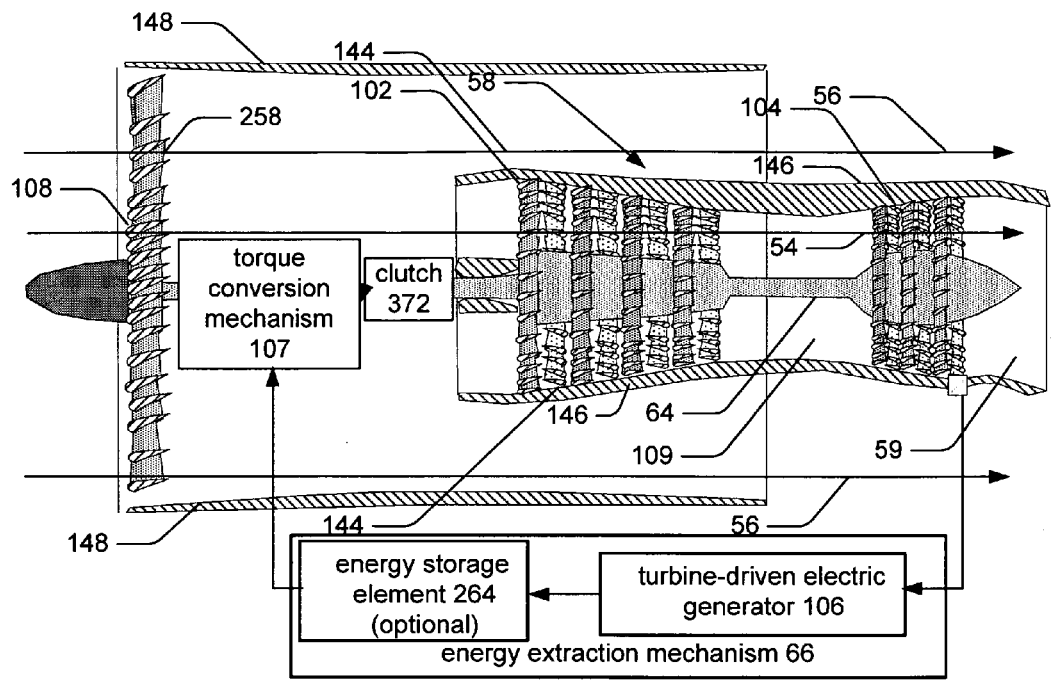
FIG. 35 is a diagram of still another embodiment of the hybrid propulsive engine including the jet engine of the type described with respect to FIG. 15 in which the torque conversion mechanism is used to drive the independently rotatable propeller/fan engine.
Figure 36:
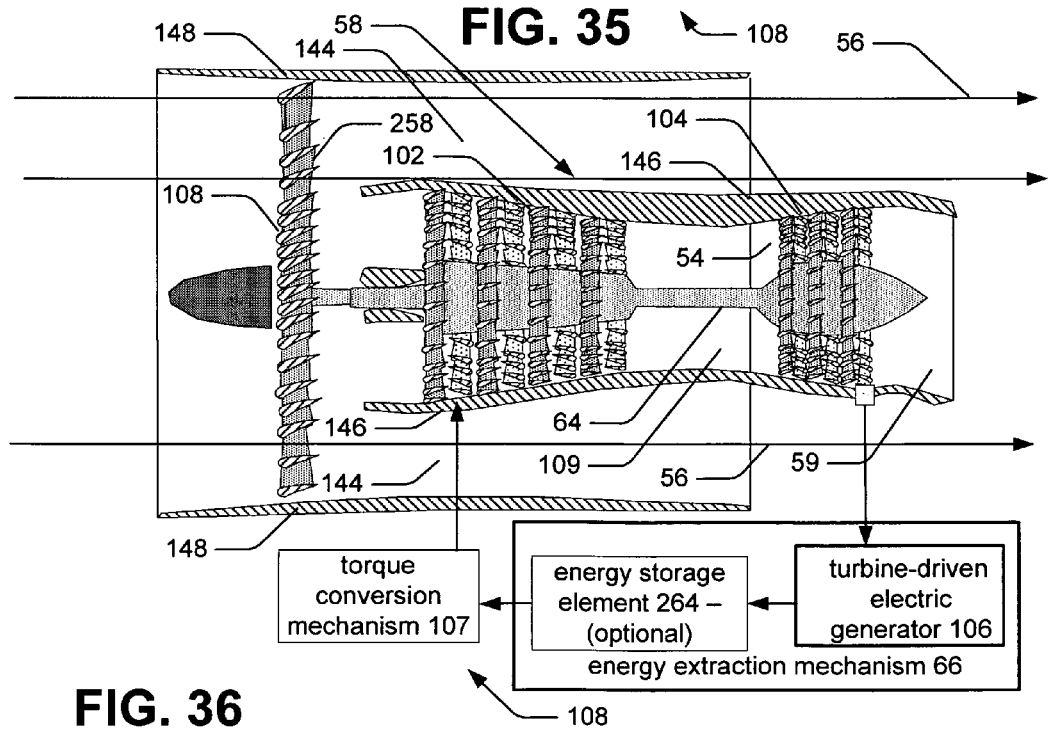
FIG. 36 is a diagram of another embodiment of the hybrid propulsive engine in which the torque conversion mechanism is used to drive a rotatable compressor element of the jet engine as described with respect to FIG. 15.
Figure 37:
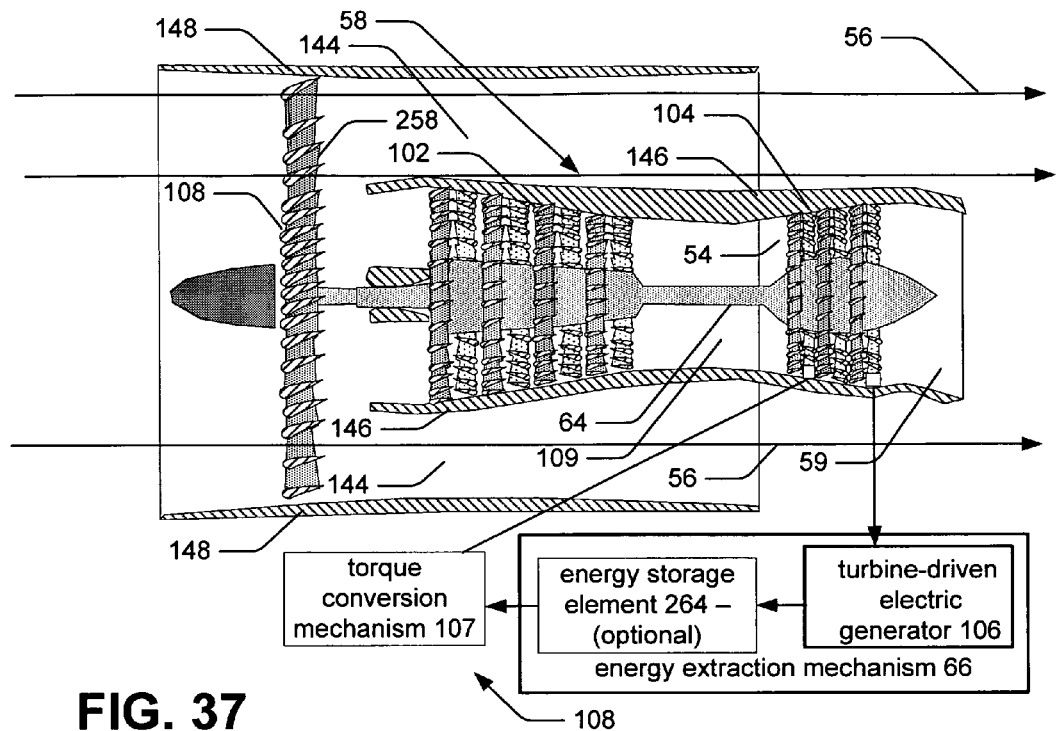
FIG. 37 is a diagram of another embodiment of the hybrid propulsive engine in which the torque conversion mechanism is used to drive a rotatable turbine element of the jet engine as described with respect to FIG. 15.
Figure 38:
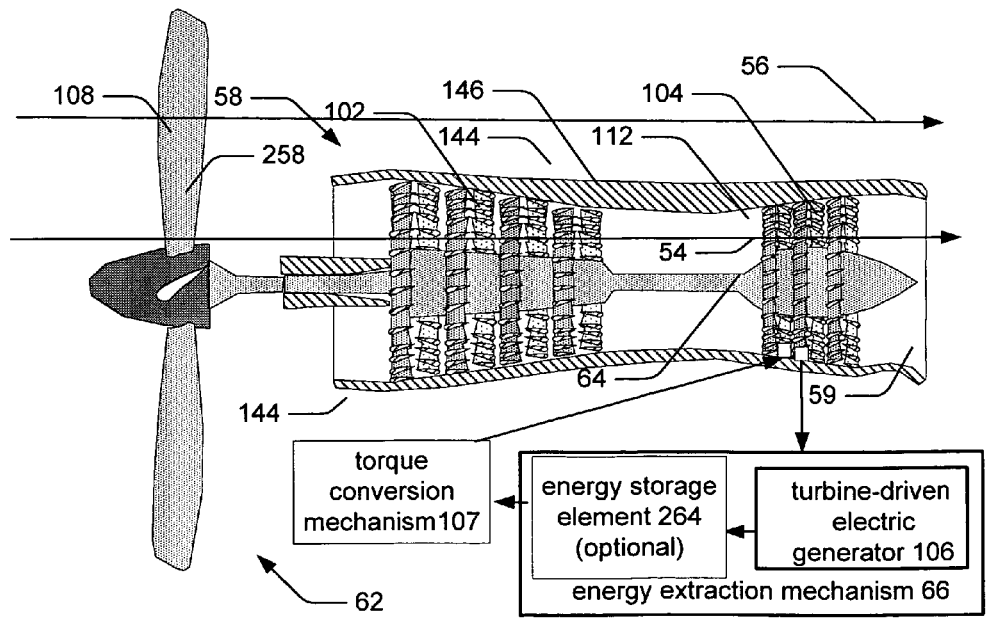
FIG. 38 is a diagram of another embodiment of the hybrid propulsive engine in which the torque conversion mechanism is used to drive a rotatable turbine element of the jet engine as described with respect to FIG. 15.

With certain embodiments of the at least one hybrid propulsive engine 100, one or more of the independently rotatable turbine stator 477 can be rotatably driven independently from a fixed location of the jet engine, such as in the opposite direction of rotation as the turbine rotor 130 as described with respect to FIG. 30. Having the independently rotatable turbine stator 477 being rotatably driven in the opposite direction of rotation as the turbine rotor 130, can provide for a relative rotation therebetween that equals the sum of the two rotational velocities. Since the at least one turbine rotor 130 rotates at least partially as a result of the working fluid passing through the turbine section (i.e., it is not driven by a shaft like a conventional compressor rotor), in many situations, it may be appropriate to control the rotational velocity of the at least one independently rotatable turbine stator 477.

In those embodiments of the turbine rotor that are connected by shaft to the independently rotatable compressor stator 493, as described with respect to FIG. 29, the rotational velocity of the compressor rotor 120 can be limited as described above. Since the compressor rotor 120 is often rotating at a slower angular velocity than with many conventional jet engines, the turbine rotor as described with respect to FIG. 17 can be driven correspondingly slower. By driving the at least one turbine rotor 130 at a considerably reduced rotational velocity, the forces and energy to rotate the turbine rotor (as well as the associated shaft 64 and/or turbine rotational elements as described with respect to FIG. 16) can additionally be reduced. By driving the at least one turbine rotor 130 at a considerably reduced rotational velocity, the stresses and fatigues being applied to the turbine rotor (as well as the associated shaft 64 and/or turbine rotational elements as described with respect to FIG. 16) can be limited and the possibility of failure of such components can be limited. Also, increased fuel efficiency can result since the at least one turbine rotor is being driven at lower rotational velocities. Those portions of the at least one independently rotatable turbine stators 477 that are not driven by the jet engine directly from the shaft (and the rotatable turbine element) are driven by the at least one torque conversion mechanism 107. The fuel applied via the combustion chamber to heat and expand the working fluid passing through the jet engine results in a relatively low efficiency (typically less than 20 percent). Much of the energy from the jet engine can be converted, with increased efficiencies, into electricity at least partially based on the at least one energy extraction mechanism 66. Certain embodiments of the at least one independently rotatable turbine stator 477 can be configured to extract external energy such as from the at least one energy extraction mechanism 66, while others may not.

Certain elements of certain embodiments of the hybrid propulsion engine 100 can be operationally associated with certain elements of other hybrid propulsion engines as described with respect to FIGS. 2 and 22. For example, during flight, it may be desired to stop certain jet engines 58, and allow other engines to run, have energy extracted therefrom using certain embodiments at least one energy extraction mechanism 66, and have the extracted energy (in the form of electricity) applied perhaps to the energy storage device 264 as well as to the torque conversion mechanism 107. Such extracted energy can be used to drive at least one rotatable working fluid displacement engine 74 that may include the at least one independently rotatable turbine stator 477. Operating fewer jet engines 58 during such low-demand periods as cruise and/or descent could be expected to improve fuel mileage and efficiency of the at least one hybrid propulsive engines 100, as well as limit wear, stress, fatigue, etc. to certain of the components of the at least one hybrid propulsive engine. As such, certain embodiments of the at least one independently rotatable turbine stator 477 can receive power from one or more energy extraction mechanism 66, that may be considered as an aspect of power sharing as described in this disclosure. Similarly, each energy extraction mechanism can receive generated power from one or more distinct jet engines 58, as described in this disclosure, may be considered as another aspect of power sharing as described in this disclosure.

Additionally, certain embodiments of the at least one independently rotatable turbine stator 477 can be configured to ease starting of the jet engine without a remote starter. Such starting or attempts to start the jet engine may take place on the ground, or alternately may occur in flight. Such ease of restart can occur partially because the at least one independently rotatable turbine stator 477, as well as other components of the independently rotatable working fluid displacement engine 74, may not each require as high rotational velocities to restart, and the mass of at least certain ones of the independently rotatable working fluid displacement engine 74 can be accelerated by the at least one torque conversion mechanism 107 and not the at least one jet engine 58, as described in this disclosure. As such, starting the at least one jet engine 58 may require less inertia in certain embodiments of the at least one hybrid propulsion engine 100, and as such certain embodiments of the at least one jet engines can be configured to start in flight in a manner assisted by the use of certain embodiments of the at least one independently rotatable turbine stator 477.

If certain embodiments of the at least one jet engines can be more easily started during flight, then it is also true that they can be stopped during flight with the expectation that they can be restarted. Consider that the manner in which certain hybrid automobiles increase their fuel mileage is to turn their gas motor off during certain times of non-peak (torque) demand. Similarly, at least some of certain embodiments of the at least one jet engine associated with at least one hybrid propulsive engine 100 can be configured to stop during times of less than peak demand, such as cruise and descent, and the electricity generated by only those operating jet engines 58 can be extracted using certain embodiments of the energy extraction mechanism 66. The electricity extracted from a particular one of the at least one jet engine 58 can be applied to the at least one energy storage device 264 and/or an at least one torque conversion mechanism 107 that may, or may not, be associated with that particular at least one jet engine, as described with respect to FIGS. 45 to 50. Similarly, the electricity extracted from a particular one of the at least one jet engine 58 can ultimately be used to rotate the one or more rotatable working fluid displacement engines 74 (configured as the at least one independently rotatable turbine stator 477) that may or may not be operationally associated with that particular jet engine 58, as described with respect to FIGS. 45 to 50.

With certain embodiments of the at least one hybrid propulsive engine 100, one or more of the at least one independently rotatable turbine stator 477 can be rotatably driven. Those portions of the at least one independently rotatable turbine stator 477 that are not driven by the jet engine directly from the shaft (and the rotatable turbine element) can therefore be driven by the at least one torque conversion mechanism 107. As such, portions of the turbine section corresponding to the at least one independently rotatable turbine stator 477 can continue to operate even while other portions that are driven by the turbine rotatable elements do not. Such powering of independently rotatable turbine stator 477 from different torque conversion mechanisms 66 (such as includes an energy extraction mechanism 66) and/or different torque conversion mechanisms (such as can each include an electric motor) can increase the safety of the at least one hybrid propulsive engine. The fuel applied via the combustion chamber to heat and expand the working fluid passing through the jet engine has a relatively low efficiency (typically less than 20 percent). Much of the energy from the jet engine can be converted, with increased efficiencies, into electricity at least partially based on the at least one energy extraction mechanism 66.

In certain embodiments, instead of the turbine rotor 130 being positioned proximate to, and rotating relative to, a (stationary) turbine stator, the turbine rotor is configured to operate at N rpm (N is an integer, for example, 1800 RPM). By comparison, those embodiments of the at least one hybrid propulsive engine 100 in which at least one turbine stage (including the turbine rotor 130 and the independently rotatable turbine stator 477) can instead have relative rotation provided by the relative rotational rate between the independently rotatable turbine stator 477 and/or the at least one turbine rotor 130. For instance, to achieve a relative rotation of 1800 RPM, the turbine rotor could rotate at a rotational velocity of 900 RPM, while the adjacent independently rotatable turbine stator 477 can rotate at a rotational velocity of 900 RPM in the reversed direction. Such counter-rotation of the turbine rotor 130 (as driven by the working fluid passing through the turbine section) relative to the independently rotatable turbine stator 477 (as can be driven by the torque conversion mechanism) can thereby provide an output relative rotation of N RPM, while maintaining the pressure of the compressed working fluid applied from the turbine section.

Certain embodiments of the intrastage turbine rotatable elements can provide for enhanced efficiency, since the independently rotatable turbine stator 477 can be driven by the torque conversion mechanism 107 and rely on regenerative energy, retrieval of energy from low demand periods to high demand periods, as well as other energy efficiency techniques. Additionally, there may be a relative rotational velocity between the turbine rotors 130 and the independently rotatable turbine stator 477, for one or more stages that can provide for increased efficiency. Such efficient power settings between the turbine rotors 130 and the independently rotatable turbine stator 477 can be determined computationally based on relative rotational velocities, or empirically such as by setting up a test stand for the hybrid propulsive engine 100.

By allowing the rotational velocity of the turbine rotor 130 to be driven more slowly (due to the controllably counter-rotating independently rotatable turbine stator 477), the shaft can be driven at a slower rotational velocity. As such, the amount of associated components can operate at a reduced rotational velocity, resulting in less noise being provided, and limiting the force, stress, and fatigue applied to the rotating components as a result of the lower rotational velocity components of the associated rotatable turbine element. While certain embodiments of the independently rotatable turbine stator 477 are configured to counter-rotate relative to the turbine rotor 130, it is envisioned that there are situations that the turbine rotor may be operated in the same direction as the independently rotatable turbine stator 477. Determination of a particular relative rotational velocities between the at least one independently rotatable turbine stator 477 and the at least one turbine rotor 130 for a particular operation may be determined empirically, impirically, or a combination thereof. There have been instances of rotational turbine and turbine components fracturing during operation, and it could be expected that operating the shaft and the associated turbine rotating elements at slower rotational velocities could limit such damage, and perhaps extend the operating lifetimes of these rotatable turbine elements, and the associated structures.

Certain embodiments of the independently rotatable turbine stator 477 can be independently powered and controlled from the torque conversion mechanism 107. As such, certain of the independently rotatable turbine stator 477 can accelerate and spool quite quickly. Rotation of the independently rotatable turbine stator 477 in a particular direction when starting the jet engine can assist in starting the jet engine 58. Such independent operation of certain embodiments of the independently rotatable turbine stator 477 can allow the turbine rotors to achieve their operating rotational velocities relatively quickly. The rotational velocities of the turbine rotors 130 may in certain instances be slower than that of the comparable conventional turbine rotors (e.g., 900 RPM as compared with 1800 RPM for a relative rotational velocity as with conventional turbine rotatable elements). Certain embodiments of the at least one independently rotatable turbine stator 477 can be configured to rotate at a particular rotational velocity rate since they are driven by the at least one torque conversion mechanism. A sensor, indicator, and/or controller can be provided to monitor and/or control the rotational velocity of the at least one independently rotatable turbine stator 477. If the actual rotational velocity of certain embodiments of the at least one independently rotatable turbine stator 477 varies from a desired or set rotational velocity by some amount, the torque conversion mechanism can be actuated to suitably adjust the rotational velocity.

As described with respect to FIG. 22, certain embodiments of the at least one hybrid propulsive engine 100 may therefore be configured to provide independent operation of the at least one independently rotatable turbine stator 477 relative to the at least one turbine rotatable element. As such, certain embodiments of at least certain ones of the at least one independently rotatable turbine stator 477 can be rotated at least partially using at least one of the torque conversion mechanism 107, some of which are described with respect to FIGS. 2 and 11.

Certain embodiments of the at least one propulsive engine 100 can be configured to drive the turbine rotatable elements of one or more turbine stages 119, as described with respect to FIGS. 7, 11 and 22. As such, this disclosure can also provides a variety of hybrid propulsive engines 100, certain of which are described in block form with respect to FIG. 11, in which a variety of embodiments of the jet engine 58 can be individually controlled with respect to a variety of embodiments of the at least one independently rotatable turbine stator 477. With various embodiments of the hybrid propulsive engine 100, such powering of the at least one independently rotatable turbine stator 477 using the at least one torque conversion mechanism can be performed at various durations or flight conditions in the alternative, in combination, or distinct from each other.

Certain embodiments of the independently rotatable turbine stator 477, as driven by the torque conversion mechanism, can utilize controlling the polarity in a manner as to provide a clutch function, a brake function, or a locking-in-place function by the appropriate control of the polarity of the torque conversion mechanism. The control of rotational velocities, modes, and directions of torque conversion mechanisms in general is well understood, and the application of such braking or locking-in-place functions of the independently rotatable turbine stator 477 of FIGS. 7, 11 and 22. As such, the rotational velocity of the at least one independently rotatable turbine stator 477, as well as that of the turbine rotor, can be precisely controlled for certain embodiments of hybrid propulsive engines 100, as may be appropriate to establish a particular thrust being generated by the jet engine for a particular aircraft operation.

With certain embodiments of the hybrid propulsion engine 100, at least a portion of the at least one independently rotatable turbine stator 477 can thereby be powered at least partially using the at least one torque conversion mechanism 107. Certain embodiment so they hybrid propulsive engine 100 in which the at least one torque conversion mechanism 107 is used to at least partially powered the at least one independently rotatable turbine stator 477 may allow for relatively fuel-efficient operation, as well as operation which may continue, even if the shaft as well as the turbine rotatable elements, for any reason, ceases operation.

9. Efficiency/Emergency Aspects of Hybrid Propulsive Engine

The term "hybrid" as applied to the vehicles as indicating energy efficient operations. In general, certain embodiments of jet engines 58, as with other forms of internal combustion engines, may be relatively inefficient. Consider that the average internal combustion engine only converts about 15 to 25 percent of its energy into useful motive force at the output of the internal combustion engine (wherein the rest is expended through heat loss, noise, etc.). Jet engines, which are a form of internal combustion engine, have similar efficiencies. Turboprops and turbofans, as mentioned in this disclosure, generally represent relatively efficient engines as compared with jet engines acting alone. Also consider that vehicles, in general, spend a considerable amount of energy on driveline inefficiencies, idling, stopping, improperly inflated tires, accelerating quickly, etc. Also, consider that during most flights, a considerable percentage of the time much of the energy provided by the jet engine is effectively discarded (e.g., start-up, pre-flight check, descent, taxi, certain cruise considerations, etc. Certain embodiments of the hybrid propulsive engine 100 can allow for some percentage of the wasted energy to be used to power the torque conversion mechanism 107 (and subsequently the at least one independently rotatable propeller/fan engine 62 and/or the at least one independently rotatable propeller/fan assembly 108).

As such, certain conventional vehicle internal combustion engine in general (and conventional jet engines including conventional turboprops and conventional turbofans in particular), may be quite inefficient, and in some cases, it may be appropriate to provide efficiency using certain embodiments of the hybrid propulsive engine 100. Certain embodiments of the at least one rotatable working fluid displacement engine 74 included in the hybrid propulsive engine 100 therefore can increase overall efficiency by generating electricity that can power the at least one independently rotatable propeller/fan engine 62 during relatively-low demand portions of the at least one hybrid propulsive engine 100, such as during taxi, efficient cruise, descent, etc. By comparison, such operating the at least one independently rotatable propeller/fan engine 62 during periods of relatively high demand (take off, climb, certain emergency procedures) using at least some of the electricity generated during the relatively low demand portions of flight.

Certain embodiments of the hybrid propulsive engine controller 97 can be configured to determine a relatively efficient power setting between the at least one jet engine 58 and the at least one rotatable working fluid displacement engine 74. Certain embodiments of such power setting of the at least one hybrid propulsive engine 100 between the at least one jet engine 58 and the at least one rotatable working fluid displacement engine 74 can take into account the existence or state of certain embodiments of the at least one energy storage device 264. By comparison, certain embodiments of such power setting of the at least one hybrid propulsive engine 100 between the at least one jet engine 58 and the at least one rotatable working fluid displacement engine 74 may operate without the existence at least one energy storage device 264.

Certain embodiments of the hybrid propulsive engine 100 can therefore provide varied efficiencies and performances based on selecting different settings of the jet engine 58 that may include the at least one independently rotatable propeller/fan engine 62 of FIG. 8, the independently rotatable compressor rotor 120 as described with respect to FIG. 9, the independently rotatable compressor stator 493 as described with respect to FIG. 10, and the independently rotatable turbine stator 477 as described with respect to FIG. 11. As such, a number of power, performance, and/or efficiency values can be empirically determined by, for example, testing the hybrid propulsive engine 100 either alone or as integrated in the aircraft 75 or other vehicle 98 of FIG. 1.

Certain embodiments of the hybrid propulsive engine controller 97 can provide a display such that a user can understand how to efficiently operate the hybrid propulsive engine 100. Consider, for example, the display for many hybrid automobiles such as the second generation Toyota Prius, that describe how much power is being generated by the gas engine, is being generated by the electric engine, and/or is being provided or consumed by the battery, as well as if either engine is not operating at a particular instantaneous time. Similar displays that indicate which components are providing power (e.g., similar to FIGS. 45 to 50) can be provided in certain embodiments of the hybrid propulsive engine 100 that can indicate such illustrative but not limiting aspects as the energy being provided by or consumed by the energy storage device 264 as well as the jet engine 58, and how much energy is being provided by the energy extraction mechanism. Such displays can assist the user, such as a pilot, in efficiently operating the aircraft 75 or other vehicle. FIGS. 42, 43, and 44 show an example of a display that may be provided on a graphical user interface (GUI), LED display, LED display, heads up display, holographic display, etc.

Certain embodiments of the display can display operation as well as energy levels of the at least one jet engine 58, the at least one torque conversion mechanism 107, and the at least one energy extraction mechanism 66. Such displays can indicate percentage of thrust being provided by the jet engine, as well as rotational velocities of various of the rotational elements of the jet engine (e.g., the turbine, compressor, and/or shaft).

Conventional technique for take-off for aircraft with conventional turboprops or turbofans typically involve applying full power within each of the turboprop or turbofan, as obtained from at least portions of the turbine (via one or more shafts). By comparison, since certain embodiments of the hybrid propulsive engine 100 can obtain power from each of two independently operable engines, there is some choice as to whether to apply full power during each of the two power sources. Such operating of the at least one jet engine 58 and/or the at least one independently rotatable propeller/fan engine 62 at less than full power can be an attempt to increase efficiency of certain embodiments of the hybrid propulsive engine 100, as well as to reduce generated noise, such as with noise sensitive airports. For instance, at relatively low altitudes (particularly during take-offs, landing, approaches, departures, and when operating near the ground), where propellers and fans tend to be more efficient as compared with jet engines than at high altitudes, it may be desired to take off and/or climb with less than all the jet engines at full power while the at least one independently rotatable propeller/fan assembly 258 are operating at full power.

By comparison, at relatively high altitudes, where propellers and fans tend to be less efficient as compared with jet engines, it may be desired to take off and/or climb with all the jet engines 58 at full power while each of the at least one the at least one independently rotatable propeller/fan assembly 258 can be configured to operate at less than full power. In taking off and landing a noise sensitive airports and regions, it may be desired to select a power setting to maximize the power provided by the at least one torque conversion mechanism 107 to power the at least one independently rotatable propeller/fan engine 62 while minimizing the power provided by the jet engines 58. Various settings may be provided to allow takeoff or landing within certain distances (either taking off or landing on the runway, or taking off or landing over an obstacle having a particular height).

Since certain embodiments of the hybrid propulsive engine 100 can obtain power from each of two power engines (the turbine section 104 of the jet engine 58, as well as the torque conversion mechanism 107), the choice as to whether to apply full power during each of the two power engines can be the pilots based, for example, on some balance between the suggested operating manual or operating characteristics of the aircraft, as well as particular operating skills of the pilot and/or aircraft operator. The suggested operating manual or operating characteristics of the aircraft can be either contained in a paper manual or database that can be set by the pilot or aircraft operator. Such varied operating manuals or generally understood and largely memorized by pilots, and/or can be included in check-list (which may be electronic or written).

Certain of the displays can indicate energy consumption in a manner that "teaches" pilots or operators how to fly efficiently. Consider the displays of such hybrid automobiles as the Toyota Prius, for example, which indicates to the drivers/passengers the amount of energy consumed or provided by the torque conversion mechanism, the gas motor, and/or the battery. For instance, with certain embodiments of the input output interface 811 of the hybrid propulsive engine controller 97 as described with respect to FIGS. 8 and 11, the pilot or aircraft operator can observe the suggested operating parameters for each phrase of flight by selecting or indicating the current state of operation as described with respect to FIGS. 42 to 50 for the aircraft and/or the hybrid propulsive engine 100, and observing whether the aircraft and/or the hybrid propulsive engine 100 is operating within those prescribed or suggested states or conditions. Certain embodiments of such monitoring of the states, parameters, or conditions of the hybrid propulsive engine 100 can be largely manual, such as the pilot or flight crew indicated the current flight state such as take off or efficiency cruise. By comparison, certain embodiments of such monitoring of the states, parameters, or conditions of the hybrid propulsive engine 100 can be largely automated, such as the hybrid propulsive engine controller 97 at least partially determining the current flight state such as take off or efficiency cruise.

Consider, for example, the pilot, crew, or the hybrid propulsive engine controller 97 can be configured as to determine which of the flight conditions at the left of FIG. 42 is most appropriate for the aircraft at any given time or flight condition. Consider that the pilot, crew, or the propulsive engine controller 97 determines that the aircraft is taking off, then at least some of the current parameters as well as the parameter limitations (in parenthesis) can be indicated, as per FIGS. 43 and 44. In those instances that the current parameters is approaching or exceeding a particular parameter limitation, a warning can be provided (such as a different color light, a buzzer, etc.) such as to warn the pilot of the condition, of alternately the condition could be altered automatically if so programmed. Certain embodiments of the display, user interface, warning, hazard, etc. as described with respect to FIGS. 42 to 44 can be integrated in the input output interface 811 of the propulsive engine controller 97, as described in this disclosure with respect to FIGS. 8, 9, 10, and 11.

Certain embodiments of the hybrid propulsive engine 100 can thereby be configured to decouple power generation (such as from the at least one turbine section 104) and thrust generation (such as from the turbine section 102). Such rotatable decoupling of the at least one turbine section 104 from the at least one turbine section 102 can provide for considerable relative shaft-speeds and/or shaft-speed percentage-variations, such as may exist without use of a massive mechanical transmission. One reason that such linkages and couplings are made relatively bulky is that they are over-engineered, in order to limit any probability of failure of each respective component. Certain embodiments of the hybrid propulsive engine 100 can be configured such that each of the one or more torque conversion mechanisms is situated close to that item which it is powering (e.g., the independently rotatable propeller/fan engine 62 and/or the turbine rotatable element 103). Rotatable decoupling of the at least one turbine section 104 from the at least one turbine section 102 can also provide for peaks in thrust typically (but not always) being enabled to occur asynchronously with peaks in (typically, but not always, electric) power being generated. Such rotatable decoupling may provide for considerable gains in time-averaged hybrid propulsive energy efficiency and safety-margins-in-operation.

Certain embodiments of the hybrid propulsive engine 100 can be configured to allow for relatively efficient operation between the at least one independently rotatable propeller/fan assembly 108 and the hybrid propulsive engine 100, and may thereby be considered as a hybrid engine since power can be provided at least partially by the torque conversion mechanism 107 as well as at least partially by the at least one jet engine 58. With such duplication, certain of the existing jet engine components could be designed less bulky, since failure of such components may not have as critical of an impact. For multi-engine aircraft, and even for single engines or twin-engine aircraft, providing for a dual power engines for each of the hybrid propulsive engine 100 can allow aircraft that are having jet engine difficulties to at least return to a nearby airport, field, etc. As such, the vehicle 98 such as the aircraft 75 can rely on power provided from some combination of the at least one jet engine 58 as well as the torque conversion mechanism 107, and provide safety while also reducing weight of a number of components associated with over-engineering. This providing of power independently between the torque conversion mechanism 107 as well as the at least one jet engine 58 allows for commercial acceptance, thereby easing introduction into the market as well as commercial acceptance, but also may be important for balancing between a powerful take-off/climb thrust and energy efficiency over a variety of configurations and velocities.

Certain embodiments of the hybrid propulsive engine 100 can thereby utilize this hybrid separation between the torque conversion mechanism 107 and the at least one jet engine 58, such as may result in relative positioning of the torque conversion mechanism 107 and the at least one jet engine 58 to make thrust directionality easier. For instance, in certain embodiments of the hybrid propulsive engine 100, the direction of rotatable rotation the torque conversion mechanism 107 can be opposed to that of the at least one jet engine 58, and its orientation can be changed during flight easier as a separate unit.

In certain embodiments of the hybrid propulsive engine 100 configured as a turbo-fan engine, the at least one independently rotatable propeller/fan assembly 108 will likely not directly slave to the at least one turbine section 104 of the at least one jet engine 58. Certain embodiments of a jet engine design where secondary fan not directly coupled to primary fan, so the hybrid propulsive engine 100 can be configured to be optimized for power distribution as desired between the torque conversion mechanism 107 and the at least one jet engine 58. In certain instances, at least some energy generated by the at least one jet engine 58 can be applied to power the at least one independently rotatable propeller/fan assembly 108. Certain embodiments of aircraft 75 may be configured with distribution of power from the torque conversion mechanism 107 and the at least one jet engine 58 could enhance travel safety such as by enhancing directional stability in the case of loss of power by at least one of the at least one independently rotatable propeller/fan assembly 108, since the torque conversion mechanism 107 can continue to run even if one or more of the at least one jet engine 58 fail to operate. Certain embodiments of the hybrid propulsive engine 100 can therefore be configured to separate a thrust section as provided by the torque conversion mechanism 107 from power generation section as provided by the at least one jet engine 58. This separating the thrust section as provided by the torque conversion mechanism 107 from the power generation section as provided by the at least one jet engine 58 could be useful, likely, for passenger bearing aircraft 75. This might allow for more efficiently using the torque conversion mechanism 107 such as may assist in use of the at least one independently rotatable propeller/fan engine 62 that are operationally decoupled from the at least one jet engine 58. Note, with respect to the decoupling or otherwise operationally separating, this might allow for some power to drive the fan that comes from elsewhere than the power generation of the jet engine; as such, the battery provided power for the at least one independently rotatable propeller/fan engine 62 is likely to be considerably quieter than the power generated from the jet engine 58, which can by use of the former rather than the latter result in a likely significant noise reduction; one interesting aspect here is feeding back power to primary fan of jet.

In addition, during many of such high demand climbing, landing, or emergency operations, the thrust from the jet engine 58 as well as the at least one independently rotatable propeller/fan engine 62 can be directed to most usefully utilize the power from the torque conversion mechanism 107 to power the at least one independently rotatable propeller/fan assembly 108. For instance, during short field take offs or landings, or soft field take offs or landings, it may be desired to limit the distance necessary on the runway for the aircraft to take off or land, as well as to limit the sound produced by the aircraft as operating along the runway. As such, certain embodiments of the aircraft 75 can be configured to include such independently rotatable working fluid displacement engine 74 as the at least one independently rotatable propeller/fan 258 as described with respect to FIG. 8, the independently rotatable compressor rotor 120 as described with respect to FIG. 9, the independently rotatable compressor stator 493 as described with respect to FIG. 10, and/or the independently rotatable turbine stator 477 as described with respect to FIG. 11. Certain embodiments of the independently rotatable propeller/fan as described with respect to FIG. 8, and other locations in this disclosure can provide for considerable responsive power at low altitudes. Such characteristics may be useful for missed approaches or go around, where considerable power is applied. Such increase of thrust can be particularly useful to provide "short field take off and landing", such as may allow particular aircraft to take off from shorter than normal fields, aircraft carriers, etc. Such "short field take off and landing" can be accomplished at very low airspeeds in certain aircraft where the at least one independently rotatable propeller/fan 258 can be used, in many instances, largely because the upwardly directable thrust of the at least one independently rotatable propeller/fan 258 can effectively limit the effect of the "weight" of the aircraft during takeoff, and allow the aircraft to take off at lower speeds.

Certain embodiments of the aircraft 75 can be configured such that the amount of the at least one independently rotatable propeller/fan 258 is used along the runway as the aircraft accelerates. Consider that certain conventional aircraft (typically larger airlines or cargo planes, etc.) have a prescribed flap setting during take-off, and the flap setting increases the camber (curvature) of the wing as well as increases the angle of attack of the wing. Increasing the camber as well as increasing the angle of attack, which both increase lift and therefore allow the aircraft to take off at lower airspeed, also increase the drag of the airflow on the wing and therefore make it more difficult for the airplane to accelerate to take-off speed, thereby increasing the runway length required for take-off for any given condition. By maintaining the power of the at least one independently rotatable propeller/fan 258 during the take-off run, certain embodiments of aircraft can have the increased lift provided to the wing to allow the aircraft to take off at shorter distances. As such, the use of certain embodiments of the at least one independently rotatable propeller/fan 258 can provide for considerably altered wing/flap design as well as to provide for increased effectiveness of flight by limiting drag such as during take off, and increasing acceleration of the aircraft during take-off.

In at least some of the take off, emergency, or full-power conditions, it may be desired to apply full power to both the at least one independently rotatable propeller/fan assembly 108 and the at least one jet engines 58 at full thrust and/or power. For certain embodiments of the hybrid propulsive engine 100 in which the at least one independently rotatable propeller/fan assembly 108 is powered by the battery providing power to the energy extraction mechanism 66 (in which the battery has been charged), the at least one independently rotatable propeller/fan assembly 108 can operate without consuming jet fuel either directly or indirectly (indirectly equates to being converted into electricity generated from the energy extraction mechanism).

As such, to provide full power to the aircraft, or to maximize the percentage of power that is being applied by the torque conversion mechanism, it would be desirable to enhance the efficiencies of the at least one torque conversion mechanism 107 that may or may not include the at least one energy storage device 264 (of FIGS. 8 to 11 and other locations in this disclosure). For certain embodiments of the energy storage device designs (as well as the torque conversion mechanism 107), such as batteries, it might be desirable to utilize relatively recent battery technologies such as lithium ion batteries, and other efficient batteries, that increase the power output, and duration of power output, for a given weight of the battery.

As such, certain embodiments of the at least one independently rotatable propeller/fan assembly 108 could be powered from the torque conversion mechanism 107, while the jet engine will be powered by from rotation of the turbine. Since the jet engine does not have to power all of the at least one independently rotatable propeller/fan assembly, as with conventional turboprops/turbofans, the less energy has to be expended from the jet engine during take-off, and more power can be directed from the at least one turbine section 104 to rotate the at least one turbine section 102. As such, the more total power should be provided from the combination of the at least one independently rotatable propeller/fan assembly 108 and the at least one jet engines 58 during full power, and this should allow the aircraft 75 to climb faster and at more rapid airspeeds. In addition, the rate of aviation fuel consumed during climb should be reduced. These factors of increased climb rate and diminished fuel consumption during climb (by at least some of the energy to climb being provided by the torque conversion mechanism 107, which may be charged during a less energy demanding portion of flight or on the ground) that can allow for the aircraft 75 to reach their intended cruise altitude with more aviation fuel on board, and thereby allow for the aircraft to increase its range at its cruising altitude.

In at least some of the cruise, descent, or other conditions, it may be desired to apply partial power in some combination to either the at least one independently rotatable propeller/fan assembly 108 or the at least one jet engines 58. Such determination as to which of the at least one independently rotatable propeller/fan assembly 108 or the at least one jet engines 58 that will be run at which power will often depend on the overall efficiencies of the at least one independently rotatable propeller/fan assembly 108 as compared with the at least one jet engines 58.

In at least some of the approach, go-around, or other conditions, it may be desired to increase from partial power settings to some increased or full power as quickly as practicable in some combination to either the at least one independently rotatable propeller/fan assembly 108 or the at least one jet engines 58.

Certain embodiments of the at least one hybrid propulsive engine 100 may be configured to start, or re-start, one or more of the jet engines 58 during flight. Certain embodiments of such starting or re-starting of one or more of the jet engines can be performed routinely, such as during starting-up, on a tarmac or after setting a jet engine down in flight for efficiency reasons. Alternately, certain embodiments of the starting or re-starting of one or more of the jet engines 58 can be performed in an emergency situation such as during unintended loss of power of at least one engine or a turbine stall. Such starts or re-starts can be accomplished, for example, in certain embodiments of the hybrid propulsive engine 100 by starting the independently rotatable propeller/fan engine 62 that is at least partially powered using the at least one torque conversion mechanism 107, during which times a flow of the working fluid can be established through the jet engine that may be sufficient to rotate the turbine rotating element(s) 105 as described with respect to FIG. 11, and thereupon via the shaft rotate the turbine rotating element(s) 103. Following sufficient rotation of the turbine rotating element(s) 105 and the turbine rotating element(s) 103, the combustion chamber can be ignited by the application of sufficient fuel thereto, and the application of heat during ignition.

It is to be understood that a variety of display and/or user interface may be included in the aircraft 75 to control the hybrid propulsive engine 100, such as but not limited to a graphical user interface 402 as described with respect to FIGS. 42 to 50.

10. Hybrid Propulsive Engine Controller

This disclosure provides a variety of techniques by which a rotational velocity of such independently rotatable working fluid displacement engines 74 as the at least one independently rotatable propeller/fan 258 as described with respect to FIG. 8, the independently rotatable compressor rotor 120 as described with respect to FIG. 9, the independently rotatable compressor stator 493 as described with respect to FIG. 10, and/or the independently rotatable turbine stator 477 as described with respect to FIG. 11 can be controlled based, for example on pilot or operator input, or operation of the hybrid propulsive engine controller 97. This disclosure also provides a variety of techniques by which a rotational velocity of the at least one compressor rotatable element of the jet engine 58 as driven by the torque conversion mechanism 107 can be controlled based, for example on pilot input or operation of the hybrid propulsive engine controller 97. Such control can from a pilot, can use a variety of manual levers, selectors, Graphical User Interfaces (GUIs), indicators, etc. such as can be actuated or viewed by the pilot such as with the input output interface 811 of the hybrid propulsive engine controller, and/or automated using a variety of embodiments of the hybrid propulsive engine controller as described with respect to FIGS. 8, 9, 10, and/or 11, or alternately as could be controlled remotely or automatically as in the case of a drone or otherwise using the hybrid propulsive engine controller. It could be understood how the power settings (throttle positions to achieve a desired RPM) for the at least one independently rotatable propeller/fan 258 as well as the independently rotatable propeller/fan engine 62 of the engine as described with respect to FIG. 8 might be challenging for a pilot to memorize or control under certain instances. As such, manual control can be made more precise, reliable, or proper at least partially utilizing certain embodiments of the hybrid propulsive engine controller 97.

Certain embodiments of the hybrid propulsive engine controller 97 can be configured to allow for a variety of preferences, skill, selections, etc. between different pilots for piloted aircraft. Consider that certain pilots would prefer to control the operations of the at least one jet engines 58 and/or the at least one independently rotatable working fluid displacement engines 74 as the at least one independently rotatable propeller/fan 258 as described with respect to FIG. 8, the independently rotatable compressor rotor 120 as described with respect to FIG. 9, the independently rotatable rotatable compressor stator 493 as described with respect to FIG. 10, and/or the independently rotatable turbine stator 477 as described with respect to FIG. 11 based on monitored conditions by the hybrid propulsive engine controller 97. By comparison, certain pilots would prefer to allow certain embodiments of the hybrid propulsive engine controller 97 to monitor the conditions of, as well as to set the states of, the at least one jet engines 58 and/or the at least one independently rotatable working fluid displacement engines 74 as the at least one independently rotatable propeller/fan 258 as described with respect to FIG. 8, the independently rotatable compressor rotor 120 as described with respect to FIG. 9, the independently rotatable compressor stator 493 as described with respect to FIG. 10, and/or the independently rotatable turbine stator 477 as described with respect to FIG. 11 either almost completely, or based on limited input from the pilot or flight crew, Certain embodiments of the hybrid propulsive engine controller 97 can be configured to provide a variety of operations of the hybrid propulsive engine 100 as well as certain embodiments of the aircraft. For instance, certain embodiments of the independently rotatable propeller/fan 258 can be accelerated, decelerated, stopped, restarted, tilted, offset, or otherwise varied, as described with respect to FIGS. 3 and 4. By comparison, certain embodiments of the independently rotatable compressor rotor 120 as described with respect to FIG. 9 can be powered by the torque conversion mechanism 107 (and perhaps the energy storage element 264) such as to allow acceleration of the independently rotatable compressor rotor 120 with little torque input from the at least one jet engine 58. Certain embodiments of the independently rotatable compressor stator 493 as described with respect to FIG. 10 can be powered by the torque conversion mechanism 107 (and perhaps the energy storage element 264) such as to allow acceleration of the independently rotatable compressor stator 493 with little torque input from the at least one jet engine 58. Finally, certain embodiments of the independently rotatable compressor turbine 477 as described with respect to FIG. 11 can be powered by the torque conversion mechanism 107 (and perhaps the energy storage element 264) such as to allow acceleration of the independently rotatable turbine stator 477 with little torque input from the at least one jet engine 58.

One advantage of using certain embodiments of the hybrid propulsive engine controller 97 with certain embodiments of the hybrid propulsive engine 100 is that a variety of embodiments of the at least one independently rotatable working fluid displacement engines 74 as the at least one independently rotatable propeller/fan 258 as described with respect to FIG. 8, the independently rotatable compressor rotor 120 as described with respect to FIG. 9, the independently rotatable compressor stator 493 as described with respect to FIG. 10, and/or the independently rotatable turbine stator 477 as described with respect to FIG. 11 as well as the at least one jet engine 58 can be have a number of power settings for a number of flight situations, including a variety of normal operating as well as other emergency situations. It can be difficult for pilots to remember the suitable power settings as well as the associated airspeeds, etc. By adding the at least one independently-controllable, independently rotatable working fluid displacement engines 74 as the at least one independently rotatable propeller/fan 258 as described with respect to FIG. 8, the independently rotatable compressor rotor 120 as described with respect to FIG. 9, the independently rotatable compressor stator 493 as described with respect to FIG. 10, and/or the independently rotatable turbine stator 477 as described with respect to FIG. 11, the possibility of properly applying suitable settings is increased. Using the proper suitable power settings for the particular flight condition is a safety issue, and not using the correct power setting can be dangerous for the particular flight condition. In effect, using the proper power settings ensures that the aircraft is being operated as designed by the designer or manufacturer of the aircraft or other vehicle, as well as the at least one hybrid propulsive engine 100.

Consider that under certain flight circumstances, it may even be suitable or desirable to idle or turn off one or more of the at least one jet engines, and provide power with the at least one independently rotatable working fluid displacement engines 74 as the at least one independently rotatable propeller/fan 258 as described with respect to FIG. 8, the independently rotatable compressor rotor 120 as described with respect to FIG. 9, the independently rotatable compressor stator 493 as described with respect to FIG. 10, and/or the independently rotatable turbine stator 477 as described with respect to FIG. 11 using electric power generated from less than all of the jet engines. It would be highly desired to understand whether a particular flight conditions would allow for such shutting down of the jet engines. Additionally, since certain embodiments of the hybrid propulsive engine 100 may provide for starting of the jet engines as well as re-starting of the jet engines during flight, for example, it would be highly desirable to determine whether the jet engines could be started under certain circumstances and flight conditions.

Certain embodiments of the display can provide an indication as to what the proper power settings would be for a particular flight condition for the at least one independently rotatable propeller/fan engine 62 as well as the at least one jet engine 58, as well as whether a jet engine could be started or re-started. Such considerations might likely be considered as safety issues, and would better be displayed to pilots (for example in the form a display such as a graphic user interface (GUI).

In the instance of at least at partially automated flights as well as drones, certain embodiments of the hybrid propulsive engine controller 97 can provide for selecting and applying suitable power settings of the at least one independently rotatable propeller/fan engine 62 as well as the at least one jet engine 58. Inertial navigation units and/or remote sensors, as well as other such devices may be used by manned as well as automated flight to ascertain the actual flight condition, for example. Once the actual flight conditions are determined, the suitable power settings of the at least one independently rotatable working fluid displacement engines 74 as the at least one independently rotatable propeller/fan 258 as described with respect to FIG. 8, the independently rotatable compressor rotor 120 as described with respect to FIG. 9, the independently rotatable rotatable compressor stator 493 as described with respect to FIG. 10, and/or the independently rotatable turbine stator 477 as described with respect to FIG.

11 and/or the at least one jet engine 58 can be computed or derived using certain embodiments of the hybrid propulsive engine controller 97. Additionally, certain embodiments of the hybrid propulsive engine controller 97 can receive input from the pilot as well as processors, controllers, computers, etc. to set the independently rotatable propeller/fan engine 62 and/or the at least one jet engine 58.

This disclosure describes a number of embodiments of the hybrid propulsive engine controller 97 as described with respect to FIGS. 8, 9, 10, and/or 11, as well as other locations in this disclosure, which is intended to control and/or adjust the rotatable velocities of the at least one independently rotatable propeller/fan assembly 108 and/or the at least one jet engines 58, both of which are considered to be included in the hybrid propulsive engine 100. Certain embodiments of the hybrid propulsive engine 100 can operate without, and/or with little interaction from, the hybrid propulsive engine controller 97, and rely instead largely on user (pilot) input. By comparison, certain embodiments of the hybrid propulsive engine 100 can utilize considerable input from, and/or entirely utilizing input from, the hybrid propulsive engine controller 97, and rely only partially on such user input as generalized flight operations (taxi, take-off, cruise, descent, emergency, etc.).

Some operations associated with certain embodiments of the hybrid propulsive engine controller 97 may be controlled using digital based techniques, while other embodiments may be controlled using analog based techniques. For instance, certain embodiments of the hybrid propulsive engine 100 including the hybrid propulsive engine controller 97, which are largely digital and/or microprocessor-based, can provide for largely automated actuation of general operation and/or signals to and/or from the hybrid propulsive engine 100. A number of the components of the hybrid propulsive engine 100 may rely on analog and/or digital controllers and/or computers which may be capable of generating signals with sufficient power. Other lower-powered signals from the hybrid propulsive engine 100 may be either analog and/or digitally controlled. Certain hybrid propulsive engine controllers 97 that are configured to turn particular circuits on or off, for example, may be particularly efficient and/or effective if digitally based. Certain embodiments of the hybrid propulsive engine controller 97 can be configured to ensure relatively proper, smooth, or desired operation of the at least one hybrid propulsive engine 100 associated with the hybrid propulsive engine controller 97. FIGS. 2, 8, 9, 10, and 11, as well as other locations in this disclosure can represent a block diagram of certain respective embodiments of the hybrid propulsive engine 100 that can include the hybrid propulsive engine controller 97 to either control and/or adjust the operation of the hybrid propulsive engine 100 such as relative rotatable velocities, input mixture or electric supply to the respective jet engine or torque conversion mechanism, or some other related operations.

Certain embodiments of the hybrid propulsive engine controller 97 can be configured to provide control and/or adjustability a suitable parameter of the hybrid propulsive engine 100 based, at least in part, on the flight condition or operation (e.g., as selected by the pilot or as exists) and/or configuration of the hybrid propulsive engine 100. For example, if a user wishes to control and/or adjust an operation or detected parameter; then the user could provide suitable input to the hybrid propulsive engine controller 97. Such input to the hybrid propulsive engine controller 97 can be provided via the input/output interface, which in certain embodiments may be a graphical user interface (GUI), for example.

Certain embodiments of the hybrid propulsive engine 100 can thereby include, but are not limited to, a variety of configurations of the hybrid propulsive engine controller 97. Certain embodiments of the hybrid propulsive engine controller 97 can also be at least partially computer based, controller based, mote based, cellular telephone-based, and/or electronics based. Certain embodiments of the decoupled hybrid propulsive engine controller can be segmented into modules, and can utilize a variety of wireless communications and/or networking technologies to allow information, data, etc. to be transferred to the various distinct portions or embodiments of the hybrid propulsive engine 100. Certain embodiments of the hybrid propulsive engine controller 97 can be configured as a unitary device, a networked device, a stand alone device, and/or any combination of these and other known type devices.

Certain embodiments of the hybrid propulsive engine controller 97 can vary as to their automation, complexity, and/or sophistication; and can be utilized to control, setup, establish, and/or maintain communications between a number of communicating devices during aircraft, jet engine, or propeller/fan operation(s). As described within this disclosure, multiple ones of the different embodiments of the hybrid propulsive engine 100 can transfer information or data relating to the communication link to or from a remote location and/or some intermediate device as might be associated with communication, monitoring and/or other activities.

Certain embodiments of the hybrid propulsive engine controller 97 (in general), can utilize distinct firmware, hardware, and/or software technology as applied to certain embodiments of the hybrid propulsive engine 100. For example, certain embodiments of the hybrid propulsive engine controller 97 can at least partially utilize one or more of: mote-based technology, microprocessor-based technology, microcomputer-based technology, display technology, imaging technology, general-purpose computer technology, specific-purpose computer technology, Application-Specific Integrated Circuits (AASICs), and/or a variety of other computer, electronics, electromagnetic, imaging, visualizing, detecting, and/or information providing technologies to sense and/or control certain embodiments of the hybrid propulsive engine 100.

Certain embodiments of the hybrid propulsive engine controller 97 can, as described with respect to FIGS. 8, 9, 10, and/or 11, as well as other locations in this disclosure, include depending on context a processor 803 such as a central processing unit (CPU), a memory 807, a circuit or circuit portion 809, and an input output interface (I/O) 811 that may include a bus (not shown). Certain embodiments of the hybrid propulsive engine controller 97 of the hybrid propulsive engine 100 can include and/or be a portion of a general-purpose computer, a specific-purpose computer, a microprocessor, a microcontroller, a personal display assistant (PDA), a cellular phone, a wireless communicating device, a hard-wired communication device, and/or any other known suitable type of communications device or phone, computer, and/or controller that can be implemented in hardware, software, electromechanical devices, and/or firmware. Certain embodiments of the processor 803, as described with respect to FIGS. 8, 9, 10, and 11, as well as other locations in this disclosure, can perform the processing and arithmetic operations for certain embodiments of the hybrid propulsive engine 100. Certain embodiments of the hybrid propulsive engine controller 97 of the hybrid propulsive engine 100 can control the signal processing, database querying and response, computational, timing, data transfer, and other processes associated with general illumination lighting of the hybrid propulsive engine 100.

Certain embodiments of the memory 807 of the hybrid propulsive engine controller 97 can include a random access memory (RAM) and/or read only memory (ROM) that together can store the computer programs, operands, and other parameters that control the operation of certain embodiments of the hybrid propulsive engine controller 97 of the hybrid propulsive engine 100. The memory 807 can be configurable to contain data, information, images, visualizations, image information, etc. that can be obtained, retained, or captured by that particular hybrid propulsive engine controller 97, as described in this disclosure.

Certain embodiments of the bus can be configurable to provide for digital information transmissions between the processor 803, circuits 809, memory 807, I/O 811, the visualization, image, and/or provided information memory or storage device (which may be integrated or removable), other portions within the hybrid propulsive engine 100, and/or other portions outside of the hybrid propulsive engine 100. In this disclosure, the memory 807 can be configurable as RAM, flash memory, semiconductor-based memory, of any other type of memory that can be configurable to store data pertaining to the hybrid propulsive engine operation. Certain embodiments of the bus can also connects I/O 811 to the portions of certain embodiments of the hybrid propulsive engine controller 97 of either the hybrid propulsive engine 100 that can either receive digital information from, or transmit digital information to other portions of the hybrid propulsive engine 100, or other systems and/or networking components associated therewith.

Certain embodiments of the hybrid propulsive engine controller 97 of the hybrid propulsive engine 100, as described with respect to FIGS. 8, 9, 10, and/or 11, as well as other locations in this disclosure, can include a separate, distinct, combined, and/or associated transmitter portion (not shown) that can be either included as a portion of certain embodiments of the hybrid propulsive engine controller 97 of the hybrid propulsive engine 100. Certain embodiments of the hybrid propulsive engine controller 97 can alternately be provided as a separate and/or combined unit (e.g., certain embodiments might be processor-based and/or communication technology-based).

Certain embodiments of the hybrid propulsive engine controller 97 of the hybrid propulsive engine 100 as described with respect to FIGS. 8, 9, 10, and/or 11, as well as other locations in this disclosure can include an operation altering or controlling portion that can be either included as a portion of certain embodiments of the hybrid propulsive engine controller 97 of the hybrid propulsive engine 100, or alternately can be provided as a separate or combined unit.

Certain embodiments of the memory 807 can provide an example of a memory storage portion. In certain embodiments, the monitored value includes but is not limited to: a percentage of the memory 807, an indication of data that is or can be stored in the memory 807, or for data storage or recording interval. Such memory can include information about general illumination lighting settings, desired general illumination lighting aspects of the individual(s) using the region, etc.; and also may include one or more general illumination lighting settings as provided by certain embodiments of the hybrid propulsive engine 100.

In certain embodiments, a general illumination lighting communication link can be established between the certain embodiments of the hybrid propulsive engine controller 97 of the hybrid propulsive engine 100. The general illumination lighting communication link can be structured similar to as a communication link, or alternatively can utilize network-based computer connections, Internet connections, etc. to provide information and/or data transfer between certain embodiments of the hybrid propulsive engine controller 97 of the hybrid propulsive engine 100.

In certain embodiments, the I/O 811 provides an interface to control the transmissions of digital information between each of the components in certain embodiments of the hybrid propulsive engine controller 97 of the hybrid propulsive engine 100. The I/O 811 also provides an interface between the components of certain embodiments of the hybrid propulsive engine controller 97 of the hybrid propulsive engine 100. The circuits 809 can include such other user interface devices as a display and/or a keyboard. In other embodiments, the hybrid propulsive engine controller 97 of the hybrid propulsive engine 100 can be constructed as a specific-purpose computer such as an application-specific integrated circuit (ASIC), a microprocessor, a microcomputer, or other similar devices.

11. Certain Embodiments of the Hybrid Propulsive Engine with Relevant Flowcharts Within the disclosure, flow charts of the type described in this disclosure apply to method steps as performed by a computer or controller as could be contained within certain embodiments of the hybrid propulsive engine 100, as described in this disclosure. Additionally, the flow charts as described in this disclosure apply operations or procedures that can be performed entirely and/or largely utilizing mechanical devices, electromechanical devices, or the like, such as certain embodiments of the hybrid propulsive engine 100 as described in this disclosure. The flow charts can also apply to apparatus devices, such as an antenna or a node associated therewith that can include, e.g., a general-purpose computer or specialized-purpose computer whose structure along with the software, firmware, electro-mechanical devices, and/or hardware, can perform the process or technique described in the flow chart.

An embodiment of the hybrid propulsive engine 100 that can act to provide for operation of the hybrid propulsive engine 100 as described with respect to FIGS. 47-51, as well as other locations in this disclosure, and elsewhere in this disclosure. There can be a variety of embodiments of the hybrid propulsive engine 100 that can be used to visualize, image, or provide information etc. as described in this disclosure. There can be variety of embodiments of the hybrid propulsive engine 100.

FIG. 47 shows certain embodiments of a hybrid propulsive engine technique 4600 such as described with respect to, but not limited to, the hybrid propulsive engine 100 of FIG. 1, and elsewhere in this disclosure. Certain embodiments of a high-level flowchart of the general illumination lighting technique 4600 is described with respect to FIG. 47 and can include, but is not limited to, operations 4602, 4604, 4606, and 4608. Certain embodiments of operation 4602 can include, but is not limited to, providing at least some first thrust associated with a flow of a working fluid through at least a portion of an at least one axial flow jet engine. For example, certain embodiments of the jet engine 58 can be configured to provide the thrust using the compressor section 102, the combustion portion 109, and the turbine section 104 as described with respect to FIGS. 8 and 16. Certain embodiments of operation 4604 can include, but is not limited to, extracting energy from the working fluid that is at least partially converted into electrical power. For example, certain embodiments of the energy extraction mechanism 66, as described with respect to FIGS. 2 and 8, can be configured as an electrical generator that generates electricity from a variety of locations including, but not limited to, a generator associated with rotation of the turbine or associated elements such as the shaft, magnetohydrodynamic devices to obtain electricity from the kinetic energy associated with the flow of the working fluid passing through the jet engine, as well as a heat engines that can obtain electricity from heat energy of the working fluid passing through the jet engine or downstream thereof, as described with respect to FIGS. 12 to 15, as well as other locations in this disclosure. Certain embodiments of operation 4606 can include, but is not limited to, converting at least a portion of the electrical power to torque. For example, certain embodiments of the torque conversion mechanism 107 can include an electric motor that can generate torque based on the electric input, as described with respect to FIGS. 2, 8, and 12 to 15, as well as other locations in this disclosure. Certain embodiments of the operation 4608 can include, but is not limited to rotating an at least one independently rotatable propeller/fan of at least one rotatable propeller/fan assembly at least partially responsive to the converting the at least a portion of the electrical power to torque, wherein the rotating of the at least one independently rotatable propeller/fan of the at least one rotatable propeller/fan assembly is arranged to produce at least some second thrust. For example, certain embodiments of the rotatable working fluid displacement engine 74 of FIG. 2 can be configured as the at least one rotatable propeller/fan assembly 108, as described with respect to FIGS. 3, 4, and 8. Certain embodiments of the hybrid propulsive engine 100 that is configured to drive the at least one independently rotatable propeller/fan engine 62 can be arranged as a turboprop or turbofan engine. The relative operation of the at least one independently rotatable propeller/fan engine 62 can be controlled relative to that of the jet engine 58, such as to provide desired operation to the independently rotatable propeller/fan 258, and can use such techniques as tilting, offsetting, hybrid techniques, etc. based either on user input or on sensed parameters as applied to the at least one hybrid propulsive engine controller, as described with respect to FIG. 8.

In one or more various aspects, related systems include but are not limited to circuitry and/or programming for effecting the herein-referenced method aspects; the circuitry and/or programming can be virtually any combination of hardware, software, electro-mechanical system, and/or firmware configurable to effect the herein-referenced method aspects depending upon the design choices of the system designer.

12. Conclusion

This disclosure provides a number of embodiments of the hybrid propulsive engine 100 that can be configured to provide a variety of relatively efficient operation of aircraft, or other vehicles, as described in this disclosure. The embodiments of the hybrid propulsive engines, as described with respect to this disclosure, are intended to be illustrative in nature, and are not limiting its scope. Different embodiments of the hybrid propulsive engine controller 97 can provide for a variety of control for a variety of embodiments of manned or unmanned (as well as piloted or unpiloted) aircraft or other vehicles.

Those having skill in the art will recognize that the state of the art in computer, controller, communications, networking, and other similar technologies has progressed to the point where there is little distinction left between hardware, firmware, and/or software implementations of aspects of systems, such as may be utilized in the decoupled engine, as may be monitored and/or controlled using embodiments of the hybrid propulsive engine controller 97. The use of hardware, firmware, and/or software can therefore generally represent (but not always, in that in certain contexts the choice between hardware and software can become significant) a design choice representing cost vs. efficiency tradeoffs of a variety of embodiments of the at least one hybrid propulsive engines 100. Those having skill in the art will appreciate that there are various vehicles by which processes and/or systems and/or other technologies described herein can be effected (e.g., hardware, software, and/or firmware), and that the vehicle can vary with the context in which the processes and/or systems and/or other technologies are deployed. For example, if an implementer determines that speed and accuracy are paramount, the implementer and/or designer of the decoupled hybrid propulsive engine may opt for mainly a hardware and/or firmware implementation to control and/or provide the general illumination lighting. In alternate embodiments, if flexibility is paramount, the implementer and/or designer may opt for mainly a software and/or mechanical implementation to control and/or provide the general illumination lighting. In yet other embodiments, the implementer and/or designer may opt for some combination of hardware, software, firmware, and/or mechanical implementation to control and/or provide the hybrid propulsive engine 100. Hence, there are several possible techniques by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, target individual 82 and/or collectively, by a wide range of hardware, software, firmware, or virtually any combination thereof. In certain embodiments, several portions of the general illumination lighting subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the systems of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" positioned prior to one or more goods, items, and/or services are intended to apply inclusively to either one or a plurality of those goods, items, and/or services.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A hybrid propulsive engine, comprising:
    a co-axial-flow jet engine including a compressor and a turbine, the co-axial-flow jet engine configured to provide a first thrust associated with a working fluid passing through the co-axial flow jet engine;
    an energy extraction mechanism configured to extract energy from the working fluid, and at least partially convert that energy to electrical power;
    a torque conversion mechanism configured to convert at least a portion of the electrical power to torque; and
    a rotatable propeller/fan assembly including an independently rotatable propeller/fan able to rotate independently of the compressor and the turbine of the co-axial-flow jet engine, the rotatable propeller/fan assembly configured to be powered for rotation at least partially responsive to the torque conversion mechanism, the propeller fan assembly configured to provide a second thrust.

2. The hybrid propulsive engine of claim 1, wherein the energy extraction mechanism comprises an electric generator.

3. The hybrid propulsive engine of claim 1, wherein the energy extraction mechanism comprises a turbine rotational element configured to extract energy from motion of the working fluid within the co-axial-flow jet engine.

4. The hybrid propulsive engine of claim 1, wherein the torque conversion mechanism comprises an electric motor.

5. The hybrid propulsive engine of claim 1, wherein the energy extraction mechanism includes a heat engine configured to extract at least some heat from the working fluid that is at least partially applied to a heat receptive fluid.

6. The hybrid propulsive engine of claim 1, further comprising a second torque conversion mechanism configured to generate a second torque, wherein the rotatable propeller/fan assembly is configured to be powered for rotation at least partially responsive to the second torque conversion mechanism in addition to the torque conversion mechanism.

7. The hybrid propulsive engine of claim 1, wherein the energy extraction mechanism comprises a magnetohydrodynamic device configured to extract kinetic energy from a flow of the working fluid.

8. The hybrid propulsive engine of claim 1, wherein the co-axial-flow jet engine includes a turbojet.

9. The hybrid propulsive engine of claim 1, wherein the co-axial-flow jet engine includes a ramjet jet engine.

10. The hybrid propulsive engine of claim 1, wherein the co-axial-flow jet engine includes an externally heated jet engine.

11. The hybrid propulsive engine of claim 1, wherein the co-axial-flow jet engine includes a combustion driven jet engine.

12. The hybrid propulsive engine of claim 1, wherein the rotatable propeller/fan comprises a substantially co-axial-flow rotatable propeller/fan.

13. The hybrid propulsive engine of claim 1, wherein the energy extraction mechanism comprises a heat engine configured to extract at least some heat from the working fluid that is at least partially applied to a heat receptive fluid, wherein the energy extraction mechanism comprises a Rankine Cycle energy extraction mechanism configured to extract energy in the form of heat from the working fluid.

14. The hybrid propulsive engine of claim 1, further comprising a secondary source of electrical energy configured to supply energy to the torque conversion mechanism.

15. The hybrid propulsive engine of claim 1, further comprising a hybrid propulsive engine starter configured to rotate at least a portion of the rotatable propeller/fan assembly at a sufficient rotational velocity to enhance starting the hybrid propulsive engine.

16. The hybrid propulsive engine of claim 1, further comprising a hybrid propulsive engine starter configured to rotate a rotatable compressor element at a sufficient rotational velocity to enhance starting the hybrid propulsive engine.

17. The hybrid propulsive engine of claim 1, wherein the co-axial-flow jet engine produces the first thrust at least partially responsive to the rotatable propeller/fan assembly.

18. The hybrid propulsive engine of claim 1, wherein at least some of the working fluid passes through the independently rotatable propeller/fan assembly.

19. The hybrid propulsive engine of claim 1, wherein the rotatable propeller/fan assembly is configured to be powered for a controllable rotation in a first direction or alternately in a second direction that is reversed from the first direction.

20. The hybrid propulsive engine of claim 1, wherein the rotatable propeller/fan assembly is configured to be variably powered for a variable speed rotation.

21. The hybrid propulsive engine of claim 1, configured as a turbofan, wherein the rotatable propeller/fan assembly is configured as a shrouded fan.

22. The hybrid propulsive engine of claim 1, configured as a turboprop, wherein the rotatable propeller/fan assembly is configured as an unshrouded propeller.

23. The hybrid propulsive engine of claim 1, wherein the rotatable propeller/fan assembly includes a compressive fan.

24. The hybrid propulsive engine of claim 1, wherein the rotatable propeller/fan assembly is configured to rotate sufficiently to direct a first portion of fluid towards the co-axial-flow jet engine, thereby providing at least a portion of the working fluid to the co-axial flow jet engine, while directing a second portion of fluid to bypass the co-axial flow jet engine.

25. The hybrid propulsive engine of claim 1, wherein the engine is configured to at least partially power an aircraft.

26. The hybrid propulsive engine of claim 1, wherein the engine is configured to at least partially power a boat or ship.

27. The hybrid propulsive engine of claim 1, wherein the engine is configured to at least partially power a hovercraft.

28. The hybrid propulsive engine of claim 1, wherein the engine is configured to at least partially power a land vehicle.

29. The hybrid propulsive engine of claim 1, further comprising a control circuit to allow a user to control a suitable rotational velocity of the rotatable propeller/fan assembly based at least partially on a user input indicating a desired flight condition.

30. The hybrid propulsive engine of claim 1, further comprising a control circuit to allow a user to control a suitable polarity of rotation of the rotatable propeller/fan assembly based at least partially on a user input indicating a desired flight condition.

31. A hybrid propulsive method, comprising:
providing a first thrust associated with a flow of a working fluid through a co-axial-flow jet engine;
extracting energy from the working fluid that is at least partially converted into electrical power;
converting at least a portion of the electrical power to torque; and
rotating an independently rotatable propeller/fan of a rotatable propeller/fan assembly independently of a compressor and a turbine of the co-axial-flow jet engine to provide a second thrust, the rotatable propeller/fan assembly at least partially responsive to the torque.

32. A hybrid propulsive method, comprising:
providing a first thrust associated with a flow of a working fluid through a jet engine;
extracting energy from the working fluid that is at least partially converted into electrical power;
converting at least a portion of the electrical power to torque;
providing a control command to deliver torque to an independently rotatable propeller/fan; and
rotating at least partially from the torque the independently rotatable propeller/fan independently of a compressor and a turbine of the jet engine to provide a second thrust.

33. The hybrid propulsive method of claim 32, further comprising:
providing a second jet engine that is operationally associated with the independently rotatable propeller/fan;
stopping a rotation of the second jet engine; and
restarting the rotation of the second jet engine at least partially using the torque used to rotate the independently rotatable propeller/fan.

34. The hybrid propulsive method of claim 32, further comprising:
providing a second jet engine that is operationally associated with the independently rotatable propeller/fan; and
starting a rotational operation of the second jet engine at least partially responsive to the rotating of the independently rotatable propeller/fan.

35. A hybrid propulsive method, comprising:
providing a first thrust associated with a flow of a working fluid through an axial flow jet engine;
extracting energy from the working fluid that is at least partially converted into electrical power; and
rotating an independently rotatable propeller/fan independently of a compressor and a turbine of the axial flow jet engine to provide a second thrust, wherein rotating the independently rotatable propeller/fan uses at least some of the electrical power.

36. The hybrid propulsive method of claim 35, wherein extracting energy from the working fluid is at least partially performed with an energy extraction mechanism.

37. The hybrid propulsive method of claim 32, further comprising generating a second torque, and powering rotating the independently rotatable propeller/fan at least partially from the second torque in addition to the torque.

38. The hybrid propulsive method of claim 35, further comprising variably laterally displacing an offset of a rotational axis of the independently rotatable propeller/fan assembly relative to the axial-flow jet engine.

39. A hybrid propulsive method, comprising:
providing a first thrust associated with a flow of a working fluid through a jet engine;
extracting energy from the working fluid that is at least partially converted into electrical power;
rotating, at least partially using the electrical power, an independently rotatable propeller/fan according to a control algorithm, the control algorithm determining the amount of the electrical power needed to drive the independently rotatable propeller/fan and determining a portion of the electrical power be converted to torque, wherein the rotating of the independently rotatable propeller/fan is arranged to produce a second thrust, and wherein the at least one independently rotatable propeller/fan is configured to rotate independently of a compressor and a turbine of the jet engine and be operationally distinct from the jet engine.

40. The hybrid propulsive method of claim 39, further comprising:
providing a second jet engine that is operationally associated with the independently rotatable propeller/fan;
stopping a rotation of the second jet engine; and
restarting the rotation of the second jet engine at least partially using the torque used to rotate the independently rotatable propeller/fan.

41. The hybrid propulsive method of claim 39, further comprising:
providing a second jet engine that is operationally associated with the independently rotatable propeller/fan; and
starting a rotational operation of the second jet engine at least partially responsive to the rotating of the independently rotatable propeller/fan.

* * * * *